(12) United States Patent
Gharabegian

(10) Patent No.: US 10,554,436 B2
(45) Date of Patent: Feb. 4, 2020

(54) INTELLIGENT UMBRELLA AND/OR ROBOTIC SHADING SYSTEM WITH ULTRA-LOW ENERGY TRANSCEIVERS

(71) Applicant: Shadecraft, Inc., Pasadena, CA (US)

(72) Inventor: Armen Sevada Gharabegian, Glendale, CA (US)

(73) Assignee: Shadecraft, Inc., Pasadena, CA (US)

( * ) Notice: Subject to any disclaimer, the term of this patent is extended or adjusted under 35 U.S.C. 154(b) by 0 days.

(21) Appl. No.: 15/817,252

(22) Filed: Nov. 19, 2017

(65) Prior Publication Data

US 2019/0158303 A1 May 23, 2019

(51) Int. Cl.
*H04L 12/28* (2006.01)
*E04H 15/02* (2006.01)
(Continued)

(52) U.S. Cl.
CPC ........... *H04L 12/282* (2013.01); *E04H 15/02* (2013.01); *E04H 15/28* (2013.01); *H04L 12/283* (2013.01);
(Continued)

(58) Field of Classification Search
CPC ... H04L 12/282; H04L 67/125; H04L 12/283; H04L 2012/2841; H04L 67/20; E04H 15/28; E04H 15/02; E04H 15/10; E04H 15/48; F21V 33/006; F16H 19/04; F16H 19/001; F16H 25/20; G06F 3/167; H02S 20/30; H02S 99/00
See application file for complete search history.

(56) References Cited

U.S. PATENT DOCUMENTS

| 138,774 A | 6/1873 | Whitcomb |
| 2,070,045 A | 2/1937 | Gilpin |

(Continued)

FOREIGN PATENT DOCUMENTS

| CA | 2324851 | 5/2001 |
| CH | 203073199 | 7/2013 |

(Continued)

OTHER PUBLICATIONS

International Search Report, PCT Application No. PCT/US2017/068771, dated May 10, 2018, Federal Institute of Industrial Property, Authorized Officer, A. Chekalkina.
(Continued)

*Primary Examiner* — Brian D Nguyen

(57) ABSTRACT

An intelligent umbrella, comprising a base assembly, the base assembly having an outside surface contacting a ground surface, a support assembly, the support assembly connected to the base assembly, an expansion assembly, the expansion assembly connected to the support assembly and to expand and contract one or more arm support assemblies and arms; and an ultra-low energy (ULE) wireless transceiver, the ULE wireless transceiver to act as an ULE hub, to generate commands or instructions and to communicate the generated commands or instructions to another ULE-enabled device. The another ULE-enabled device may be a separate intelligent umbrella, and the commands or instructions to instruct the separate intelligent umbrella to move one or more mechanical assemblies of the separate intelligent umbrella.

15 Claims, 19 Drawing Sheets

(51) Int. Cl.

| | | |
|---|---|---|
| *E04H 15/28* | (2006.01) | |
| *H04L 29/08* | (2006.01) | |
| *F21V 33/00* | (2006.01) | |
| *E04H 15/10* | (2006.01) | |
| *E04H 15/48* | (2006.01) | |
| *F16H 19/04* | (2006.01) | |
| *F16H 19/00* | (2006.01) | |
| *F16H 25/20* | (2006.01) | |
| *G06F 3/16* | (2006.01) | |
| *H02S 20/30* | (2014.01) | |
| *H02S 99/00* | (2014.01) | |

(52) U.S. Cl.
CPC ............ H04L 67/125 (2013.01); *E04H 15/10* (2013.01); *E04H 15/48* (2013.01); *F16H 19/001* (2013.01); *F16H 19/04* (2013.01); *F16H 25/20* (2013.01); *F21V 33/006* (2013.01); *G06F 3/167* (2013.01); *H02S 20/30* (2014.12); *H02S 99/00* (2013.01); *H04L 67/12* (2013.01); *H04L 67/18* (2013.01); *H04L 67/20* (2013.01); *H04L 2012/2841* (2013.01)

(56) References Cited

U.S. PATENT DOCUMENTS

| | | |
|---|---|---|
| 2,087,537 A | 7/1937 | Finkel |
| 2,485,118 A | 10/1949 | Simpson |
| 2,960,094 A | 11/1960 | Small |
| 4,174,532 A | 11/1979 | Kelley |
| 4,684,230 A | 8/1987 | Smith |
| 4,787,019 A | 11/1988 | Van den Broeke |
| 4,915,670 A | 4/1990 | Nesbit |
| 5,002,082 A | 3/1991 | Roder |
| 5,007,811 A | 4/1991 | Hopkins |
| 5,029,239 A | 7/1991 | Nesbit |
| 5,161,561 A | 11/1992 | Jamieson |
| 5,273,062 A | 12/1993 | Mozdzanowski |
| 5,275,364 A | 1/1994 | Burger et al. |
| 5,318,055 A | 6/1994 | Olaniyan |
| 5,321,579 A | 6/1994 | Brown et al. |
| 5,349,975 A | 9/1994 | Valdner |
| 5,683,064 A | 11/1997 | Copeland et al. |
| 5,979,793 A | 11/1999 | Louis |
| 5,996,511 A | 11/1999 | Swoger |
| 6,017,188 A | 1/2000 | Benton |
| 6,027,309 A | 2/2000 | Rawls et al. |
| 6,113,054 A | 9/2000 | Ma |
| 6,134,103 A | 10/2000 | Ghanma |
| 6,138,970 A | 10/2000 | Sohrt et al. |
| 6,158,701 A | 12/2000 | Deshler |
| 6,199,570 B1 | 3/2001 | Patarra |
| 6,298,866 B1 | 10/2001 | Molnar, IV |
| 6,302,560 B1 | 10/2001 | Lai |
| 6,347,776 B1 | 2/2002 | Chuang |
| 6,374,840 B1 | 4/2002 | Ma |
| 6,405,742 B1 | 6/2002 | Driscoll |
| 6,412,889 B1 | 7/2002 | Hummell et al. |
| 6,439,249 B1 | 8/2002 | Spatafora et al. |
| 6,446,650 B1 | 9/2002 | Ma |
| 6,488,254 B2 | 12/2002 | Li |
| 6,511,033 B2 | 2/2003 | Henrie et al. |
| 6,536,721 B1 | 3/2003 | Kao |
| 6,554,012 B2 | 4/2003 | Patarra |
| 6,565,060 B2 | 5/2003 | Li |
| 6,575,183 B2 | 6/2003 | Tung |
| 6,585,219 B2 | 7/2003 | Li |
| 6,598,990 B2 | 7/2003 | Li |
| 6,636,918 B1 | 10/2003 | Aguilar et al. |
| 6,666,284 B2 | 12/2003 | Stirm |
| 6,785,789 B1 | 8/2004 | Kekre et al. |
| 6,837,255 B2 | 1/2005 | Bunch |
| 6,840,657 B2 | 1/2005 | Tung |
| 6,845,780 B2 | 1/2005 | Bishirjian |
| 6,923,193 B2 | 8/2005 | Chen |
| 6,959,996 B2 | 11/2005 | Ip |
| 6,961,237 B2 | 11/2005 | Dickie |
| 7,017,598 B2 | 3/2006 | Nipke |
| D518,629 S | 4/2006 | Ma |
| 7,034,902 B2 | 4/2006 | Tajima |
| 7,128,076 B2 | 10/2006 | Freedman |
| 7,134,442 B2 | 11/2006 | Ma |
| 7,134,762 B2 | 11/2006 | Ma |
| 7,143,501 B2 | 12/2006 | Bramson et al. |
| D539,632 S | 4/2007 | Ma |
| D558,444 S | 1/2008 | Ma |
| 7,407,178 B2 | 8/2008 | Freedman |
| 7,412,985 B2 | 8/2008 | Ma |
| 7,431,469 B2 | 10/2008 | Li |
| 7,493,909 B2 | 2/2009 | Ma |
| 7,497,225 B1 | 3/2009 | Klein, Jr. et al. |
| 7,497,583 B2 | 3/2009 | Ma |
| 7,533,680 B2 | 5/2009 | Ma |
| 7,559,520 B2 | 7/2009 | Quitjano et al. |
| 7,593,220 B2 | 9/2009 | Proctor et al. |
| 7,604,215 B1 | 10/2009 | Fraser |
| 7,628,164 B2 | 12/2009 | Ma et al. |
| 7,650,230 B1 | 1/2010 | Laverick et al. |
| 7,703,464 B2 | 4/2010 | Ma |
| 7,708,022 B2 | 5/2010 | Ma |
| 7,726,326 B2 | 6/2010 | O'Donnell |
| 7,755,970 B2 | 7/2010 | Welker et al. |
| 7,778,624 B2 | 8/2010 | Li |
| 7,784,761 B2 | 8/2010 | Ma |
| 7,798,161 B2 | 9/2010 | Ma |
| D626,324 S | 11/2010 | Ma |
| 7,856,996 B2 | 12/2010 | Ma |
| 7,861,734 B2 | 1/2011 | Ma |
| 7,891,367 B2 | 2/2011 | Ma |
| 7,891,633 B2 | 2/2011 | Li |
| 7,900,643 B2 | 3/2011 | Ma |
| 7,963,263 B2 | 6/2011 | Ma |
| 8,020,572 B2 | 9/2011 | Ma |
| 8,025,071 B2 | 9/2011 | Ma |
| 8,061,375 B2 | 11/2011 | Ma |
| 8,066,021 B2 | 11/2011 | Ma |
| 8,082,935 B2 | 12/2011 | Ma |
| 8,139,670 B1 * | 3/2012 | Son ..................... H04B 7/0413 370/334 |
| D660,137 S | 5/2012 | Ma |
| 8,166,986 B2 | 5/2012 | Ma |
| 8,205,696 B2 | 6/2012 | Ma |
| 8,251,078 B2 | 8/2012 | Ma |
| 8,345,889 B2 | 1/2013 | Li |
| 8,356,613 B2 | 1/2013 | Ma |
| 8,387,641 B1 | 3/2013 | Ilan |
| 8,555,905 B2 | 10/2013 | Ma |
| 8,555,906 B2 | 10/2013 | Ma |
| 8,616,226 B2 | 12/2013 | Ma et al. |
| D697,705 S | 1/2014 | Ma |
| 8,632,045 B2 | 1/2014 | Ma |
| 8,657,246 B2 | 2/2014 | Ma |
| 8,672,287 B2 | 3/2014 | Li |
| 8,919,722 B2 | 6/2014 | Ma |
| D719,342 S | 12/2014 | Ma |
| D719,343 S | 12/2014 | Ma |
| 8,919,361 B2 | 12/2014 | Ma |
| 8,960,625 B2 | 2/2015 | Ma |
| D724,309 S | 3/2015 | Ma |
| 9,030,829 B2 | 5/2015 | Ma |
| D731,166 S | 6/2015 | Ma |
| 9,078,497 B2 | 7/2015 | Ma |
| 9,113,683 B2 | 8/2015 | Ma |
| D738,609 S | 9/2015 | Ma |
| D738,610 S | 9/2015 | Ma |
| 9,125,462 B2 | 9/2015 | Akin et al. |
| 9,192,215 B2 | 11/2015 | Ma |
| 9,220,325 B2 | 12/2015 | Ma |
| 9,237,785 B2 | 1/2016 | Ma |
| 9,241,549 B2 | 1/2016 | Ma |
| 9,289,039 B2 | 3/2016 | Akin |
| 9,345,295 B2 | 5/2016 | Li |
| 9,510,653 B2 | 12/2016 | Akin |

(56) References Cited

U.S. PATENT DOCUMENTS

| | | |
|---|---|---|
| 9,629,426 B1 | 4/2017 | Fan |
| 9,839,267 B1 | 12/2017 | Gharabegian |
| 2001/0001083 A1 | 5/2001 | Helot |
| 2002/0074027 A1 | 6/2002 | Maidment |
| 2002/0185582 A1 | 12/2002 | Li |
| 2003/0000557 A1 | 1/2003 | Lai |
| 2003/0000559 A1 | 1/2003 | Wu |
| 2004/0103934 A1 | 6/2004 | Szumlic |
| 2004/0240167 A1 | 12/2004 | Ledbetter et al. |
| 2004/0261827 A1 | 12/2004 | Chen |
| 2005/0016571 A1 | 1/2005 | Wu |
| 2005/0072451 A1 | 4/2005 | Vivian et al. |
| 2005/0161067 A1 | 7/2005 | Hollins |
| 2005/0279396 A1 | 12/2005 | Choi |
| 2006/0016465 A1 | 1/2006 | Johannes van Loosbroek et al. |
| 2006/0016955 A1 | 1/2006 | Kao |
| 2006/0124122 A1 | 6/2006 | Young et al. |
| 2006/0127034 A1 | 6/2006 | Brooking et al. |
| 2006/0196532 A1 | 9/2006 | Tung |
| 2007/0040647 A1* | 2/2007 | Saenz ............... H04W 4/046 |
| | | 340/3.1 |
| 2007/0070588 A1 | 3/2007 | Lin |
| 2007/0126208 A1 | 6/2007 | Freedman |
| 2007/0127231 A1 | 6/2007 | Li |
| 2007/0242450 A1 | 10/2007 | Blatecky |
| 2007/0279856 A1 | 12/2007 | Bragg |
| 2007/0283987 A1 | 12/2007 | Reyes |
| 2007/0286463 A1 | 12/2007 | Ritzau et al. |
| 2008/0056898 A1 | 3/2008 | Li |
| 2008/0076379 A1 | 3/2008 | Li |
| 2008/0092936 A1 | 4/2008 | Carabillo |
| 2008/0262657 A1 | 10/2008 | Howell et al. |
| 2009/0056775 A1 | 3/2009 | Kuelbs |
| 2009/0058354 A1 | 3/2009 | Harrison |
| 2009/0071516 A1 | 3/2009 | Li |
| 2009/0188537 A1 | 7/2009 | Bacik |
| 2009/0193578 A1 | 8/2009 | Jang et al. |
| 2009/0250982 A1 | 10/2009 | Cohen |
| 2009/0277486 A1 | 11/2009 | Stepaniuk et al. |
| 2010/0012164 A1 | 1/2010 | Stoelinga |
| 2010/0097441 A1 | 4/2010 | Trachtenberg et al. |
| 2010/0132751 A1 | 6/2010 | Li |
| 2010/0204481 A1 | 8/2010 | Chemel et al. |
| 2010/0245032 A1 | 9/2010 | Li |
| 2010/0245503 A1 | 9/2010 | Li |
| 2010/0295456 A1 | 11/2010 | Ko |
| 2010/0320819 A1 | 12/2010 | Cohen et al. |
| 2011/0088734 A1 | 4/2011 | Garcia |
| 2011/0157801 A1 | 6/2011 | Satterfield |
| 2012/0029704 A1 | 2/2012 | Ackermann |
| 2012/0038279 A1 | 2/2012 | Chang |
| 2013/0048829 A1 | 2/2013 | Herniak |
| 2013/0073283 A1 | 3/2013 | Kenwood |
| 2013/0306628 A1 | 11/2013 | Volin |
| 2014/0041555 A1 | 2/2014 | Ramberg |
| 2014/0167624 A1 | 6/2014 | Sheu |
| 2014/0317168 A1 | 10/2014 | Suresh |
| 2015/0043202 A1 | 2/2015 | Kosedag |
| 2015/0116485 A1 | 4/2015 | Subramanian |
| 2015/0136944 A1 | 5/2015 | Segev |
| 2015/0216273 A1 | 8/2015 | Akin |
| 2015/0216274 A1 | 8/2015 | Akin |
| 2015/0237975 A1 | 8/2015 | Ng |
| 2015/0245691 A1 | 9/2015 | Fitzgerald |
| 2015/0255853 A1 | 9/2015 | Apple |
| 2015/0362137 A1 | 12/2015 | Izardel |
| 2015/0374083 A1 | 12/2015 | Akin |
| 2016/0095398 A1 | 4/2016 | Li |
| 2016/0119699 A1 | 4/2016 | Caban |
| 2016/0153650 A1 | 6/2016 | Chien |
| 2016/0184993 A1 | 6/2016 | Brandwijk |
| 2016/0198818 A1 | 7/2016 | Akin |
| 2016/0326765 A1 | 11/2016 | Barbret |
| 2016/0338457 A1* | 11/2016 | Gharabegian .......... G05B 15/02 |
| 2017/0055653 A1 | 3/2017 | Gharabegian |
| 2017/0071300 A1 | 3/2017 | Gharabegian |
| 2017/0086545 A1 | 3/2017 | Gharabegian |
| 2017/0086546 A1 | 3/2017 | Gharabegian |
| 2017/0105497 A1 | 4/2017 | Gharabegian |
| 2017/0222847 A1* | 8/2017 | Feher ................. H04L 27/2601 |
| 2018/0020530 A1 | 1/2018 | Scordato |
| 2018/0054249 A1* | 2/2018 | Khanukaev .......... H04B 1/3838 |
| 2019/0177029 A1 | 6/2019 | Lopez Masague |

FOREIGN PATENT DOCUMENTS

| | | |
|---|---|---|
| CN | 102258250 | 11/2011 |
| CN | 202974544 | 6/2013 |
| CN | 203073199 | 7/2013 |
| CN | 103405009 | 11/2013 |
| CN | 104469162 | 3/2015 |
| CN | 104835334 | 8/2015 |
| CN | 105193034 | 12/2015 |
| CN | 205089186 | 3/2016 |
| CN | 201580588 | 4/2016 |
| CN | 106163041 | 11/2016 |
| EP | 1731055 | 12/2006 |
| EP | 2479375 | 7/2012 |
| FR | 2977457 | 1/2013 |
| FR | 2977457 A1 | 1/2013 |
| GR | 20060100244 | 11/2007 |
| JP | 2008212421 | 9/2008 |
| RU | 12174 | 12/1999 |
| WO | WO2003073884 | 9/2003 |
| WO | WO2004103113 | 12/2004 |
| WO | WO 2005092140 | 10/2005 |
| WO | WO2006059334 | 6/2006 |
| WO | WO2008102403 | 8/2008 |
| WO | WO2009124384 | 10/2009 |
| WO | WO20100098735 | 9/2010 |
| WO | WO2011/115418 | 9/2011 |
| WO | WO2011/140557 | 11/2011 |
| WO | WO2005092140 | 6/2013 |
| WO | WO2016/174312 | 11/2016 |
| WO | WO2017/127845 | 7/2017 |
| WO | WO2018057672 | 3/2018 |

OTHER PUBLICATIONS

GPS Sun Tracking Solar Panel; Alyammahi et al., published May 7, 2015, accessed Jun. 21, 2017 from https:repository.lib.fit.edu/handle/11141/628?show=full.

International Search Report and Written Opinion of International Searching Authority, International Application No. PCT/US2017/043789, dated Nov. 23, 2017.

International Search Report and Written Opinion of International Searching Authority, International Application No. PCT/US2017/045059, dated Jan. 25, 2018.

International Search Report and Written Opinion of International Searching Authority Application No. PCT/US2017/052595, dated Feb. 21, 2018.

Written Opinion and International Search Report for PCT International Application No. PCT/US2018/028281, Federal Institute of Industrial Property, International Filing Date Apr. 19, 2018, dated Sep. 13, 2018.

Written Opinion and International Search Report for PCT International Application No. PCT/US2018/030169, Federal Institute of Industrial Property, International Filing Date Apr. 30, 2018, dated Aug. 9, 2018.

Written Opinion and International Search Report for PCT International Application No. PCT/US2018/041080, Federal Institute of Industrial Property, International Filing Date Jul. 6, 2018, dated Oct. 11, 2018.

Written Opinion and International Search Report for PCT International Application No. PCTUS2018/045435, International Filing Date Aug. 6, 2018, dated Nov. 22, 2018.

Written Opinion and International Search Report for PCT International Application No. PCTUS2018/046364, International Filing Date Aug. 10, 2018, dated Nov. 22, 2018.

(56) References Cited

OTHER PUBLICATIONS

Written Opinion and International Search Report for PCT International Application No. PCTUS2018/047010, International Filing Date Aug. 19, 2018, dated Nov. 22, 2018.
International Search Report, PCT Aplication No. PCT/US2019/031903; dated Sep. 26, 2019.
International Preliminary Report on Patentability, PCT Application PCT/US2018/030169, dated Nov. 5, 2019.

* cited by examiner

Fig. 13

| Hardware | | | Function |
|---|---|---|---|
| 1305 | Telemetry Board With Slave Processor | GPS/GNSS — 1306<br>Digital Compass — 1307 | Provide Location and Orientation Information |
| 1310 | Weather Variables Board With Slave Processor | Air Quality Sensor — 1311<br>UV Radiation Sensor — 1312<br>Digital Barometer — 1313<br>Temperature — 1314<br>Humidity — 1316<br>Wind Speed — 1317 | Sense Weather Variables Surrounding the Shade.<br>Detect High Winds and Close Shade's Arms |
| 1315 | Voice Recognition Board With Slave Processor | | Enable Control Via Voice Commands.<br>Provide Audible Warnings |
| 1320 | Rechargable Battery | | Store Electricity Collected Through Solar Panel/AC Charger<br>Provide Electricity for All Shade Components |
| 1325 | Solar Panel | | Generate Electricity To Charge the Battery |
| 1330 | Power Tracking Solar Charger | | Regulate and Balance the Charging Process<br>Provide Data Regarding Charging State |
| 1335 | AC Adapter Input | | Charge the Battery/Run System in Absence of Sun |
| 1340 | Proximity Sensor | | Identify the Location of A Person Relative to Moving Components |
| 1345 | Motion Sensor | | Detect Presence of Person Around Shade |
| 1350 | Code Based Obstacle Detector | | Detect Presence of Person/Object Within Shade's Path of Travel |
| 1355 | Tilt Sensor | | Detect movement/relocation of Shade and Reorient to Correct Position |
| 1360 | Linux Based Computer With Integrated Wifi And 5xIP Cameras | | Collect Video Feed along with Sensor data Communicate Through Wifi. |
| 1365 | Bluetooth | | Provides Short Distance Communication for App Based Control, Audio Transmission, and Data Retrieval. |
| 1370 | LED Lighting | | Provides Light During Night Operation |
| 1375 | Class D Stereo Amplifier With Speakers | | Provides Audio Playback Through Mobile App or Wifi Stream |
| 1380 | Azimuth Servo Motor With Controller | | Rotates Shade to Predetermined Azimuth Angle |
| 1385 | Elevation Servo Motor With Controller | | Rotates Shade to Predetermined Elevation Angle |
| 1390 | Actuator Servo Motor With Controller | | Extend/Retract Shade Blades |
| 1395 | Motion Control PCB | | |
| 1357 | Digital Cameras | | |
| 1366 | Wind Turbine | | |
| 1377 | USB Device | | |

INTELLIGENT UMBRELLA AND/OR ROBOTIC SHADING SYSTEM WITH ULTRA-LOW ENERGY TRANSCEIVERS

BACKGROUND

1. Field

The subject matter disclosed herein relates to a modular umbrella shading system utilizing Ultra Low Energy (ULE) transceivers to communicate with other ULE-enabled electronic and electro-mechanical devices.

2. Information/Background of the Invention

Conventional sun shading devices and systems usually are comprised of a supporting frame and an awning or fabric mounted on the supporting frame to cover a pre-defined area. For example, a conventional sun shading device or system may be an outdoor umbrella or an outdoor awning.

However, current sun shading devices or systems do not appear to be customizable to unique needs of consumers. Customers may have sun shading devices or systems installed in different size areas, in different environments, and require different features and/or options. In addition current sun shading devices and/or systems do not appear to be flexible, modifiable or able to adapt to changing environmental conditions. Further, many of the current sun shading devices appear to require manual operation in order to change inclination angle of the frame to more fully protect an individual from the environment. Further, the current sun shading devices appear to have one (or a single) awning or fabric piece that is mounted to an interconnected unitary frame. An interconnected unitary frame may not be able to be opened or deployed in many situations. Accordingly, alternative embodiments may be desired. Many devices and electronic devices (including outdoor devices and electronic devices) may not have access to wireless communication networks due to lack of connectivity or cost. Also, many wireless transceivers consume a large amount of power and are difficult to charge. Accordingly, a low-cost, low-power solution for outdoor devices is needed.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 13 illustrates a block diagram of a modular umbrella system according to embodiments;

DETAILED DESCRIPTION

Figure 1:
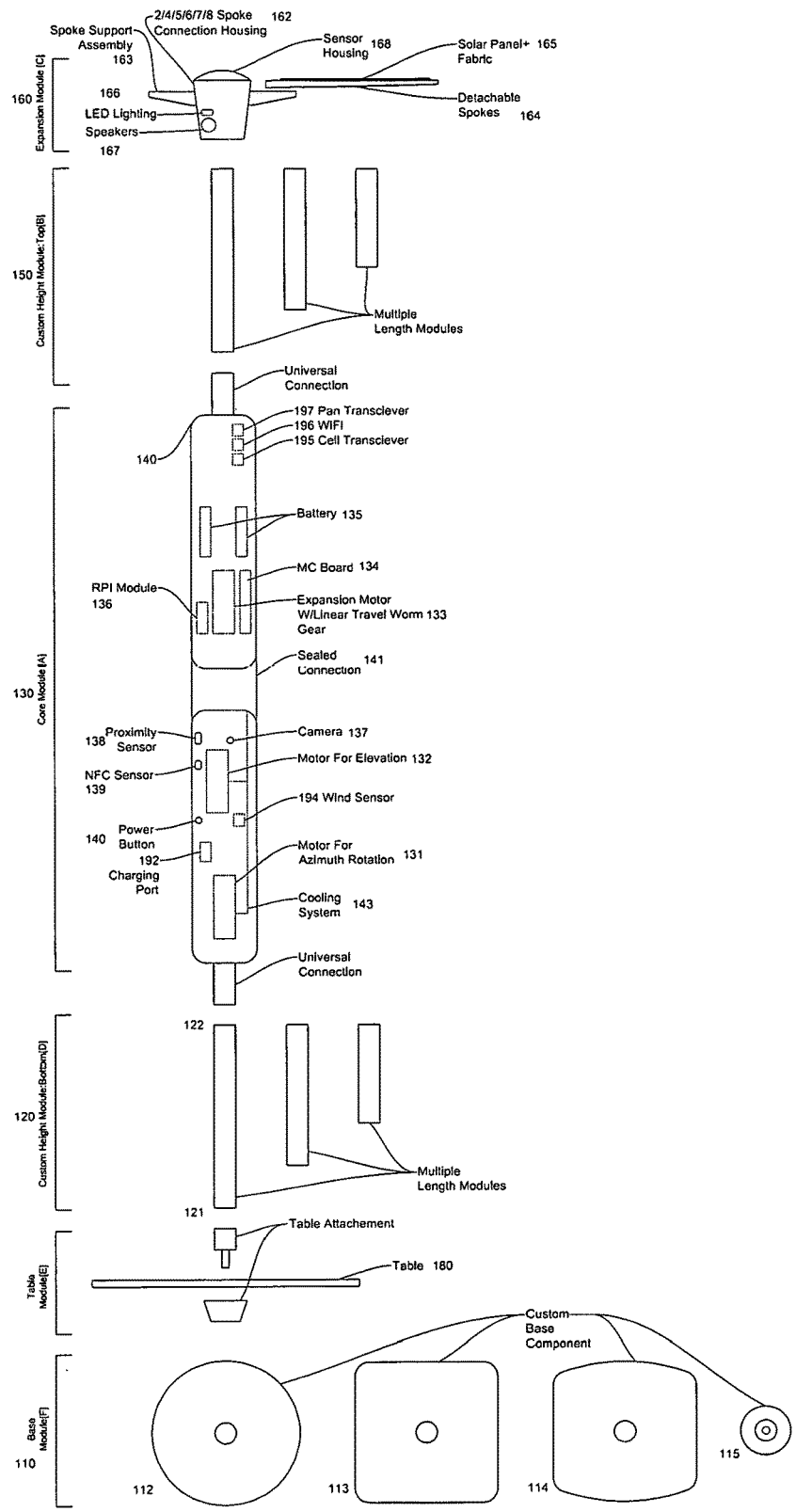
FIG. 1 illustrates a modular umbrella system according to embodiments.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

References throughout this specification to one implementation, an implementation, one embodiment, embodiments, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

A network may comprise two or more network and/or computing devices and/or may couple network and/or computing devices so that signal communications, such as in the form of signal packets, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments.

Computing devices, mobile computing devices, and/or network devices capable of operating as a server, or otherwise, may include, as examples, rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases, database servers, application data servers, proxy servers, and/or portions thereof, as appropriate.

It should be understood that for ease of description a network device may be embodied and/or described in terms of a computing device and/or mobile computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context. In a context of this application, if signals, instructions, and/or commands are transmitted from one component (e.g., a controller or processor) to another component (or assembly), it is understood that messages, signals, instructions, and/or commands may be transmitted directly to a component, or may pass through a number of other components on a way to a destination component. For example, a signal transmitted from a motor controller or processor to a motor (or other driving assembly) may pass through glue logic, an amplifier, an analog-to-digital converter, a digital-to-analog converter, another controller and/or processor, and/or an interface. Similarly, a signal communicated through a misting system may pass through an air conditioning and/or a heating module, and a signal communicated from any one or a number of sensors to a controller and/or processor may pass through a conditioning module, an analog-to-digital controller, and/or a comparison module, and/or a number of other electrical assemblies and/or components.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics.

Likewise, the term "based on," "based, at least in part on," and/or similar terms (e.g., based at least in part on) are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include for example, past, present and/or future mass storage, such as cloud storage, cloud server farms, database servers, application servers, and/or other forms of computing and/or device readable media, for example. A network may include a portion of the Internet, one or more local area networks (LANs), one or more wide area networks (WANs), wire-line type connections, one or more personal area networks (PANs), wireless type connections, one or more mesh networks, one or more cellular communication networks, other connections, or any combination thereof. Thus, a network may be worldwide in scope and/or extent.

The Internet and/or a global communications network may refer to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet may include local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices and/or computing devices may engage in an HTTP session through an exchange of appropriately compatible and/or compliant signal packets and/or frames. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. A content delivery server and/or the Internet and/or the Web, therefore, in this context, may comprise an service that organizes stored content, such as, for example, text, images, video, etc., through the use of hypermedia, for example. A HyperText Markup Language ("HTML"), Cascading Style Sheets ("CSS") or Extensible Markup Language ("XML"), for example, may be utilized to specify content and/or to specify a format for hypermedia type content, such as in the form of a file and/or an "electronic document," such as a Web page, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as 1) time of day at which an image was captured, latitude and longitude of an image capture device, such as a camera; 2) time and day of when a sensor reading (e.g., humidity, temperature, air quality, UV radiation) was received; and/or 3) operating conditions of one or more motors or other components or assemblies in a modular umbrella shading system. Claimed subject matter is intended to embrace meaningful, descriptive parameters in any format, so long as the one or more parameters comprise physical signals and/or states.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a modular umbrella shading system may comprise a computing device installed within or as part of a modular umbrella system, intelligent umbrella and/or intelligent shading charging system. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as a shading object computing device). In the context of this specification, therefore, a special purpose computer or a similar special purpose electronic computing device (e.g., a modular umbrella computing device) is capable of manipulating or transforming signals (electronic and/or magnetic) in memories (or components thereof), other storage devices, transmission devices sound reproduction devices, and/or display devices.

In an embodiment, a controller and/or a processor typically performs a series of instructions resulting in data manipulation. In an embodiment, a microcontroller or microprocessor may be a compact microcomputer designed to govern the operation of embedded systems in electronic devices, e.g., an intelligent, automated shading object or umbrella, modular umbrella, and/or shading charging systems, and various other electronic and mechanical devices coupled thereto or installed thereon. Microcontrollers may include processors, microprocessors, and other electronic components. Controller may be a commercially available processor such as an Intel Pentium, Motorola PowerPC, SGI MIPS, Sun UltraSPARC, or Hewlett-Packard PA-RISC processor, but may be any type of application-specific and/or specifically designed processor or controller. In an embodiment, a processor and/or controller may be connected to other system elements, including one or more memory devices, by a bus, a mesh network or other mesh components. Usually, a processor or controller, may execute an operating system which may be, for example, a Windows-based operating system (Microsoft), a MAC OS System X operating system (Apple Computer), one of many Linux-based operating system distributions, a portable electronic device operating system (e.g., mobile phone operating systems), microcomputer operating systems, and/or a UNIX operating systems. Embodiments are not limited to any particular implementation and/or operating system.

The specification may refer to a modular umbrella shading system (or an intelligent shading object or an intelligent umbrella) as an apparatus that provides shade and/or coverage to a user from weather elements such as sun, wind, rain, and/or hail. In embodiments, the modular umbrella shading system may be an automated intelligent shading object, automated intelligent umbrella, and/or automated intelligent shading charging system. The modular umbrella shading system and/or automated shading object or umbrella may also be referred to as a parasol, intelligent umbrella, sun shade, outdoor shade furniture, sun screen, sun shelter, awning, sun cover, sun marquee, brolly and other similar names, which may all be utilized interchangeably in this application. Shading objects and/or modular umbrella shading systems which also have electric vehicle charging capabilities may also be referred to as intelligent umbrella charging systems. These terms may be utilized interchangeably throughout the specification. The modular umbrella systems, shading objects, intelligent umbrellas, umbrella charging systems and shading charging systems described herein comprises many novel and non-obvious features, which are described in detail in the following patent applications, U.S. non-provisional application Ser. No. 15/273,669, filed Sep. 22, 2016, entitled "Mobile Computing Device Control of Shading Object, Intelligent Umbrella and Intelligent Shading Charging System," which is a continuation-in-part of U.S. non-provisional application Ser. No. 15/268,199, filed Sep. 16, 2016, entitled "Automatic Operation of Shading Object, Intelligent Umbrella and Intelligent Shading Charging System," which is a continuation-in-part of U.S. non-provisional application Ser. No. 15/242,970, filed Aug. 22, 2016, entitled "Shading Object, Intelligent Umbrella and Intelligent Shading Charging Security System and Method of Operation," which is a continuation-in-part of U.S. non-provisional application Ser. No. 15/225,838, filed Aug. 2, 2016, entitled "Remote Control of Shading Object and/or Intelligent Umbrella," which is a continuation-in-part of U.S. non-provisional patent application Ser. No. 15/219,292, filed Jul. 26, 2016, entitled "Shading Object, Intelligent Umbrella and Intelligent Shading Object Integrated Camera and Method of Operation," which is a continuation-in-part of U.S. non-provisional patent application Ser. No. 15/214,471, filed Jul. 20, 2016, entitled "Computer-Readable Instructions Executable by a Processor to Operate a Shading Object, Intelligent Umbrella and/or Intelligent Shading Charging System," which is a continuation-in-part of U.S. non-provisional patent application Ser. No. 15/212,173, filed Jul. 15, 2016, entitled "Intelligent Charging Shading Systems," which is a continuation-in-part of application of U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and is also a continuation-in-part of application of U.S. non-provisional patent application Ser. No. 15/160,822, filed May 20, 2016, entitled "Intelligent Shading Objects with Integrated Computing Device," both of which claim the benefit of U.S. provisional Patent Application Ser. No. 62/333,822, entitled "Automated Intelligent Shading Objects and Computer-Readable Instructions for Interfacing With, Communicating With and Controlling a Shading Object," filed May 9, 2016, the disclosures of which are all hereby incorporated by reference.

FIG. 1 illustrates a modular umbrella shading system according to embodiments. In embodiments, a modular umbrella system 100 comprises a base assembly or module 110, a first extension assembly or module 120, a core assembly module housing (or core umbrella assembly) 130, a second extension assembly or module 150, and an expansion sensor assembly or module (or an arm extension assembly or module) 160. In embodiments, a modular umbrella shading system 100 may not comprise a base assembly or module 110 and may comprise a table assembly or module 180 to connect to table tops, such as patio tables and/or other outdoor furniture. In embodiments, a table assembly or module 180 may comprise a table attachment and/or a table receptacle. In embodiments, a base module or assembly 110 may comprise a circular base component 112, a square or rectangular base component 113, a rounded edges base component 114, and/or a beach or sand base component 115. In embodiments, base components 112, 113, 114, and/or 115 may be interchangeable based upon a configuration required by an umbrella system and/or user. In embodiments, each of the different options for the base components 112, 113, 114, 115, and/or 180 may have a universal connector and/or receptacle to allow for easy interchangeability.

In embodiments, a first extension assembly or module 120 may comprise a shaft assembly having a first end 121 and a second end 122. In embodiments, a first end 121 may be detachably connectable and/or connected to a base assembly or module 110. In embodiments, a second end 122 may be detachably connected and/or connectable to a first end of a core umbrella assembly or module 130. In embodiments, a first end 121 and a second end 122 may have a universal umbrella connector. In other words, a connector may be universal within all modules and/or assemblies of a modular umbrella system to provide a benefit of allowing backwards capabilities with new versions of different modules and/or assemblies of a modular umbrella shading system. In embodiments, a first extension assembly or module 120 may have different lengths. In embodiments, different length first extension assemblies may allow a modular umbrella shading system to have different clearance heights between a base assembly or module 110 and/or a core umbrella assembly or module 130. In embodiments, a first extension assembly or module 110 may be a tube and/or a shell with channels, grooves and/or pathways for electrical wires and/or components and/or mechanical components. In embodiments, a first extension assembly 110 may be a shaft assembly having an inner core comprising channels, grooves and/or pathways for electrical wires, connectors and/or components and/or mechanical components.

In embodiments, a universal umbrella connector or connection assembly 124 may refer to a connection pair and/or connection assembly that may be uniform for all modules, components and/or assemblies of a modular umbrella system 100. In embodiments, having a universal umbrella connector or connection assembly 124 may allow interchangeability and/or backward compatibility of the various assemblies and/or modules of the modular umbrella system 100. In embodiments, for example, a diameter of all or most of universal connectors 124 utilized in a modular umbrella system may be the same. In embodiments, a universal connector or connection assembly 124 may be a twist-on connector. In embodiments, a universal connector 124 may be a drop in connector and/or a locking connector, having a male and female connector. In embodiments, a universal connector or connection assembly 124 may be a plug with another connector being a receptacle. In embodiments, universal connector 124 may be an interlocking plug receptacle combination. For example, universal connector 124 may be a plug and receptacle, jack and plug, flanges for connection, threaded plugs and threaded receptacles, snap fit connectors, adhesive or friction connectors. In embodiments, for example, universal connector or connection assembly 124 may be external connectors engaged with threaded internal connections, snap-fit connectors, push fit couplers. In embodiments, by having a universal connector or connection assembly 124 for joints or connections between a base module or assembly 110 and a first extension module or assembly 120, a first extension module or assembly 120 and a core assembly module or assembly 130, a core assembly module or assembly 130 and a second extension module or assembly 150, and/or a second extension module or assembly 150 and an expansion sensor module or assembly 160, an umbrella or shading object manufacturer may not need to provide additional parts for additional connectors for attaching, coupling or connecting different modules or assemblies of a modular umbrella shading system. In addition, modules and/or assemblies may be upgraded easily because one module and/or assembly may be switched out of a modular umbrella system without having to purchase or procure additional modules because of the interoperability and/or interchangeability.

In embodiments, a core umbrella assembly or module 130 may be positioned between a first extension assembly or module 120 and a second extension assembly or module 150. In embodiments, core umbrella assembly or module 130 may be positioned between a base assembly or module 110 and/or an expansion and sensor module or assembly 160. In embodiments, a core umbrella assembly or module 130 may comprise an upper core assembly 140, a core assembly connector or mid-section 141 and/or a lower core assembly 142. In embodiments, a core assembly connector 141 may be a sealer or sealed connection to protect a modular umbrella system from environmental conditions. In embodiments, a core umbrella assembly or module 130 may comprise two or more motors or motor assemblies. Although the specification may refer to a motor, a motor may be a motor assembly with a motor controller, a motor, a stator, a rotor and/or a drive/output shaft. In embodiments, a core umbrella assembly 130 may comprise an azimuth rotation motor 131, an elevation motor 132, and/or a spoke expansion/retraction motor 133. In embodiments, an azimuth rotation motor 131 may cause a core umbrella assembly 130 to rotate clockwise or counterclockwise about a base assembly or module 110 or a table connection assembly 180. In embodiments, an azimuth rotation motor 131 may cause a core umbrella assembly 130 to rotate about an azimuth axis. In embodiments, a core umbrella assembly or module 130 may rotate up to 360 degrees with respect to a base assembly or module 130.

In embodiments, an elevation motor 132 may cause an upper core assembly 140 to rotate with respect to a lower core assembly 142. In embodiments, an elevation motor 130 may rotate an upper core assembly 140 between 0 to 90 degrees with respect to the lower core assembly 142. In embodiments, an elevation motor 130 may rotate an upper module or assembly 140 between 0 to 30 degrees with respect to a lower assembly or module 142. In embodiments, an original position may be where an upper core assembly 140 is positioned in line and above the lower core assembly 142, as is illustrated in FIG. 1.

In embodiments, a spoke expansion motor 133 may be connected to an expansion and sensor assembly module 160 via a second extension assembly or module 150 and cause spoke or arm support assemblies in a spoke expansion sensor assembly module 160 to deploy or retract outward and/or upward from an expansion sensor assembly module 160. In embodiments, an expansion extension assembly module 160 may comprise a rack gear and spoke connector assemblies (or arms). In embodiments, a spoke expansion motor 133 may be coupled and/or connected to a hollow tube via a gearing assembly, and may cause a hollow tube to move up or down (e.g., in a vertical direction). In embodiments, a hollow tube may be connected and/or coupled to a rack gear, which may be connected and/or coupled to spoke connector assemblies. In embodiments, movement of a hollow tube in a vertical direction may cause spoke assemblies and/or arms to be deployed and/or retracted. In embodiments, spoke connector assemblies and/or arms may have a corresponding and/or associated gear at a vertical rack gear.

In embodiments, a core assembly or module 130 may comprise motor control circuitry 134 (e.g., a motion control board 134) that controls operation of an azimuth motor 131, an elevation motor 132 and/or an expansion motor 133, along with other components and/or assemblies. In embodiments, the core assembly module 130 may comprise one or more batteries 135 (e.g., rechargeable batteries) for providing power to electrical and mechanical components in the modular umbrella system 100. For example, one or more batteries 135 may provide power to motion control circuitry 134, an azimuth motor 131, an expansion motor 133, an elevation motor 132, a camera 137, a proximity sensor 138, a near field communication (NFC) sensor 138. In embodiments, one or more batteries 135 may provide power to an integrated computing device 136, although in other embodiments, an integrated computing device 136 may also comprise its own battery (e.g., rechargeable battery).

In embodiments, the core assembly 130 may comprise a separate and/or integrated computing device 136. In embodiments, a separate computing device 136 may comprise a Raspberry Pi computing device, other single-board computers and/or single-board computing device. Because a modular umbrella shading system has a limited amount of space, a single-board computing device is a solution that allows for increased functionality without taking up too much space in an interior of a modular umbrella shading system. In embodiments, a separate computing device 136 may handle video, audio and/or image editing, processing, and/or storage for a modular umbrella shading system 100 (which are more data intensive functions and thus require more processing bandwidth and/or power). In embodiments, an upper core assembly 140 may comprise one or more rechargeable batteries 135, a motion control board (or motion control circuitry) 134, a spoke expansion motor 133 and/or a separate and/or integrated computing device 136.

In embodiments, a core assembly connector/cover 141 may cover and/or secure a connector between an upper core assembly 140 and a lower core assembly 142. In embodiments, a core assembly connector and/or cover 141 may provide protection from water and/or other environmental conditions. In other words, a core assembly connector and/or cover 141 may make a core assembly 130 waterproof and/or water resistant and in other environments, may protect an interior of a core assembly from sunlight, cold or hot temperatures, humidity and/or smoke. In embodiments, a core assembly connector/cover 141 may be comprised of a rubber material, although a plastic and/or fiberglass material may be utilized. In embodiments, a core assembly connector/cover 141 may be comprised of a flexible material, silicone, and/or a membrane In embodiments, a core assembly connector/cover 141 may be circular and/or oval in shape and may have an opening in a middle to allow assemblies and/or components to pass freely through an interior of a core assembly connector or cover 141. In embodiments, a core assembly connector/cover 141 may adhere to an outside surface of an upper core assembly 140 and a lower core assembly 142. In embodiments, a core assembly connector/cover 141 may be connected, coupled, fastened and/or have a grip or to an outside surface of the upper core assembly 140 and the lower core assembly 142. In embodiments, a core assembly connector and/or cover 141 may be connected, coupled, adhered and/or fastened to a surface (e.g., top or bottom surface) of an upper core assembly and/or lower core assembly 142. In embodiments, a core assembly connector/cover 141 may cover a hinging assembly and/or reparation point, springs, and wires that are present between an upper core assembly 140 and/or a lower core assembly 142.

In embodiments, a core assembly or module 130 may comprise one or more cameras 137. In embodiments, one or more cameras 137 may be capture images, videos and/or sound of an area and/or environment surrounding a modular umbrella system 100. In embodiments, a lower core assembly 142 may comprise one or more cameras 137. In embodiments, a camera 137 may only capture sound if a user selects a sound capture mode on a modular umbrella system 100 (e.g., via a button and/or switch) or via a software application controlling operation of a modular umbrella system (e.g., a microphone or recording icon is selected in a modular umbrella system software application).

In embodiments, a core assembly 130 may comprise a power button to manually turn on or off power to components of a modular umbrella system. In embodiments, a core assembly or module 130 may comprise one or more proximity sensors 138. In embodiments, one or more proximity sensors 138 may detect whether or not an individual and/or subject may be within a known distance from a modular umbrella system 100. In embodiments, in response to a detection of proximity of an individual and/or subject, a proximity sensor 138 may communicate a signal, instruction, message and/or command to motion control circuitry (e.g., a motion control PCB 134) and/or a computing device 136 to activate and/or deactivate assemblies and components of a modular umbrella system 100. In embodiments, a lower core assembly 142 may comprise a proximity sensor 138 and a power button. For example, a proximity sensor 138 may detect whether an object is within proximity of a modular umbrella system and may communicate a message to a motion control PCB 134 to instruct an azimuth motor 131 to stop rotating a base assembly or module.

In embodiments, a core assembly or module 130 may comprise a near-field communication (NFC) sensor 139. In embodiments, a NFC sensor 139 may be utilized to identify authorized users of a modular umbrella shading system 100. In embodiments, for example, a user may have a mobile computing device with a NFC sensor which may communicate, pair and/or authenticate in combination with a modular umbrella system NFC sensor 139 to provide user identification information. In embodiments, a NFC sensor 139 may communicate and/or transmit a signal, message, command and/or instruction based on a user's identification information to computer-readable instructions resident within a computing device and/or other memory of a modular umbrella system to verify a user is authenticated and/or authorized to utilize a modular umbrella system 100.

In embodiments, a core assembly or module 130 may comprise a cooling system and/or heat dissipation system 143. In embodiments, a cooling system 143 may be one or more channels in an interior of a core assembly or module 130 that direct air flow from outside a modular umbrella system across components, motors, circuits and/or assembles inside a core assembly 130. For example, one or more channels and/or fins may be coupled and/or attached to components, motors and/or circuits, and air may flow through channels to fins and/or components, motors and/or circuits. In embodiments, a cooling system 143 may lower operating temperatures of components, motors, circuits and/or assemblies of a modular umbrella system 100. In embodiments, a cooling system 143 may also comprise one or more plates and/or fins attached to circuits, components and/or assemblies and also attached to channels to lower internal operating temperatures. In embodiments, a cooling system 143 may also move hot air from electrical and/or mechanical assemblies to outside a core assembly. In embodiments, a cooling system 143 may be fins attached to or vents in a body of a core assembly 130. In embodiments, fins and/or vents of a cooling system 143 may dissipate heat from electrical and mechanical components and/or assemblies of the core module or assembly 130.

In embodiments, a separate, detachable and/or connectable skin may be attached, coupled, adhered and/or connected to a core module assembly 130. In embodiments, a detachable and/or connectable skin may provide additional protection for a core assembly module against water, smoke, wind and/or other environmental conditions and/or factors. In embodiments, a skin may adhere to an outer surface of a core assembly. 130. In embodiments, a skin may have a connector on an inside surface of the skin and core assembly 130 may have a mating receptacle on an outside surface. In embodiments, a skin may magnetically couple to a core assembly 130. In embodiments, a skin may be detachable and removable from a core assembly so that a skin may be changed for different environmental conditions and/or factors. In embodiments, a skin may connect to an entire core assembly. In embodiments, a skin may connect to portions of an upper core assembly 140 and/or a lower core assembly 142. In embodiments, a skin may not connect to a middle portion of a core assembly 130 (or a core assembly cover connector 141). In embodiments, a skin may be made of a flexible material to allow for bending of a modular umbrella system 100. In embodiments, a base assembly 110, a first extension assembly 120, a core module assembly 130, a second extension assembly 140 and/or an arm extension and sensor assembly 160 may also comprise one or more skin assemblies. In embodiments, a skin assembly may provide a cover for a majority of all of a surface area one or more of the base assembly, first extension assembly 120, core module assembly 130, second extension assembly 150 and/or arm extension sensor assembly 160. In embodiments, a core assembly module 130 may further comprise channels on an outside surface. In embodiments, a skin assembly may comprise two pieces. In embodiments, a skin assembly may comprise edges and/or ledges. In embodiments, edges and/or ledges of a skin assembly may be slid into channels of a core assembly module 130. In embodiments, a base assembly 110, a first extension assembly 120, a second extension assembly 140 and/or an arm expansion sensor assembly 160 may also comprise an outer skin assembly. In embodiments, skin assemblies for these assemblies may be uniform to present a common industrial design. In embodiments, skin assemblies may be different if such as a configuration is desired by a user. In embodiments, skin assemblies may be comprise of a plastic, a hard plastic, fiberglass, aluminum, other light metals (including aluminum), and/or composite materials including metals, plastic, wood. In embodiments, a core assembly module 130, a first extension assembly 120, a second extension assembly 150, an arm expansion sensor assembly 160, and/or a base assembly 110 may be comprised of aluminum, light metals, plastic, hard plastics, foam materials, and/or composite materials including metals, plastic, wood. In embodiments, a skin assembly may be provide protection from environmental conditions (such as sun, rain, and/or wind).

In embodiments, a second extension assembly 150 connects and/or couples a core assembly module 130 to an expansion assembly sensor module (and/or arm extension assembly module) 160. In embodiments, an expansion sensor assembly module 160 may have universal connectors and/or receptacles on both ends to connect or couple to universal receptacles and/or connectors, on the core assembly 130 and/or expansion sensor assembly module 160. FIG. 1 illustrates that a second extension assembly or module 150 may have three lengths. In embodiments, a second extension assembly 150 may have one of a plurality of lengths depending on how much clearance a user and/or owner may like to have between a core assembly module 130 and spokes of an expansion sensor assembly or module 160. In embodiments, a second extension assembly or module 150 may comprise a hollow tube and/or channels for wires and/or other components that pass through the second extension assembly or module 150. In embodiments, a hollow tube 249 may be coupled, connected and/or fixed to a nut that is connected to, for example, a threaded rod (which is part of an expansion motor assembly). In embodiments, a hollow tube 249 may be moved up and down based on movement of the threaded rod. In embodiments, a hollow tube in a second extension assembly may be replaced by a shaft and/or rod assembly.

In embodiments, an expansion and sensor module 160 may be connected and/or coupled to a second extension assembly or module 150. In embodiments, an expansion and sensor assembly or module 160 may be connected and/or coupled to a second extension assembly or module 150 via a universal connector. In embodiments, an expansion and sensor assembly or module 160 may comprise an arm or spoke expansion sensor assembly 162 and a sensor assembly housing 168. In embodiments, an expansion and sensor assembly or module 160 may be connected to a hollow tube 249 and thus coupled to a threaded rod. In embodiments, when a hollow tube moves up and down, an arm or spoke expansion assembly 162 opens and/or retracts, which causes spokes/blades 164 of an arm extension assembly 163. In embodiments, arms, spokes and/or blades 164 may detachably connected to the arm or spoke support assemblies 163.

In embodiments, an expansion and sensor assembly module 160 may have a plurality of arms, spokes or blades 164 (which may be detachable or removable). Because the umbrella system is modular and/or adjustable to meet needs of user and/or environment, an arm or spoke expansion assembly 162 may not have a set number of arm, blade or spoke support assemblies 163. In embodiments, a user and/or owner may determine and/or configure a modular umbrella system 100 with a number or arms, spokes, or blades extensions 163 (and thus detachable spokes, arms and/or blades 164) necessary for a certain function and attach, couple and/or connect an expansion sensor assembly or module 160 with a spoke expansion assembly 162 with a desired number of blades, arms or spoke connections to a second extension module or assembly 150 and/or a core module assembly or housing 130. Prior umbrellas or shading systems utilize a set or established number of ribs and were not adjustable or configurable. In contrast, a modular umbrella system 100 described herein has an ability to have a detachable and adjustable expansion sensor module 162 comprising an adjustable number of arm/spoke/blade support assemblies or connections 163 (and therefore a flexible and adjustable number of arms/spokes/blades 164), which provides a user with multiple options in providing shade and/or protection. In embodiments, expansion and sensor expansion module 160 may be detachable or removable from a second extension module 150 and/or a core assembly module 130 and also one or more spokes, arms and/or assemblies 164 may be detachable or removable from arm or spoke support assemblies 163. Therefore, depending on the application or use, a user, operator and/or owner may detachably remove an expansion and sensor module or assembly 160 having a first number of arm/blade/spoke support assemblies 163 and replace it with a different expansion sensor module or assembly 160 having a different number of arm/blade/spoke support assemblies 163.

In embodiments, arms, blades and/or spokes 164 may be detachably connected and/or removable from one or more arm support assemblies 163. In embodiments, arms, blades, and/or spokes 164 may be snapped, adhered, coupled and/or connected to associated arm support assemblies 163. In embodiments, arms, blades and/or spokes 164 may be detached, attached and/or removed before deployment of the arm extension assemblies 163.

In embodiments, a shading fabric 165 may be connected, attached and/or adhered to one or more arm extension assemblies 163 and provide shade for an area surrounding, below and/or adjacent to a modular umbrella system 100. In embodiments, a shading fabric (or multiple shading fabrics) may be connected, attached, and/or adhered to one or more spokes, arms and/or blades 164. In embodiments, a shading fabric or covering 165 may have integrated therein, one or more solar panels and/or cells (not shown). In embodiments, solar panels and/or cells may generate electricity and convert the energy from a solar power source to electricity. In embodiments, solar panels may be coupled to a shading power charging system (not shown). In embodiments, one or more solar panels and/or cells may be positioned on top of a shading fabric 165. In embodiments, one or more solar panels and/or cells may be connected, adhered, positioned, attached on and/or placed on a shading fabric 165.

In embodiments, an expansion sensor assembly or module 160 may comprise one or more audio speakers 167. In embodiments, an expansion sensor assembly or module 160 may further comprise an audio/video transceiver. In embodiments, a core assembly 130 may comprise and/or house an audio/video transceiver (e.g., a Bluetooth or other PAN transceiver, such as Bluetooth transceiver 197). In embodiments, an expansion sensor assembly or module 160 may comprise an audio/video transceiver (e.g., a Bluetooth and/or PAN transceiver) In embodiments, an audio/video transceiver in an expansion sensor assembly or module 160 may receive audio signals from an audio/video transceiver 197 in a core assembly 130, convert to an electrical audio signal and reproduce the sound on one or more audio speakers 167, which projects sound in an outward and/or downward fashion from a modular umbrella system 100. In embodiments, one or more audio speakers 167 may be positioned and/or integrated around a circumference of an expansion sensor assembly or module 160.

In embodiments, an expansion sensor assembly or module 160 may comprise one or more LED lighting assemblies 166. In embodiments, one or more LED lighting assemblies 166 may comprise bulbs and/or LED lights and/or a light driver and/or ballast. In embodiments, an expansion sensor assembly or module 160 may comprise one or more LED lighting assemblies positioned around an outer surface of the expansion sensor assembly or module 160. In embodiments, one or more LED lighting assemblies 166 may drive one or more lights. In embodiments, a light driver may receive a signal from a controller or a processor in a modular umbrella system 100 to activate/deactivate LED lights. The LED lights may project light into an area surrounding a modular umbrella system 100. In embodiments, one or more lighting assemblies 166 may be recessed into an expansion or sensor module or assembly 160.

In embodiments, an arm expansion sensor housing or module 160 may also comprise a sensor housing 168. In embodiments, a sensor housing 168 may comprise one or more environmental sensors, one or more telemetry sensors, and/or a sensor housing cover. In embodiments, one or more environmental sensors may comprise one or more air quality sensors, one or more UV radiation sensors, one or more digital barometer sensors, one or more temperature sensors, one or more humidity sensors, and/or one or more wind speed sensors. In embodiments, one or more telemetry sensors may comprise a GPS/GNSS sensor and/or one or more digital compass sensors. In embodiments, a sensor housing 168 may also comprise one or more accelerometers and/or one or more gyroscopes. In embodiments, a sensor housing 168 may comprise sensor printed circuit boards and/or a sensor cover (which may or may not be transparent). In embodiments, a sensor printed circuit board may communicate with one or more environmental sensors and/or one or more telemetry sensors (e.g., receive measurements and/or raw data), process the measurements and/or raw data and communicate sensor measurements and/or data to a motion control printed circuit board (e.g., controller) and/or a computing device (e.g., controller and/or processor). In embodiments, a sensor housing 168 may be detachably connected to an arm connection housing/spoke connection housing to allow for different combinations of sensors to be utilized for different umbrellas. In embodiments, a sensor cover of a sensor housing 168 may be clear and/or transparent to allow for sensors to be protected from an environment around a modular umbrella system. In embodiments, a sensor cover may be moved and/or opened to allow for sensors (e.g., air quality sensors to obtain more accurate measurements and/or readings). In embodiments, a sensor printed circuit board may comprise environmental sensors, telemetry sensors, accelerometers, gyroscopes, processors, memory, and/or controllers in order to allow a sensor printed circuit board to receive measurements and/or readings from sensors, process received sensor measurements and/or readings, analyze sensor measurements and/or readings and/or communicate sensor measurements and/or readings to processors and/or controllers in a core assembly or module 130 of a modular umbrella system 100.

Figure 2:
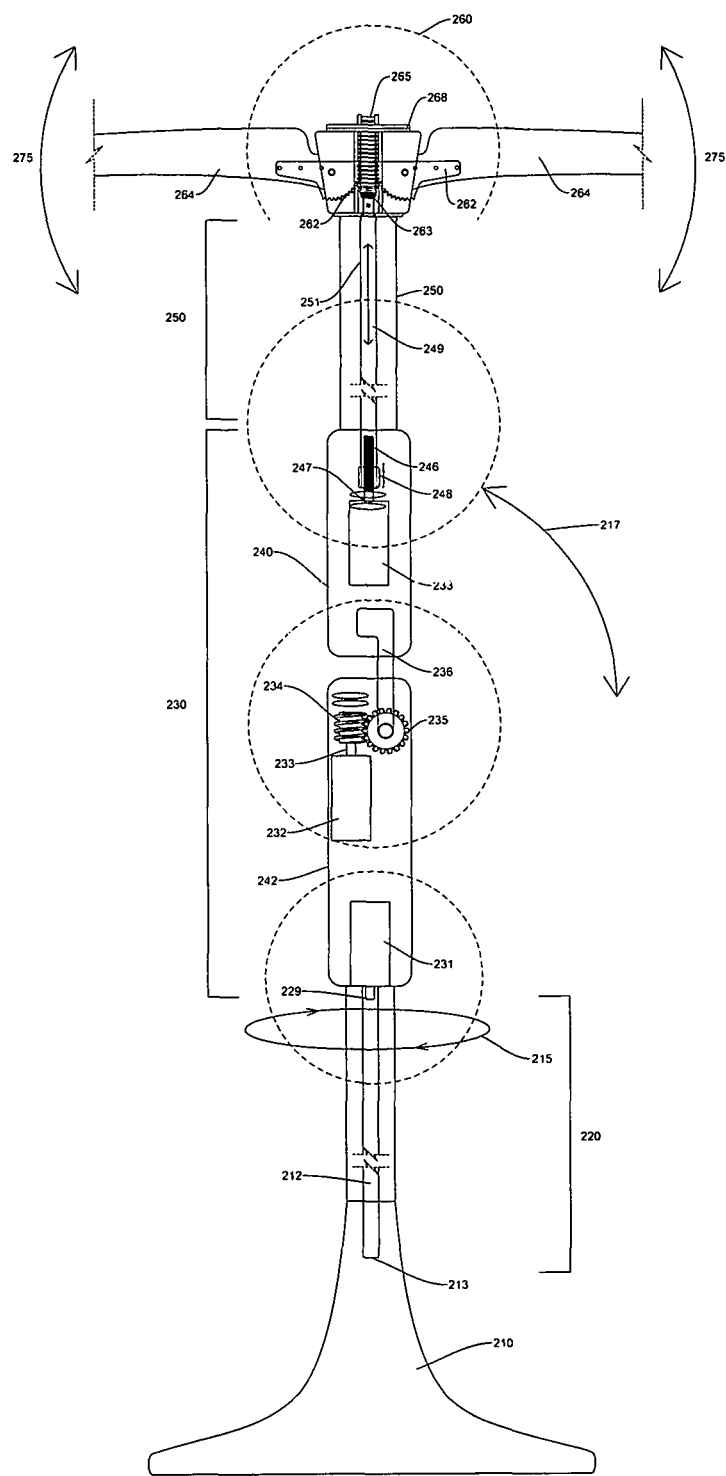
FIG. 2 illustrates a cut-away drawing of mechanical assemblies in a modular umbrella system according to embodiments.

FIG. 2 illustrates a cut-away drawing of mechanical assemblies in a modular umbrella system according to embodiments. In embodiments, a modular umbrella shading assembly 200 may comprise a base assembly 210, a first extension assembly 220, a core assembly or module 230, a base receptacle 213, a force transfer shaft 212, an azimuth motor 231, and/or an azimuth motor shaft 229. In embodiments, a first extension assembly 220 and a core assembly module 230 may rotate in a clockwise or counterclockwise manner direction (as illustrated by reference number 215) with respect to a base assembly 210. In embodiments, an azimuth motor 231 comprises an azimuth motor shaft 229 that may rotate in response to activation and/or utilization of an azimuth motor 231. In embodiments, an azimuth motor shaft 229 may be mechanically coupled (e.g., a gearing system, a friction-based system, etc.) to a force transfer shaft 212. In embodiments, an azimuth motor shaft 229 may rotate in a clockwise and/or counterclockwise direction and in response, a force transfer shaft 212 may rotate in a same and/or opposite direction. In embodiments, a force transfer shaft 212 may pass through a first extension assembly 220 and may be mechanically coupled to a base receptacle 213 in a base assembly 210. In response to, or due to, rotation of force transfer shaft 212 in a base receptacle 213, a first extension assembly 220 and/or a core assembly 230 may rotate with respect to the base assembly 210.

In embodiments, a modular umbrella system 200 may comprise a core assembly 230 which may comprise a lower core assembly 242 and an upper core assembly 240. In embodiments, a lower core assembly 242 may comprise an elevation motor 232, an elevation motor shaft 233, a worm gear 234, and/or a speed reducing gear 235. In embodiments, a speed reducing gear 235 may be connected with a connector to a connection plate 236. In embodiments, a lower core assembly 242 may be mechanically coupled to an upper core assembly 240 via a connection plate 236. In embodiments, a connection plate 236 may be connected to an upper core assembly 240 via a connector and/or fastener. In embodiments, an elevation motor 232 may cause rotation (e.g., clockwise or counterclockwise) of an elevation motor shaft 233, which may be mechanically coupled to a worm gear 234. In embodiments, rotation of an elevation motor shaft 233 may cause rotation (e.g., clockwise or counterclockwise) of a worm gear 234. In embodiments, a worm gear 234 may be mechanically coupled to a speed reducing gear 235. In embodiments, rotation of a worm gear 234 may cause rotation of a speed reducing gear 235 via engagement of channels of a worm gear 234 with teeth of a speed reducing gear 235. In embodiments, a sped reducing gear 235 may be mechanically coupled to a connection plate 236 to an upper core assembly 240 via a fastener or connector. In embodiments, rotation of a speed reducing gear 235 may cause a connection plate 236 (and/or an upper core assembly 240) to rotate with respect to a lower core assembly 242 in a clockwise or counterclockwise direction as is illustrated by reference number 217. In embodiments, an upper core assembly 240 may rotate with respect to the lower core assembly 242 approximately 90 degrees via movement of the connection plate. In embodiments, an upper core assembly 240 may rotate approximately 0 to 30 degrees with respect to the lower core assembly 242 via movement of the connection plate.

In embodiments, an upper core assembly 240 may comprise an extension expansion motor 233 and an extension expansion motor shaft 247. In embodiments, an expansion motor 233 may be activated and may rotate an extension expansion motor shaft 247. In embodiments, an expansion motor shaft 247 may be mechanically coupled to a threaded rod 246 which may be mechanically couple to a travel nut 248 (e.g., a nut may be screwed onto the threaded rod 246). In embodiments, an expansion motor shaft 247 may rotate a threaded rod 246 which may cause a travel nut 248 to move in a vertical direction (e.g., up or down). In embodiments, a travel nut 248 may be mechanically coupled to a connection rod 249. In embodiments, a travel nut 248 may move in vertical direction (e.g., up or down) which may cause a connection rod 249 to move in a vertical direction (e.g., up or down) as is illustrated by reference number 251. In embodiments, a connection rod 249 may be partially positioned and/or located within an upper core assembly 240 and may be partially positioned within a second extension assembly 250. In embodiments, a connection rod 249 and/or a second extension assembly 250 may have varying lengths based on a desired height of a modular umbrella system 200. In embodiments, a connection rod 249 may be mechanically coupled to an expansion assembly shaft 263.

In embodiments, an arm expansion sensor housing or module 260 may comprise an expansion assembly shaft 263, a rack gear 265, one or more spoke/arm expansion assemblies 262, and a sensor module 268. In embodiments, an expansion assembly shaft or hollow tube 263 may be mechanically coupled to a rack gear 265. In embodiments, movement of an expansion shaft or hollow tube 263 up or down in a vertical direction may move a rack gear 265 in a vertical direction (e.g., up or down). In embodiments, one or more spoke expansion assemblies 262 may be mechanically coupled to a rack gear 265. In embodiments, gears on one or more spoke/arm expansion assemblies 262 may engage channels in a rack gear 265. In embodiments, a rack gear 265 may move in a vertical direction (e.g., up or down) which may cause movement of one or more spoke/arm expansion assemblies 262 from an open position (as is illustrated in FIG. 2) to a closed position (or vice versa from a closed position to an open position). In embodiments, movement of one or more spoke/arm expansion assemblies 262 is illustrated by reference number 275 in FIG. 2. In embodiments, spokes/arms 264 may be mechanically coupled to spoke expansion assemblies 262. In embodiments, one or more spokes/arms 264 may be detachable from one or more spoke/arm expansion assemblies 262.

Prior art shading systems utilizing at the most one motor to move a shade into a desired position. Shading systems do not utilize more than one motor and this limits movement of a shade system to track the sun and provide protection to users of a shading system. Accordingly, utilizing of two or more motors in a shading system allow movement of a shading element (or multiple shading elements) to track the sun, to protect a user from other weather elements and/or to capture a large amount of solar energy. These are improvements other shading systems which cannot move and/or rotate about more than one axis. Although, FIGS. 1 and 2 describe a shading system with three motors, additional motors may be utilized to, for example, rotate a shading system (utilizing a motor in a base system next to a surface), additional motors to deploy additional accessories within a shading system core assembly module (e.g., lighting assemblies, wind turbines, camera mounts), or additional motors to deploy accessories within an expansion and sensor assembly module (e.g., deploy sensors, deploy solar panels, move speakers to different positions or orientations and/or move lighting assemblies to different positions and/or orientations).

Figure 3:
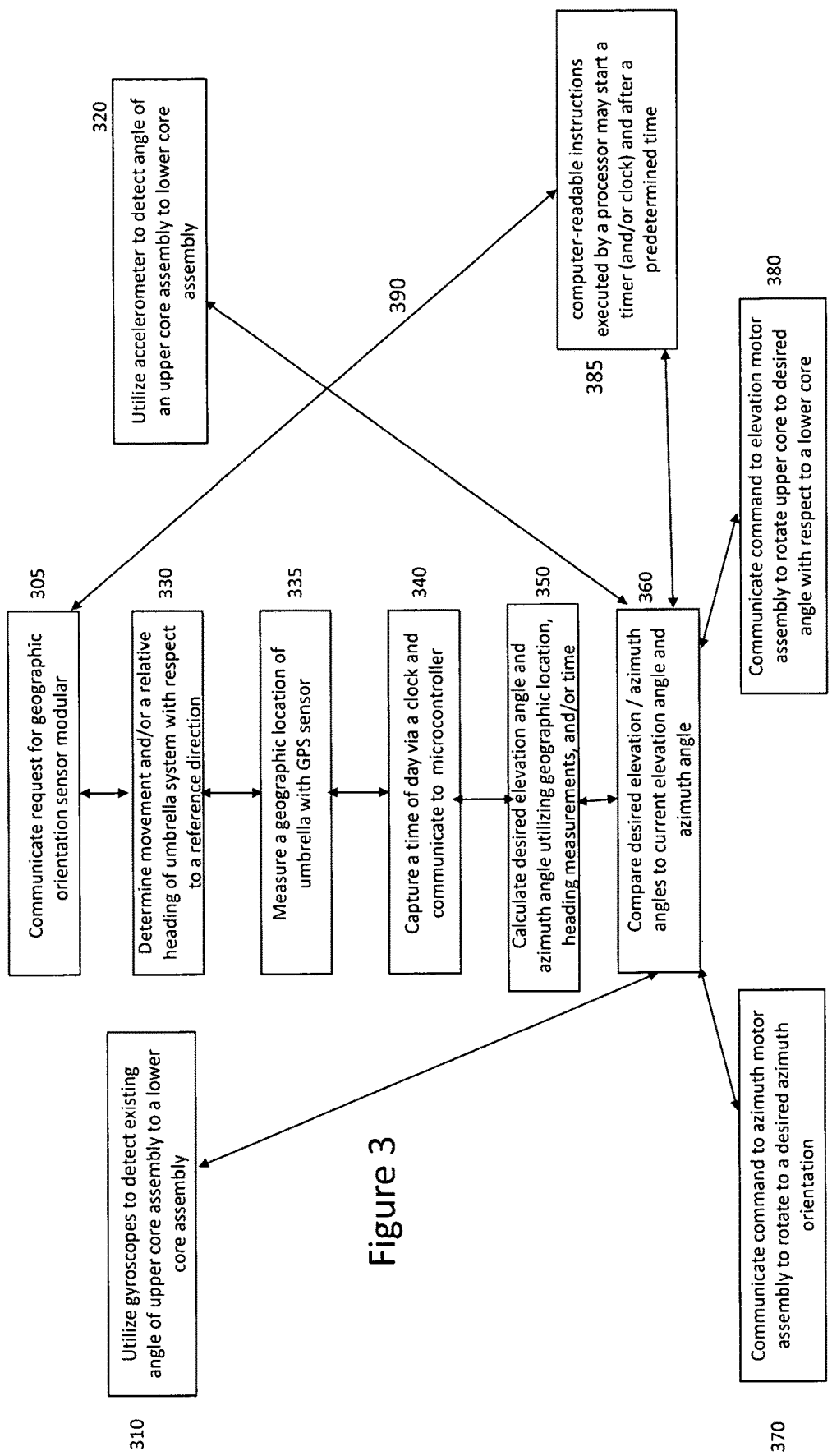
FIG. 3 illustrates a method of a modular umbrella system utilizing directional measuring devices according to embodiments.
Figure 4:
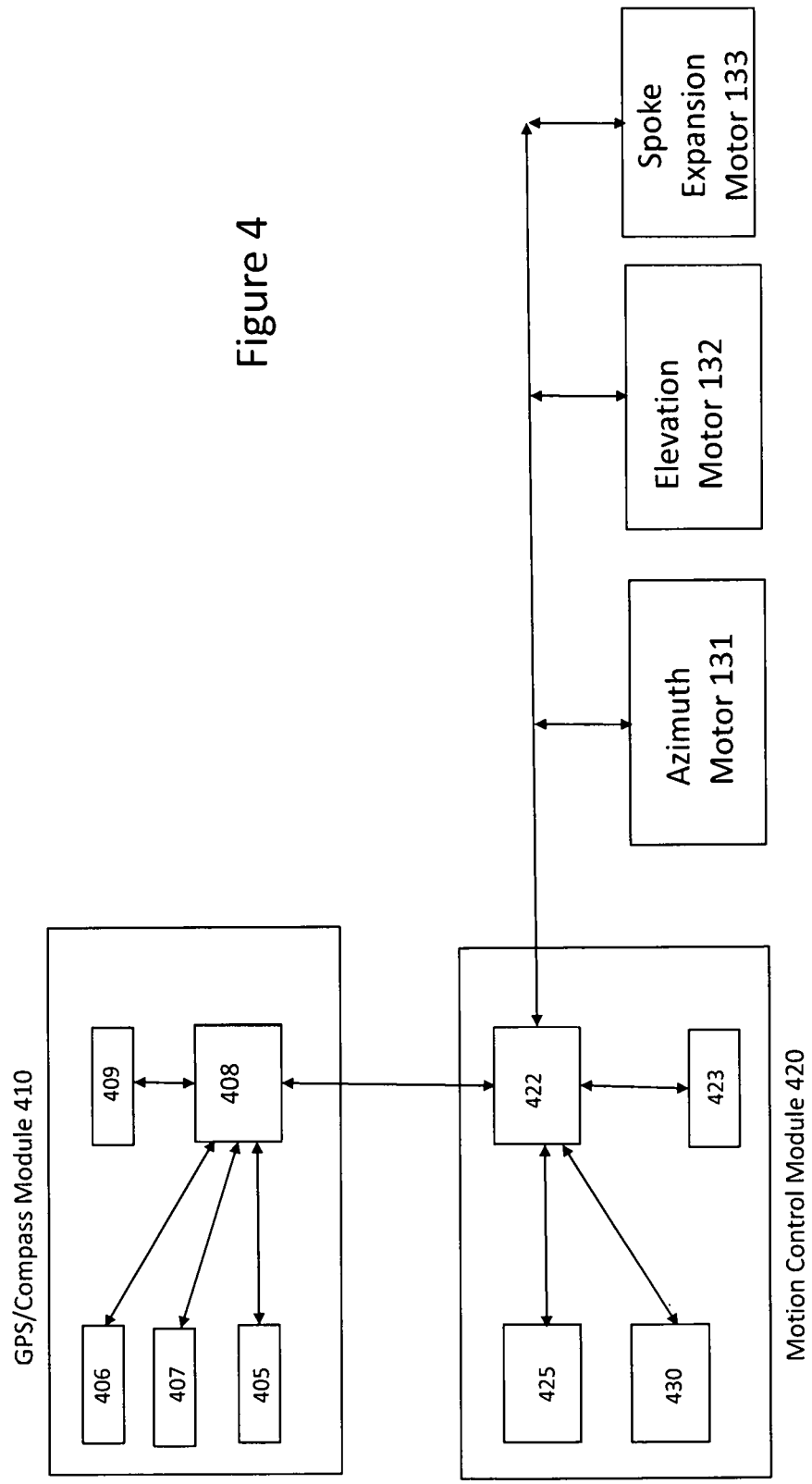
FIG. 4 illustrates a block diagram of a modular umbrella system comprising directional measuring devices according to embodiments.

FIG. 3 illustrates a method of a modular umbrella system utilizing directional measuring devices according to embodiments. FIG. 4 illustrates a block diagram of a modular umbrella system comprising directional measuring devices according to embodiments. In embodiments, a core housing 130 may also comprise a gyroscope 425 and an accelerometer 430. In embodiments, an upper core housing 140 may comprise a gyroscope and/or an accelerometer. In embodiments, as illustrated in FIG. 4, a motion control module 420 (e.g., a motion control PCB) in a modular core housing 130 may comprise one or more processors/controllers 422, one or more memory modules 423, one or more accelerometers 425 and/or one or more gyroscopes 430. In embodiments, directional measuring devices may refer to accelerometers, gyroscopes, compasses, magnetometers and/or GPS devices. In embodiments, a sensor module 410 may comprise a compass, a digital compass and/or a magnetometer 406, one or more GPS transceivers 405, one or more clocks 407, one or more microcontroller/processor 408, and/or one or more memory modules 409.

In embodiments, a motion control module 420 may request an initial desired orientation for different assemblies and/or components of a modular umbrella shading system and communicate 305 such directional request to a sensor module 410. In embodiments, one or more gyroscopes 430 may be utilized to determine, calculate and/or detect 310 an angle of an upper core assembly with respect to a lower core assembly (e.g., determine a current elevation of a modular umbrella system). In embodiments, one or more accelerometers may also be utilized along with one or more gyroscopes to determine, calculate and/or detect 320 an angle of an upper core assembly.

In embodiments, a motion control module 420 may communicate the directional request to a sensor extension module 410. In embodiments, a directional measuring device (e.g., compass and/or magnetometer 406) may determine 330 movement and/or a relative position of a modular umbrella shading system with respect from a reference direction. In embodiments, for example, a directional measuring device (e.g., compass, digital compass and/or magnetometer 406) may determine relative movement and/or a relative position with respect to true north. In embodiments, for example, a compass and/or a digital compass may determine movement and/or a relative position with respect to true north. In embodiments, such as illustrated in FIG. 4, these measurements may be referred to as heading measurements. In embodiments, a directional measuring device may communicate and/or transfer heading measurements to a microcontroller 408, where these heading measurements may be stored in one or more memory modules 409.

In embodiments, in response to a directional orientation request, a GPS transceiver 405 may measure a geographic location of a modular umbrella system and may communicate 335 such geographic location measurement to a microcontroller 408, which may transfer these heading measurements into one or more memory modules 409. In embodiments, a GPS transceiver 405 may determine latitude and/or longitude coordinates and communicate such latitude and/or longitude coordinates to a microcontroller 408. In embodiments, a clock 407 may capture a time of day and communicate and/or transfer 340 such time measurement to a microcontroller 408, which may store the time measurement in one or more memory modules 409.

In embodiments, instructions stored in a memory of an extension assembly and/or sensor module 410 and executable by a microcontroller 408 in the extension assembly and/or sensor module 410 may include algorithms and/or processes for determining and/or calculating a desired azimuth and/or orientation of a modular umbrella system depending on a time of day. In alternative embodiments, a microcontroller 408 in an extension assembly and/or sensor module 410 may communicate heading measurements, geographic location measurements and or time measurement to a processor 422 in a motion control module 420. In an alternative embodiment, a portable computing device executing computer-readable instructions on a processor (e.g., a SMARTSHADE software app) and located in a vicinity of a modular umbrella shading system may retrieve coordinates utilizing a mobile computing device's GPS transceiver and may retrieve a time from a mobile computing device's processor clock and provide these geographic location measurements and/or time to a motion control module 420 (e.g., a microcontroller in a motion control module) and/or a sensor module 410 (e.g., a microcontroller in a sensor module).

In embodiments, computer-readable instructions stored in a memory (e.g., memory 409) of a sensor module 410 may be executed by a microcontroller 408 and may calculate 350 a desired modular umbrella system elevation angle and/or azimuth angle utilizing received geographic location measurements, heading measurements, and/or time measurements. In embodiments, a microcontroller may transfer desired elevation angle measurements and/or azimuth angle measurements to a motion control module 420. In embodiments, computer-readable instructions stored in a memory of a motion control module 420 may compare 360 desired elevation angle measurements and azimuth angle measurements to a current elevation angle and azimuth angle of the modular umbrella system (calculated from gyroscope measurements, accelerometer measurements, and/or both) to determine movements that a modular umbrella system may make in order to move to a desired orientation. In embodiments, executed computer-readable instructions may calculate an azimuth adjustment measurement to provide to an azimuth motor and/or an elevation adjustment measurement to provide to an elevation motor.

In embodiments, in response to the comparison, computer-readable instructions executed by a processor 310 may communicate 370 a command, signal, message, and/or instructions to an azimuth motor assembly 131 to cause a modular umbrella shading system 100 to rotate to a desired azimuth orientation by moving a distance corresponding to and/or associated with an azimuth adjustment measurement. In embodiments, in response to the comparison, computer-readable instructions executed by a processor 310 may communicate 380 an elevation adjustment measurement to an elevation motor assembly to cause an upper core assembly to rotate with to a desired angle with respect to a lower core assembly (e.g., a desired elevation angle) by moving a distance corresponding and/or associated with elevation adjustment measurement.

In embodiments, in response to reaching a desired elevation angle and/or azimuth angle, computer-readable instructions executed by a processor may start 385 a timer (and/or clock) and after a predetermined time (or time threshold) may re-initiate 390 the modular umbrella orientation positioning process described above. In embodiments, a modular umbrella orientation positioning process may be reinitiated and/or checked every 5 to 7 minutes. In embodiments, a modular umbrella orientation positioning process may be initiated when a modular umbrella system is turned on and/or reset. In embodiments, adjustments may not be made every time a modular umbrella orientation positioning process is initiated because a modular umbrella shading system may not have moved significantly in a measurement timeframe.

Figure 5:
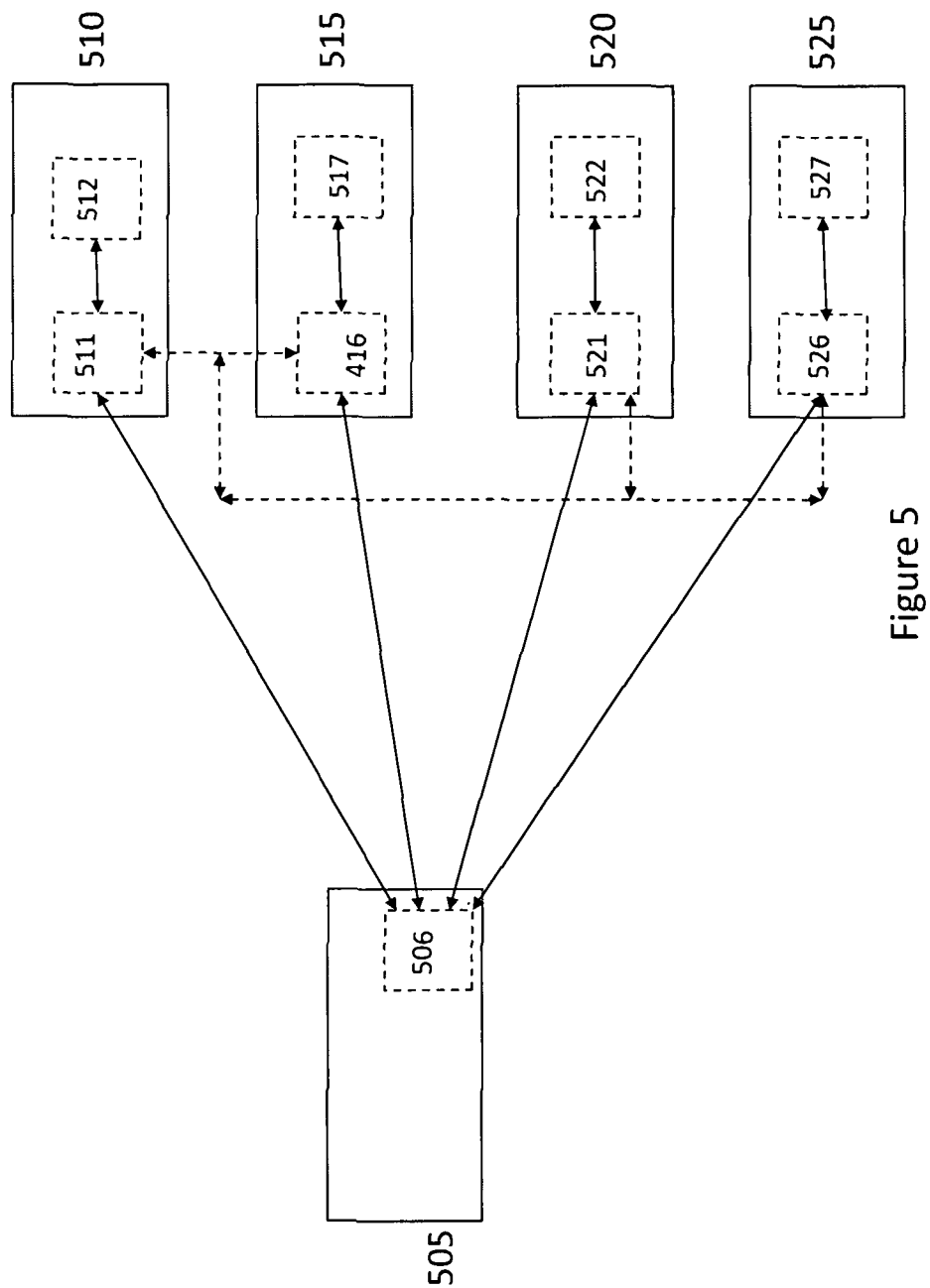
FIG. 5 illustrates a mobile computing device controlling operation of one or more modular umbrella systems according to embodiments.

FIG. 5 illustrates a mobile computing device controlling operation of one or more modular umbrella systems according to embodiments. FIG. 5 illustrates a mobile computing device 505 communicating with one or more of a plurality of modular umbrella systems 510, 515, 520 and/or 525. In embodiments, modular umbrella systems may comprise wireless transceivers 511, 516, 521 and/or 526 for communicating with other modular umbrella systems 510, 515, 520 and/or 525 and/or a mobile computing device 905. In embodiments, one or more modular umbrella systems 515 520 may comprise integrated computing devices 517 and 522. In embodiments, wireless transceivers 506, 511, 516, 521, and/or 526 may operate according any one or more of a plurality of personal area network, local area network, or other wireless and/or wired communication protocols, such as Bluetooth, Near-Field Communication (NFC) protocols, Zigbee, WiFi, 802.11, and including cellular wireless protocols such as GSM, CDMA, LTE and/or EDGE. In embodiments, computer-readable instructions may be stored on memory of a mobile computing device and executed by a processor to communicate with and/or control operations of one or more modular umbrella systems 510, 515, 520 or 525. In embodiments, modular umbrella systems 510, 515, 520 or 525 may have computer readable instructions stored in a memory of an integrated computing device 512, 517, 522 or 527 or other memory and executable by a processor of the integrated computing device 512, 517, 522 or 527, which may control operations of the modular umbrella system 510, 515, 520 or 525 where the computer-readable instructions are installed. In other words, part of software may be resident on a mobile computing device 505 and part of the software may be resident on one or more modular umbrella systems 510, 515, 520 or 525. In embodiments, computer-readable instructions executed by a processor of the mobile computing device 505 may communicate commands and/or instructions via a wireless transceiver 506 to one or more modular umbrella systems 510, 515, 520 or 525 via the modular umbrella system's wireless transceivers 511, 516, 521 or 9526. For example, a mobile computing device 505 may communicate a command and/or message to turn on LED lights of one or more modular umbrella systems 510, 515, 520 or 525; to activate one or more motor assemblies (e.g., azimuth, elevation and/or deployment motors), and/or to obtain sensor readings from one or more modular umbrella systems 510, 515, 520 or 525. In embodiments, a mobile computing device 505 may communicate and/or stream audio, images, and/or videos (via a wireless transceiver 506) to one or more modular umbrella systems 510, 515, 520 or 525 via their wireless transceivers 511, 516, 521 or 526 and utilizing one or more integrated computing devices 512, 517, 522 or 527. In embodiments, one or more integrated computing devices 512, 517, 522 or 527 may receive communicated audio, video and/or images and may communicate and/or stream the audio, video, images to audio/video transceivers and/or onto a sound reproduction devices such as speakers and/or to video displays and/or monitors on one or more modular umbrella systems 510, 515, 520 or 525.

In embodiments, a mobile computing device 505 may communicate commands, instructions and/or messages (or videos, images, and/or sounds) via a wireless transceiver 506 to a first modular umbrella system's 510 wireless transceiver 511. In embodiments, commands, instructions and/or messages (or videos, images, and/or sounds) may be communicated to an integrated computing device 512 and/or commands, instructions and/or messages (or videos, images, and/or sounds) may be transmitted from the wireless transceiver 511 of a first modular umbrella system 510 to a second modular umbrella system 515 via a wireless transceiver 516. In embodiments, communication of commands, instructions and/or messages (or videos, images, and/or sounds) may continue to one or more modular umbrella systems (e.g., 515, 520 and/or 525) via respective wireless transceivers 516, 521 or 526.

In embodiments, a mobile computing device 505 may communicate (via a wireless transceiver 506) instructions, messages, and/or audio/video/images to a plurality of modular umbrella systems 510, 515, 520 or 525 (via respective wireless transceivers 511, 516, 521 or 526) so that each of the plurality of modular umbrella systems may receive the same instructions, messages, and/or audio/video/images at approximately a same and/or close to same time. In embodiments, a mobile computing device 505 may communicate and/or transfer (via a wireless transceiver 506) different commands instructions, messages, and/or audio/video/images to a plurality of modular umbrella systems 510, 515, 520 or 525 via their respective wireless transceivers 511, 516, 521 or 526. For example, a mobile computing device 505 may communicate one digital music file to a first modular umbrella system 510, a second music file to a second modular umbrella system 515 and a third music file to a third modular umbrella system 520. Similarly, a mobile computing device may transmit commands to move an azimuth motor of a plurality of modular umbrella systems 510 and 515 and/or lights of a different plurality of modular umbrella systems 520 or 525 In another example, a mobile computing device 505 may generate and/or communicate one or more commands (e.g., the same commands to one or more of the plurality of modular umbrella systems 510, 515, 520 or 525) and each of the plurality of modular umbrella systems may receive the command and/or message and act in a similar manner. In embodiments, the mobile computing device 505 may broadcast the command and/or message to each of the plurality of modular umbrella systems 510, 515, 520 or 925 simultaneously and/or almost at the same time. In embodiments, a mobile computing device 505 may communicate the message and/or command to a first modular umbrella system 510 in a plurality of modular umbrella systems, which in turn may communicate the message to a second modular umbrella system 515, which in turn may communicate the message and/or command to a third modular umbrella system 520, and so on.

In embodiments, a mobile computing device 505, executing, on a processor, computer-readable instructions stored in its memory (e.g., SMARTSHADE software), may generate one or more commands for one modular umbrella system 510; one or more commands for a second modular umbrella system 515; and/or one or more commands for a third modular umbrella system 520. In other words, a mobile computing device 505 may communicate different commands to each umbrellas. In embodiments, different commands and/or messages may be communicated to all of the plurality of umbrellas 510, 515, 520, or 525 (e.g., broadcast). In this illustrative embodiment, an identifier may be utilized to identify which modular umbrella system may receive which command and/or message). In embodiments, a mobile computing device 505 may communicate a command and/or message only to a modular umbrella system that is to receive the command and/or message and perform actions based on the command and/or message. In embodiments, for example, a mobile computing device 905 may generate instructions, commands and/or messages to a) turn on lights on a first modular umbrella system 510, b) rotate an azimuth motor of a second modular umbrella system 515 and/or c) extend arm support assemblies to a third modular umbrella system 520. In embodiments, mobile computing devices 505 may communicate instructions, commands and/or messages simultaneously and/or serially to a plurality of modular umbrella systems 510, 515, 520 and/or 525. In embodiments, wireless transceivers 506, 511, 516, 521 and/or 526 may operate according to a WiFi protocol and/or any of the 802.11 wireless communication technology or protocols. In embodiments, wireless transceivers 506, 511, 516, 521 and/or 526 may operate according to personal area network protocols and/or technologies such as infrared, ZigBee, Bluetooth and ultrawideband, or UWB protocols. In embodiments, transceivers 506, 511, 516, 521 and/or 526 may operate according to cellular wireless communication protocols such as GSM, CDMA, LTE, and/or EDGE.

In embodiments, a rechargeable battery may be installed and/or resident in a base assembly or module 110. In embodiments, a rechargeable battery in a base assembly or module 110 may generate power to provide voltage and/or current to motors, printed circuit boards, assemblies, components and/or an integrated computing device in a modular umbrella system. In other words, in embodiments, a rechargeable battery in a base assembly 110 may provide power for a majority of components, assemblies, devices and/or motors in a modular umbrella system 100. In embodiments, a base assembly 110 may comprise one or more rechargeable batteries. In embodiments, a rechargeable battery in a base assembly 110 may utilize Lithium-based battery technology, such is Lithium-Ion or Nickel Metal Hydride (NiMH) rechargeable batteries. In embodiments, a weight and/or mass or a rechargeable battery in a base assembly 110 may also provide stability for a modular umbrella system 100. In embodiments, rechargeable batteries may be placed in a uniform manner in a base assembly 110 in order to provide an even distribution of weight. For example, one rechargeable battery may be placed on a left side of a base assembly 110 and a second rechargeable battery may be placed in a symmetrical position on a right side of a base assembly 110. In embodiments, utilization of one or more rechargeable batteries in a base assembly 110 may allow for additional weight (or weights) to be removed from a base assembly 110.

In embodiments, a modular umbrella system may comprise a wind sensor 194 and a surface vent. In embodiments, an upper assembly 140 or a lower assembly 142 of a core assembly or module 130 may be a location for a wind sensor 194 and/or a surface vent. In embodiments, a wind sensor 194 may be located in an interior position of an upper assembly and/or a lower assembly. In embodiments, a surface and/or skin vent may be built into and/or integrated into an outer surface and/or skin of an upper assembly 140 and/or lower assembly 142 and may be positioned as to allow air flow into a wind sensor 194. In this embodiment, other external factors around a modular umbrella system 100 may not be an issue (e.g., rain or snow or smoke) since a wind sensor 194 may be protected from environmental factors. In addition, interior positioning of a wind sensor 194 may keep it being broken and/or hit from objects and/or individuals around a modular umbrella system 100.

In embodiments, a core assembly or module 130 may comprise a DC power charging port 192. In embodiments, a DC charging port 192 may comprise a USB charging port. In embodiments, a DC charging port may be positioned at a 45 degree angle with respect to an outer surface of a core module or assembly 130 (or a first extension module or assembly 120, a base module or assembly 110, a second extension module or assembly 150). In embodiments, a DC charging port 192 may be positioned at between a 10-80 degree angle with respect to an outer surface of a core module assembly 130 in order to protect a DC charging port 192 from rain, snow, moisture and/or other environmental conditions. In other words, by positioning a DC charging port 192 at an angle, moisture and/or other environmental conditions may not enter a DC charging port 192. In embodiments, a plastic plug and/or covering may cover and/or protect a DC charging port 192 and provide further protection from environmental conditions. In embodiments, more than one charging ports 192 may be installed on a modular umbrella system 100.

In embodiments, a modular umbrella system 100 may transfer video, images and/or audio to a mobile communication device. In embodiments, a modular umbrella system 100 may comprise one or more processors in an integrated computing device 136, a cellular transceiver 195, a local area network wireless or WiFi transceiver 196, a personal area network (e.g., Bluetooth, Zigbee) transceiver 197, a microphone, and/or one or more cameras 137. In embodiments, one or more cameras 137 may capture images, video, and/or audio from an environment surrounding a modular umbrella system 100. In embodiments, a processor may store captured images in a memory of an integrated computing device 136 (e.g., a memory may be a volatile memory and/or non-volatile memory) and may transfer and/or communicate captured images, video and/or audio to a cellular transceiver 195. In embodiments, a cellular transceiver 195 in a modular umbrella system may transfer and/or communicate received images, video and/or audio to a cellular transceiver in one or more mobile computing devices via a cellular communication network. In embodiments, the captured images, video and/or audio may not be transferred via a local area network wireless (e.g., WiFi, 802.11), or via a personal area network (e.g., Bluetooth) and thus may not be limited to only being transmitted to devices within certain geographic areas or distance limitations. This allow remote monitoring of an area surrounding a modular umbrella system 100 like from areas in different building, different cities or other remote areas. In embodiments, images, video and/or audio may be transferred from a cellular transceiver of a mobile device to a display and/or speaker of a mobile computing device. In embodiments, images, video and/or audio may be displayed within a software application being executed by a processor of a mobile computing device. In these embodiments, the captured video, audio and images may not pass through and/or communicated through a packet switched network (e.g., the Internet).

Figure 6:
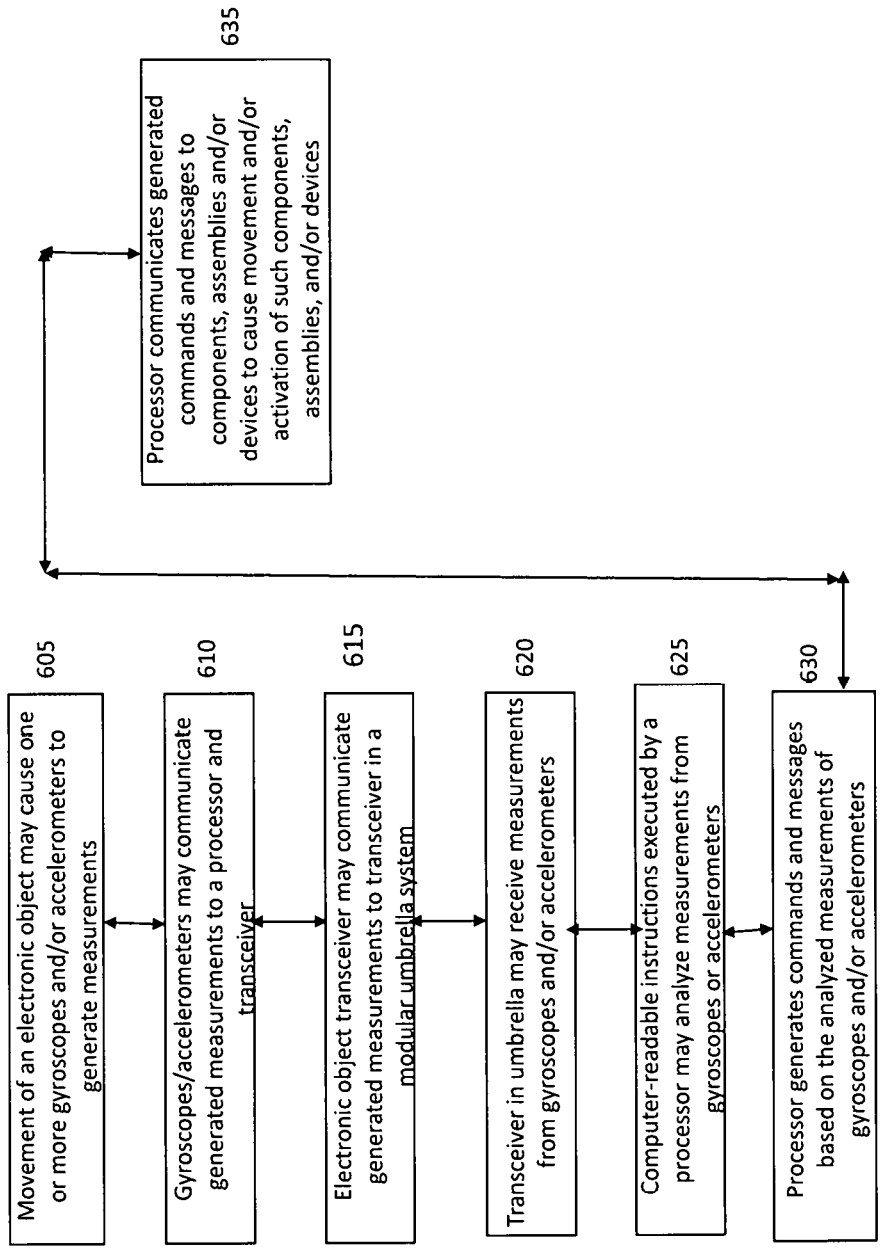
FIG. 6 illustrates a flowchart of a process of controlling a modular umbrella system by an object accordingly to embodiments.

FIG. 6 illustrates a flowchart of a process of controlling a modular umbrella system by an object accordingly to embodiments. In embodiments, a user may be able to move a mobile computing device and a modular umbrella system may move in a same and/or similar fashion. For example, in embodiments, a user may move a mobile computing device to in a left direction at a 45 degree angle and an upper core assembly may move approximately 45 degrees with respect to a lower upper assembly (e.g., utilizing an elevation motor assembly). As another illustrative example, a user may spin and/or rotate a mobile phone approximately 180 degrees, and a core assembly module 130 and/or a first extension module 120 may rotate 180 degrees about a vertical axis with respect to a base assembly. In embodiments, rather than utilizing a mobile computing device, a user may utilize another electronic object to control operation of modular umbrella system by movement of the electronic device. In embodiments, an electronic object may be shaped like a hockey puck, a console, a square, a remote control, or similarly shaped device. In embodiments, a user may move an electronic object in a direction and a modular umbrella system may respond by moving in a same and/or similar direction. In embodiments, for example, a user may move an hockey puck shaped electronic object in an upward swooping direction, and a modular umbrella may respond by deploying arm/spoke support assemblies from a closed to an open position which results in arms/spokes deploying on a modular umbrella system. In embodiments, for example, a user may hit or knock an electronic object twice on a surface, and this movement may result in lighting assemblies being activated and turning on in a modular umbrella system.

In embodiments, a mobile computing device and/or an electronic object may comprise one or more gyroscopes and/or accelerometers, one or more processors or controllers, and a transceiver. In embodiments, a transceiver may be a cellular transceiver, a personal area network (PAN) transceiver (e.g., Bluetooth, Zigbee) and/or a local area network wireless (e.g., WiFi and/or 802.11) transceiver. In embodiments, movement of a mobile computing device and/or electronic object may cause one or more gyroscopes and/or accelerometers to generate 605 measurements associated with and/or corresponding to the movement of the mobile computing device and/or electronic object. In embodiments, one or more gyroscopes or accelerometers may communicate 610 generated measurements to a processor which may communicate and transfer the generated measurements associated with a mobile computing device's or an electronic device's movement to a transceiver. In embodiments, a mobile computing device and/or electronic object's transceiver may communicate 615 generated measurements to a corresponding transceiver in a modular umbrella system. In embodiments, for example, a PAN (e.g., Bluetooth) transceiver in a mobile computing device may communicate with a PAN (e.g., Bluetooth) transceiver in a modular umbrella system. In embodiments, a transceiver in a modular umbrella system may receive 620 generated measurements from one or more gyroscopes and/or accelerometers in a mobile computing device or electronic device and may communicate generated measurements to a processor and/or controller of a modular umbrella system. In embodiments, computer-readable instructions stored in a memory may be executed by a processor and/or controller and may analyze 625 received generated measurements from the one or more gyroscopes or accelerometers of, for example, a mobile computing device. In embodiments, computer-readable instructions stored in a memory may be executed by a processor or controller and may generate 630 commands, messages, signals and/or instructions based on the analyzed received measurements of one or more gyroscopes and/or accelerometers of a mobile computing device and/or electronic object. In embodiments, for example, commands and/or messages may be sent to components, assemblies and/or devices to cause movement of such. In embodiments, a processor and/or controller may communicate 635 generated commands, messages, signals and/or instructions to components, assemblies and/or devices to cause movement and/or activation of such components, assemblies, and/or devices. For example, if a gyroscope and/or accelerometer generates measurements corresponding to a rotation movement, a processor and/or controller in a modular umbrella system may communicate commands and/or messages to an azimuth motor assembly to rotate a first extension assembly 120 and/or core assembly 130 with respect to a base assembly 110. While the above-described illustration utilizes a PAN transceiver, a WiFi and/or cellular transceiver may also be used to establish communications between a mobile computing device/electronic device and a modular umbrella system. Utilizing an electronic object and/or device may be helpful in outdoor environments where liquids, lotions and/or other substances may be present. In such embodiments, such liquids, lotions and/or substances may spill onto and cause a malfunction of a mobile computing device, wherein an electronic object and/or device may be outfitted or covered by a more durable surface material that may resist environmental conditions (e.g., rain, wind, snow, smoke) as well as liquids, lotions, oils and/or other substances. Thus, a user that has just applied sunscreen and/or suntan oil may be able to utilize an electronic object and/or device to control operation of a modular umbrella system without damaging an electronic device.

Figure 7:
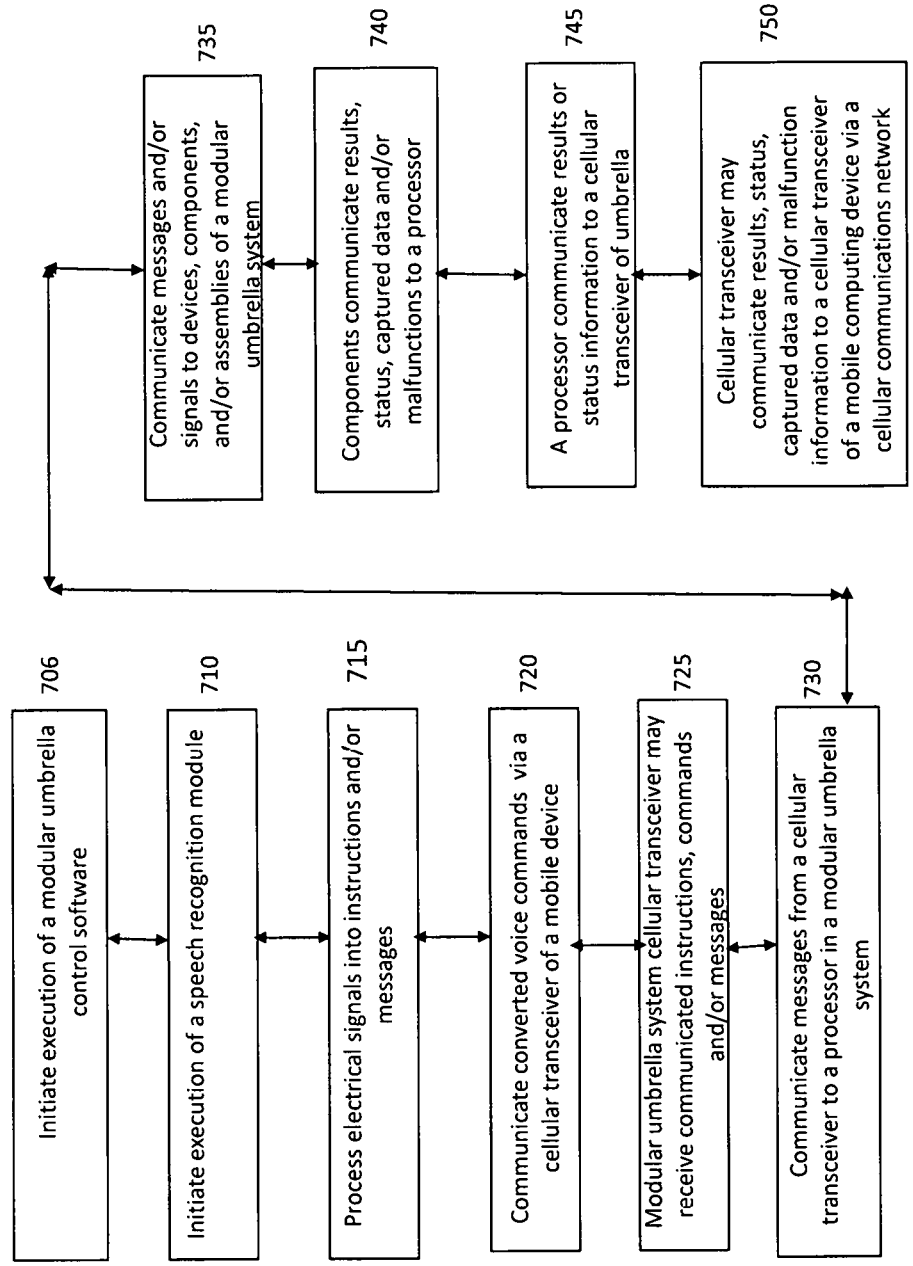
FIG. 7 illustrates remote operation of a modular umbrella system according to embodiments.

In embodiments, a user may be able to operate and/or provide commands to a modular umbrella system 100 from a remote location or another area separate from an environment in which a modular umbrella system may be installed. FIG. 7 illustrates remote operation of a modular umbrella system according to embodiments. In embodiments, a user may initiate execution 705 of a modular umbrella control software (e.g., computer-readable instructions executable by a processor of a mobile computing device). In embodiments, a user may initiate execution 710 of a speech recognition module, program or subroutine, in a modular umbrella control software. In embodiments, a user may speak and a mobile computing device microphone may receive voice command, convert voice commands into electrical signals (analog and/or digital), and a voice recognition module may process 715 the electrical signals into instructions, commands, and/or messages. In embodiments, a voice recognition module may be a third party voice recognition engine running on a mobile computing device (e.g., Dragon voice recognition engine, etc.), a third party voice recognition module running on a separate physical computing device (e.g., Amazon Alexa and Echo), or a voice recognition module running as part of a shading object control application software. In embodiments, for example, commands may be rotate umbrella, open up umbrella spokes, turn on camera, communication video and/or images from camera, and/or activate solar panel cells, etc. In embodiments, a mobile computing device (and/or modular umbrella control software executing on a processor) may communicate 720 converted voice instructions, commands and/or messages via a cellular transceiver of a mobile device to a cellular transceiver of a modular umbrella system via a cellular communications network. In embodiments, a modular umbrella system cellular transceiver may receive 725 communicated instructions, commands and/or messages via a cellular communications network. In embodiments, received instructions, commands and/or messages may be communicated 730 from a cellular transceiver to a processor in a modular umbrella system. In embodiments, a modular umbrella system processor may communicate 735 commands, instructions, messages and/or signals to devices, components, and/or assemblies of a modular umbrella system (e.g., a camera, an azimuth motor assembly, a solar cell) to perform actions requested in the received voice commands. In embodiments, commands, instructions, messages and/or signals may be communicated through a processor in a motion control board and/or a processor in an integrated computing device. In embodiments, devices, components, and/or assemblies of modular umbrella system may communicate 740 results, status, captured data and/or malfunctions to a processor of a modular umbrella system. In embodiments, a processor of a modular umbrella system may communicate 745 results, status, captured data and/or malfunction information to a cellular transceiver of a modular umbrella system. In embodiments, a cellular transceiver may communicate 750 results, status, captured data and/or malfunction information to a cellular transceiver of a mobile computing device via a cellular communications network. In embodiments, received results, status, captured data and/or malfunction information may be communicated to a mobile application software application. In embodiments, this allows remote operation of a modular umbrella system via a cellular network and cellular communications. In embodiments, a cellular communications network may operate utilizing GSM, CDMA, LTE and/or EDGE wireless network protocols. This allows a user to be in a completely different geographic location and still be able to control operations of a modular umbrella system. A user may be able to not only control operation but also to capture environmental information from a modular umbrella system (e.g., sensors, cameras, etc.) and receive indications of such captured information. In embodiments, a mobile computing device may be communicatively linked with one or more modular umbrella systems. In embodiments, mobile computing devices may be communicatively coupled to one or more modular umbrella systems directly (e.g., via a personal area network), via wireless local area network wireless communications (e.g., directly, or via access points, and/or via a cloud-based server utilizing WiFi or 802.11 communication protocols) and/or via cellular communication networks. In embodiments, personal area network wireless communication protocols may include Zigbee, Bluetooth, RC-5, SIRCS, RC-6, R-Step, NTC101, etc.).

In embodiments, a modular umbrella system 100 may comprise an interior umbrella security system. In embodiments, a module or assembly of a modular umbrella system 100 may comprise an interior umbrella security system. In embodiments, for example, a core module or assembly 140 may comprise an interior umbrella security system. In other embodiments, a base module or assembly 110 and/or an expansion sensor module 160 may comprise an interior security system. In embodiments, an interior security system may comprise one or more sensors, one or more cameras and one or more lighting assemblies. In embodiments, if an unauthorized user or operator attempts to open one or more of the umbrella modules (e.g., a base module, a core module and/or an expansion sensor module) by removing a skin and/or housing, a sensor attached to a skin or housing may be tripped and/or activated, and may communicate a signal, command and/or message to a controller and/or processor in a modular umbrella system 100. In embodiments, a controller and/or processor in a modular umbrella system 100 may communicate a command and/or message to a camera to activate a camera. In embodiments, a camera may capture images and/or video and communicate captured images and video to a memory of an integrated computing device in a modular umbrella system or to a remote cloud-based server. In embodiments, a processor and/or controller may communicate a command and/or message to one or more lighting assemblies to place lighting assemblies in an alarm mode. In embodiments, lighting assemblies may begin to blink or display a different color if in alarm mode (indicating that a skin assembly and/or housing has been breached. In embodiments, this allows a manufacturer to void a warranty if unauthorized access occurs. In addition, in embodiments, a user and/or operator may utilize this feature to determine if an individual or company has accessed an interior of a module umbrella system and sabotaged the umbrella. In addition, a manufacturer may also be able, if a camera is utilized, to store information regarding all individuals who have breached an interior of a modular umbrella system.

FIG. 13 illustrates a block diagram of a modular umbrella system according to embodiments. In embodiments, as is illustrated in FIG. 13, a modular umbrella shading system 1300 may comprise a telemetry printed circuit board (PCB) comprising a processor 1305, a weather variable PCB comprising a processor 1310, a voice recognition PCB and/or engine 1315, a rechargeable battery 1320, and one or more solar panels and/or solar panel arrays 1325. In embodiments, a modular umbrella shading system 1300 may comprise a power tracking solar charger 1330, a power input or power source (e.g., AC adapter assembly) 1335, a lighting assembly 1370, an audio system 1375 and/or a computing device 1360. In embodiments, a modular umbrella shading system may include an obstacle detection module 1355, a motion sensor 1345, a proximity sensor 1340, a tilt sensor 1355, a personal area network communications module or transceiver 1365, a first motor controller and motor (azimuth motor and controller) 1380, a second motor controller and motor (elevation motor and controller) 1385, and a third motor controller and motor (an actuator motor and controller) 1390. In embodiments, a weather variable PCB 1310 may be coupled and/or connected to one or more air quality sensors 1311, UV radiation sensors 1312, a digital barometer sensor 1313, a temperature sensor 1314, a humidity sensor 1316, and/or a wind speed sensor 1317. In embodiments, a wind sensor 1317 may be a thermistor. In embodiments, a telemetry PCB 1305 may be coupled and/or connected to a GPS/GNSS sensor 1307 and/or a digital compass 1308. Although at times a modular umbrella shading system, shading object, intelligent umbrella and/or shading charging system may singularly be mentioned, the disclosure herein may be implemented in any of the above-mentioned devices and/or apparatus.

In embodiments, a modular umbrella shading system may comprise one or more printed circuit boards. Although a description may reference a specific printed circuit board, many of features or functions of a modular umbrella shading system may be implemented utilizing components mounted on a single, two or three circuit boards. In addition, one or more components may be mounted on printed circuit boards, which results in a large number of circuit boards within a modular umbrella shading system. In other words, a number of circuit boards may be utilized to provide features and/or functions of a shading object and/or umbrella although embodiments described herein may only describe a specific number. Although the term "circuit board" or "printed circuit board" is utilized, any electronic device allowing installation on and communicate with components may be utilized along with circuit board. As used in this specification, the terms "printed circuit board" and "PCB" are intended to refer generally to any structure used to mechanically support and electrically connect electronic components using conductive pathways, tracks, or signal traces etched from (e.g., copper) sheets laminated onto a non-conductive substrate. Synonyms for printed circuit boards include printed wiring boards and etched wiring boards.

In embodiments, a shading object, umbrella and/or shading charging system may comprise one or more printed circuit boards. In embodiments, a shading object or umbrella 1300 may comprise a movement control PCB 1395, a shading object computing device or computing device PCB 1360, a first motor PCB (azimuth control) 1380, a second motor PCB (elevation control) 1385, a third motor PCB (actuation/deployment control) 1390, a telemetry PCB (location and orientation data/information collection) 1305, and/or a weather variable PCB (environmental sensor data/information collection) 1310.

In embodiments, a telemetry PCB 1305 comprises a processor, a memory, a GPS receiver and/or transceiver and/or a compass (e.g. a digital) compass). The GPS receiver and/or compass provides location and orientation information and/or measurements which may be transferred to a memory utilizing a processor. In embodiments, a telemetry PCB processes and conditions the communicated information and/or measurements. In embodiments, a telemetry PCB 1305 communicates measurements and/or additional information (e.g., in some cases, measurements are conditioned and processed and in some cases, measurements are raw data) to a shading object movement control PCB 1395 which analyzes the received location and/or orientation information and measurements.

In embodiments, a weather variable PCB 1310 comprises a processor, a memory, an air quality sensor, a UV radiation sensor, a barometer, a temperature sensor, a humidity sensor, and/or a wind speed sensor. One or more of the listed sensors may generate environmental and/or weather measurements and/or information, which may be transferred to a memory utilizing a processor. In embodiments, a weather variable PCB 1310 processes and conditions information and measurements from the one or more sensors. In embodiments, a weather variable PCB 1310 communicates received environmental and/or weather sensor measurements (e.g., in some cases conditioned and processed and in some cases raw data) to a shading object movement control PCB 1395 which analyzes the received location and/or orientation information and measurements.

In embodiments, a core assembly or module 130 may comprise an umbrella movement control PCB 1395, as well as an integrated computing device PCB 1360. In embodiments, a movement control PCB 1395 may also be located in a base assembly or module 110. In embodiments, other terms may be utilized in place of circuit board, such as printed circuit board, a flexible circuit board, and/or an integrated circuit. In embodiments, an umbrella movement control PCB 1395 may consume a low amount of power and may be referred to as a low-power PCB. In embodiments, this may prove to be a benefit as compared to prior-art umbrellas which utilized a large amount of power and thus needed to have power from a power source and could not be powered by an array of solar cells providing power to a solar power charger 1330. In embodiments, a solar array may provide enough provide power to power components on an umbrella movement control PCB 1395. In this case, for example, components and associated activities controlled by an umbrella movement circuit PCB 1395 may not consumer large amounts of power because these activities do not require continuous operation and may only receive information or measurements on a periodic basis. As an example, an intelligent shading object 1300 may not be rotating and/or tilting frequently. Thus, in embodiments, therefore, sensors providing these measurements (e.g., a tilt sensor or sunlight sensor), and a movement control PCB communicating these measurements may not need to be in an active state at all times, which results in significant power usage savings for a shading object and/or controller.

In embodiments, a motion control PCB 1395 may comprise a processor, a non-volatile memory, a volatile memory, and many other components described above and below. In embodiments, for example, computer-readable instructions may be fetched from a non-volatile memory, loaded into a volatile memory, and executed by a processor to perform actions assigned to, controlled and/or commanded a motion control PCB 1395. In embodiments, non-volatile memory may be flash memory, ASIC, ROMs, PROMs, EEPROMs, solid state memory, CD, DVD, persistent optical storage or magnetic storage media.

In embodiments, as a further example, modular umbrella shading system motors, e.g., a first motor (azimuth movement motor), a second motor (elevation movement motor), and/or a third motor (articulation or actuator movement motor) may not be utilized frequently, so there does not need to be a large amount of power utilized by these motors within a shading object. In embodiments, when motors and/or motor assemblies are operating, the motors may require 2 to 3 amps. If system is idle and for example, the shading computer is not operating, an intelligent shading object may only require 180 milliamps. If an audio system is operating, e.g., music is playing and the amplifier and speakers are being utilized, only 400-500 milliamps, In addition, motor controllers may not be utilized frequently since the motor controllers may not be driving and/or sending commands, instructions, and/or signals to motors frequently. Thus, a low-power movement control PCB 1395 may provide a shading object owner with power usage savings and efficiency.

In embodiments, readings and/or measurements from sensors may cause a movement control PCB 1395 to transmit commands, instructions, and/or signals to either a first motor control PCB 1380 (azimuth movement), a second motor control PCB 1385 (elevation movement), and/or a third motor control PCB 1390 (actuation movement), in order to cause specific movements of different assemblies of a modular umbrella shading system. For example, in embodiments, a GPS transceiver 1306 may receive GPS signals and provide GPS measurements (e.g., values representative of a longitude, latitude, and/or an altitude reading) to a movement control PCB 1395. In embodiments, a movement control PCB 1395 may analyze the GPS measurements and determine that a shading object, umbrella, and/or shading charging system should be moved to a specific elevation. In other words, in embodiments, a movement control PCB 1395 may utilize GPS generated measurements to direct a second motor assembly to move to a proper elevation. In embodiments, GPS measurements (coordinates and time) identify a proper elevation of the sun based on a geographic location. In embodiments after a core assembly of module 130 may be moved to a position identified by GPS measurements, arm/spoke support assemblies 163 may be extend and the arms and/or blades 164 may be fully deployed. In embodiments, a movement control PCB 1396 may communicate commands, instructions, and/or signals to a second motor control PCB 1385 to cause an upper core assembly 140 of a core assembly 130 to rotate or move approximately 45 degrees in a downward direction with respect to a lower core assembly 142 of the center support assembly. In embodiments, a movement control PCB 1395 may communicate commands, instructions, and/or signals to a third motor control PCB to fully extend arm/blade support assemblies 163 (e.g. articulating blades/assemblies) and also arms/blades 164.

In embodiments, a digital compass 1307 may generate a heading and/or orientation measurement and a telemetry PCB 1305 may communicate a heading and/or orientation measurement to a movement control PCB 1395. In embodiments, a movement control PCB 1395 may analyze a heading measurement and generate and/or communicate commands, instructions, and/or signals to a first control PCB 880 to rotate a first extension assembly 120 and a core assembly or module 130 to face or move the shading object towards a light source (e.g., a sun). In embodiments, digital compass measurements may be utilized as directional input for an azimuth (or first motor). In embodiments, a movement control PCB 1395 may calculate counts and/or limits for motors to properly orient an intelligent shading object based on GPS measurements and/or digital compass measurements. Continuing with this embodiment, a movement control PCB 1395 may generate and/or communicate commands, instructions, and/or signals to a third motor controller PCB 890 to cause arm support assemblies 163 to be extended or deployed along with arms/blades 164.

In embodiments, a wind speed sensor 1317 may generate measurements and a variable weather PCB 1310 may communicate measurements to a shading object movement control PCB 1395. In embodiments, a movement control PCB 1395 may analyze and/or compare communicated measurements to a threshold in order to determine if unsafe conditions are present. In embodiments, for example, if a wind speed threshold is reached or exceeded, identifying an unsafe condition, a movement control PCB 1395 may communicate commands, instructions, and/or signals to move shading object assemblies to a rest position. Continuing with this illustrative example, a movement control PCB 1395 may communicate commands or instructions or signals to a second movement control PCB to cause an upper core assembly 140 to move to an original position (e.g., at rest position), which may be where an upper core assembly 140 is a vertical extension of a lower assembly 142. In embodiments, a movement control PCB 1395 may communicate instructions, commands and/or signals to a third motor control PCB 1390 to move arm/spoke support assemblies 163 back into an upper assembly and/or retract arm/spoke support assemblies 163 into channels of an upper assembly 140. In embodiments, a movement control PCB 1395 may communicate commands, instructions and/or signals to a sound reproduction system 1375 and/or a display device to warn a user of unsafe wind conditions. In embodiments, a modular umbrella shading system may comprise a voice recognition engine 1315. In embodiments, a shading object motion control PCB 1395 may have a voice recognition engine 1315 mounted and/or located thereon. A voice recognition engine is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device, the disclosure of both applications being hereby incorporated by reference.

In embodiments, a modular umbrella shading system may comprise one or more digital cameras 1357 and/or other analog-based cameras. In embodiments, one or more cameras 1357 may comprise an optical system and/or an image generation system. In embodiments, digital cameras 1357 may display images on a screen immediately after being captured. In embodiments, one or more digital cameras 1357 may store and/or delete images from a memory associated with a digital camera. In embodiments, one or more digital cameras 857 may capture, record and/or moving videos with or without sound. In embodiments, digital cameras 1357 may also incorporate computer-readable and computer-executable instructions which, which when retrieved from a non-volatile memory, loaded into a memory, and executed by a processor, may crop and/or stitch pictures, and/or potentially perform other image editing on captured images. For example, image stitching or photo stitching is the process of combining multiple photographic images with overlapping fields of view to produce a segmented panorama and/or high-resolution image. In embodiments, image stitching may be performed through the use of computer software embodied within a digital camera. In embodiments, a digital camera may also internally perform video stitching. In embodiments, other devices, components and/or assemblies may perform image stitching, video stitching, cropping and/or other photo editing. In embodiments, computer-readable instructions loaded into a memory of a movement control PCB 1395 and/or integrated computing device 1360, may be executable by a processor to perform image stitching, video stitching, cropping and/or other photo editing. In embodiments, computer-readable instructions may be loaded into a memory located within a modular umbrella shading system and executable by a processor to perform the above-identified photo editing.

In embodiments, cameras may capture images of an area around, surrounding, and/or adjacent to shading objects, intelligent umbrellas, and/or intelligent shading charging systems. In embodiments, a stem assembly 106 and/or a central support assembly 107 may comprise a camera 857. In embodiments, a stem assembly 106 and/or center support assembly 107 may rotate (e.g., up to 360 degrees) about a vertical axis with respect to a base assembly 105—FIGS. 1A and 1B) (or a lower support assembly 187 and/or an upper support assembly 191 may rotate about and/or around a housing and/or enclosure 182—FIG. 1C) and this may allow a camera to capture images, videos and/or sound corresponding to 360 degrees of an area surrounding, around and/or adjacent to a shading object, intelligent umbrella and/or intelligent shading charging system. In embodiments, a camera 857 and/or other components or assemblies (as discussed above) may stitch or combine images and/or videos to provide a panoramic image of the area. The ability of a shading object to rotate allows a benefit of panoramic image capture and not just an area where a camera is initially oriented. In embodiments, a camera 857 may have one or more images resolutions (e.g., 1 Megapixel (MP), 3 MP, 4 MP, 8 MP, 13 MP and/or 38 MP) that are selectable and/or adjustable.

Although the description above corresponds to a modular umbrella shading system of FIGS. 1 and 2, the description applies to similar components in the intelligent shading charging system, intelligent umbrellas, and/or shading objects.

In embodiments, a first motor control PCB 1380, a second motor control PCB 1385, a third motor control PCB 1390 and a movement control PCB 1395 may be connected to each other via wires and/or traces and instructions may, commands and/or signals may be communicated via wires and/or traces. In embodiments, the motor control PCBs 1380, 1385 and 1390 may communicate with a movement control PCB 895 via a personal area network communications protocol, e.g., Bluetooth. In embodiments, a weather variable PCB 1310 and/or a telemetry PCB 1305 may communicate with a movement control PCB 1395 via wires, traces, integrated circuits, and/or interfaces and communicate instructions, commands or signals. In embodiments, a weather variable PCB 1310 and a telemetry PCB 1305 may communicate with a movement control PCB 1395 via personal area network protocols (utilizing a PAN transceiver—e.g., a Bluetooth transceiver). In embodiments, motor control PCBs 1380 1385 1390 may communicate directly (either via wires or a wireless communication protocol) with a weather variable PCB 1310 and/or a telemetry PCB 1305 without utilizing a computing device 1360 and/or a movement control PCB 1395.

In embodiments, as described above, a modular umbrella shading system may comprise a computing device PCB (e.g., a single board computer or a system on a chip), which may comprise a computing device 1360 in a shading object, intelligent umbrella and/or shading charging system. In embodiments, a modular umbrella shading system may comprise a computing device 1360 which is not installed and/or mounted on a computing device PCB. In embodiments, a computing device 1360 and/or a computing device PCB may consume a larger amount of power (with respect to movement control PCB 1395) due to activities it is responsible for executing being performed more frequently and/or with a higher data throughput. In embodiments, an integrated computing device 1360 may be responsible for camera control, video and/image processing, external Wi-Fi communication, e.g., such as operating as a hot spot, as well as running various software applications associated with the modular umbrella shading system. The computing device 1360, because of operating and being responsible for more data intensive features and/or functions, may require more processing power due to extended operation and continuous data throughput. In embodiments, a computing device may be integrated into a core assembly or module 130. In embodiments, a computing device may be integrated into a base assembly or module 110. In embodiments, a computing device may be incorporated into an expansion sensor module or assembly 160.

Figure 8:
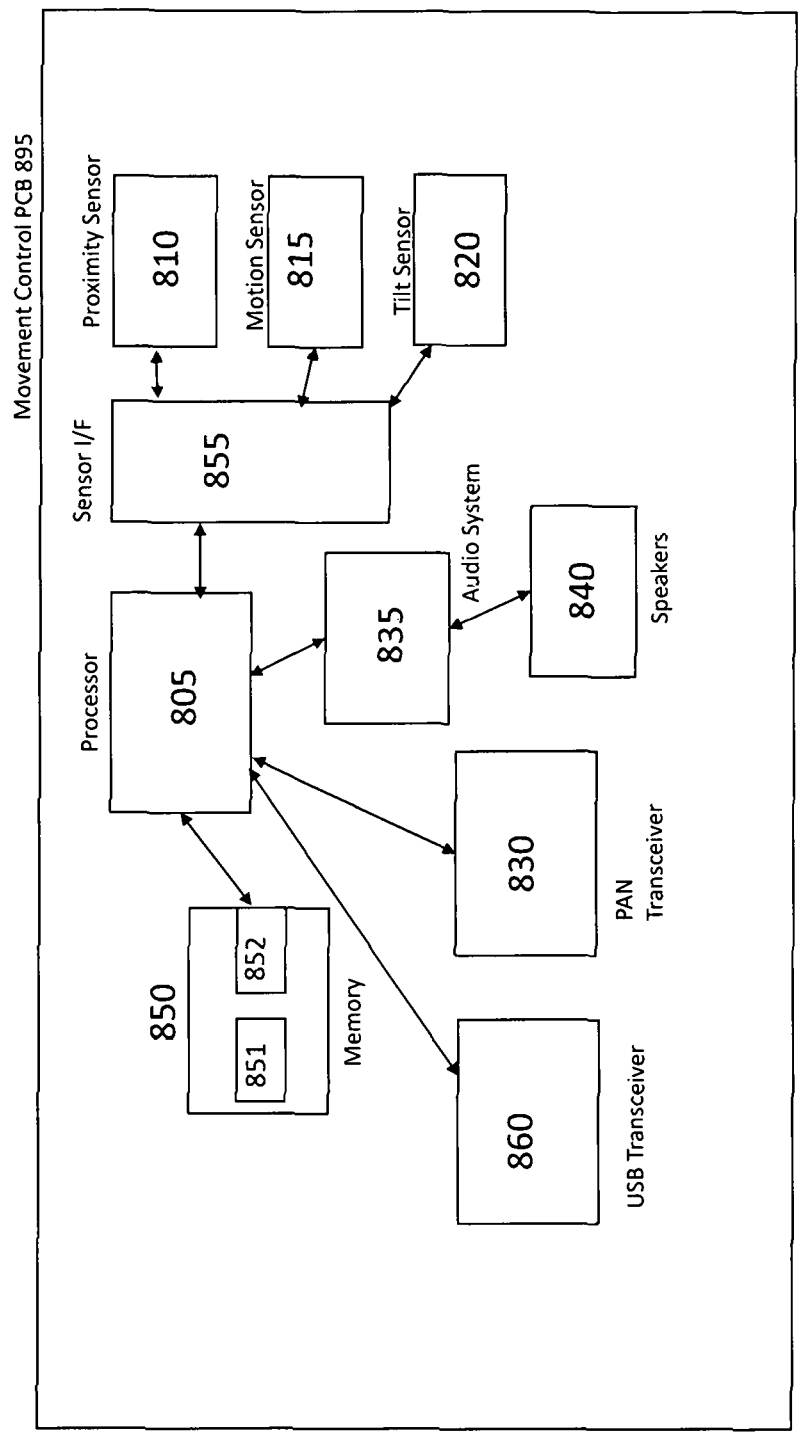
FIG. 8 illustrates a block diagram of a movement control PCB according to embodiments.

FIG. 8 illustrates a block diagram of a movement control PCB according to embodiments. Returning back to discussion of a movement control PCB, in embodiments, a movement control PCB 895 may comprise a processor/controller 805, a proximity sensor 810, a motion sensor 815, a tilt sensor 820, a personal area network transceiver 830, an audio receiver 835 (optional), one or more speakers 840, and/or a memory 850 having modular umbrella or shading object control software (e.g., executable instructions stored in a non-volatile memory 851 and executable by a processor 805). In embodiments, an umbrella movement control PCB 895 may comprise a USB transceiver 860. In embodiments, an umbrella movement control PCB 895 may comprise sensor interface subsystem 855 for communicating sensor measurements to an umbrella movement control PCB 895 and communicate commands and/or signals from and two to external sensors. In embodiments, a sensor interface subsystem 855 may be located, or may also be located on a telemetry PCB 1305, a weather variable PCB 1310, and/or first, second, or third motor control PCBs 1380, 1385, and 1390. For example, in embodiments, a modular umbrella shading system may also include a signal conditioning subsystem which may also be referred to as a sensor interface system and the terms may be utilized interchangeably throughout the specification. In embodiments, an intelligent shading object, umbrella and/or shading charging system (and the signal conditioning subsystem) may further comprise one or more reference signal modules, one or more signal conditioning modules, and one or more analog-to-digital converters. In an embodiment, one or more sensors (e.g., air quality sensor 1311, UV radiation sensor 1312, wind speed sensor 1317, motion sensor 815, and/or tilt sensor 820) may receive communicated analog signals and may transmit analog signals to signal conditioning modules 855. In embodiments, a signal conditioning module 855 may process and/or condition communicated analog sensor signals. Although signals are described as being analog, the description herein equally applies to digital signals. In embodiments, one or more signal conditioning modules may communicate and/or transfer processed and/or conditioned signals to one or more A-to-D converters. In embodiments, one or more signal reference modules may be a non-volatile memory, or other storage device, that stores and/or retrieves signal values that the communicated signal values may be compared to in order to determine if threshold conditions may be met. In embodiments, a comparison of communicated signal values to reference signal values may allow the signal conditioning system to understand if normal conditions are being experienced by a modular umbrella shading system or if a modular umbrella shading system may be experiencing abnormal conditions, (e.g., high humidity, high movement, high wind, and/or bad air quality).

FIG. 8 illustrates an umbrella movement control PCB according to embodiments. In embodiments, an umbrella movement control PCB 1395 may comprise a proximity sensor 1340. In embodiments, a proximity sensor 1340 may be able to detect a presence of nearby objects, (e.g., people or other physical objects) without any physical contact between a sensor and an object. In embodiments, a proximity sensor 1340 be located on and/or mounted on a movement control PCB 1395. In embodiments, a proximity sensor 1340 may be located on and/or mounted on other printed circuit boards or may be a standalone component in a shading object system. In embodiments, a proximity sensor 1340 may be located within a core assembly or module 130. In embodiments, a proximity sensor 1340 may generate measurements and/or signals, which may be communicated to a processor/controller 805 in a movement control PCB 895. In embodiments, an umbrella movement control board 1605 may store communicated measurements and/or signals, which has instructions stored thereon. In embodiments, proximity sensor software instructions, which are fetched from memory 850 and executed by a processor 805, may perform and/or execute a proximity process or method. In embodiments, for example, a proximity process may comprise receiving measurements and/or signals from a proximity sensor 1340 indicating an object and/or person may be located in an area where a shading object is deployed, going to be deployed and/or extended, and/or towards where a component of a shading object may be moving. For example, if an individual is located in an area where arm support assemblies may be deployed and/or extended, a proximity sensor 1340 may transmit a signal or measurement indicating an object may be an obstruction to, for example, a movement control PCB 895. In embodiments, a processor/controller 805 in a movement control PCB may receive and/or analyze a proximity measurement and determine an object may be an obstacle. In embodiments, a proximity signal and/or command may also identify a location of an object (e.g., obstacle) in relation to a proximity sensor 1340 and/or some reference location. In embodiments, a processor of a movement control PCB may generate and/or communicate a driving signal, command, and/or instruction that instructs a shading object not to deploy and/or open. In embodiments, for example, a processor/controller 805 in a movement control PCB 895 may communicate a signal and/or commands to a third motor controller to cause the third motor to stop moving the arm/blade support assembly 163 due to an obstacle detection. In embodiments, for example, a movement control PCB 895 may communicate a signal and/or commands to a second motor controller a second motor (articulating and/or elevation motor) to cause a second motor to stop moving an gearbox assembly and/or actuator and prevent an upper core assembly 140 of a core assembly or module from moving into an area where an obstacle is detected. In embodiments, this may also work in the opposite direction, where if a proximity sensor 1340 does not determine that an object is within a modular umbrella shading system area, then a proximity sensor signal may not be communicated to the processor/controller 805 in a movement control PCB 1395.

In embodiments, an umbrella movement control PCB 1395 may comprise a motion sensor 1345. In embodiments, a motion sensor 1345 may generate a signal and/or measurement indicating that an individual, a living organism, or an object is within an area covered by a motion sensor 1345. For example, a motion sensor 1345 may generate a signal if an individual and/or object is approaching a modular umbrella shading system, is within 5 or 10 feet of an umbrella, or is moving within a shading area. In embodiments, a motion sensor 1345 may be located on and/or mounted on a movement control PCB 1395. In embodiments, a motion sensor 1345 may be located on and/or mounted on other printed circuit boards or may be a standalone component in a shading object system. In embodiments, a motion sensor 1345 may be located within a core assembly or module 130. In embodiments, a motion sensor 1345 may generate measurements and/or signals, which may be communicated to a processor/controller 805 in a movement control PCB 1395. In embodiments, an umbrella movement control board 895 may store communicated measurements and/or signals, in a memory 850. In embodiments, motion sensor software instructions, may be fetched from memory 850 and executed by a processor 805, and may cause a processor 805 to perform and/or execute a motion detection process or method.

Figure 9:
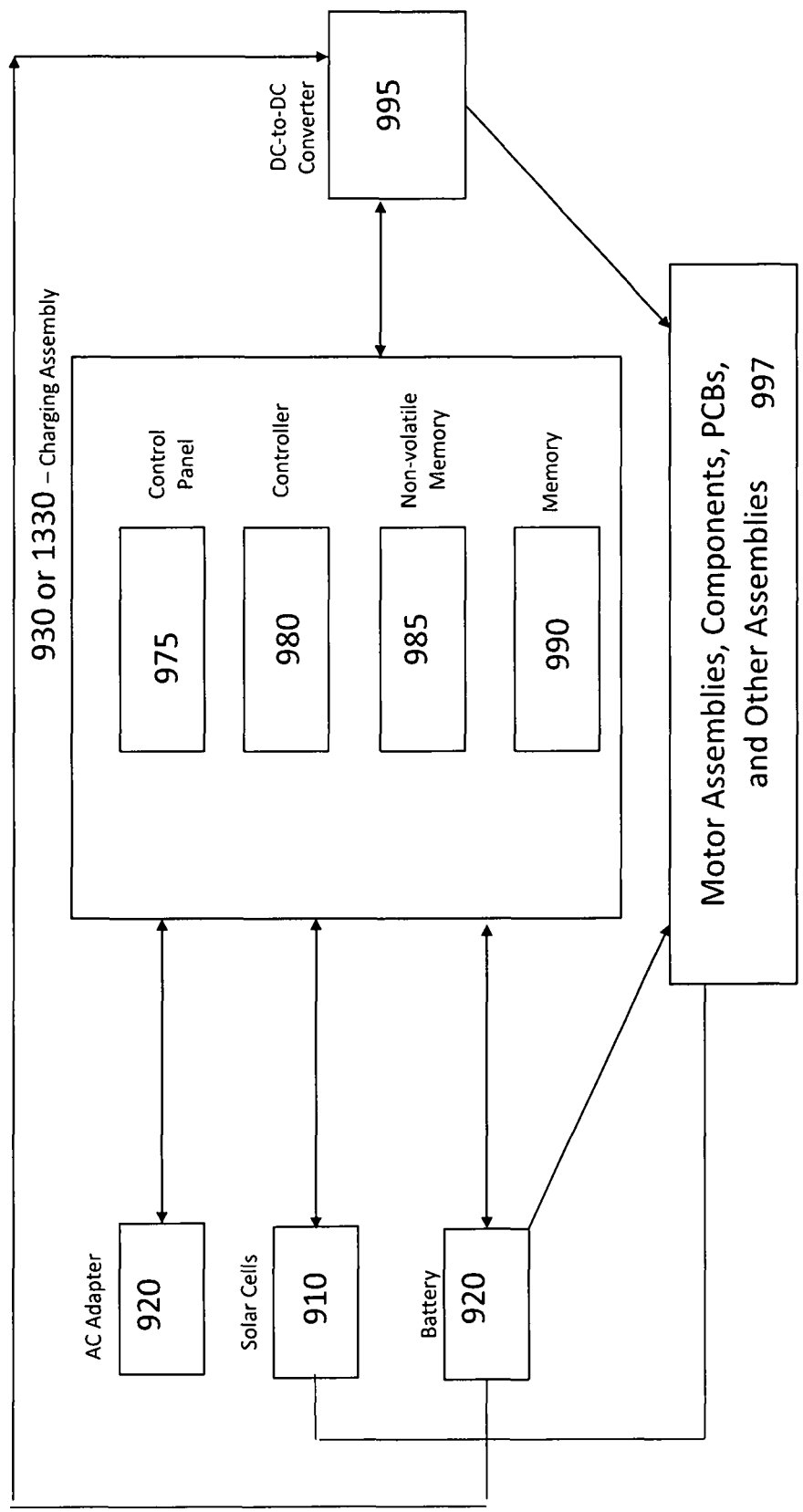
FIG. 9 illustrates a power subsystem in a modular umbrella system according to embodiments.

FIG. 9 illustrates a power subsystem in a modular umbrella system according to embodiments. In embodiments, a modular umbrella shading system may comprise a power tracking solar charger 930. In embodiments, a core module assembly 130 of a modular umbrella shading system may comprise and/or house a power tracking solar charger 930. Continuing with this illustrative embodiment, a power tracking solar charger 930 may be located in and/or on an upper core assembly 140 of a core module assembly 130, or alternatively in or on a bottom core assembly 142 of a core module assembly 130. In embodiments, a power tracking solar charger 930 may be connected to one or more solar cells 910, a rechargeable battery 920, and/or an AC adapter 1335 or 920. In embodiments, a photovoltaic (PV) cell, or "solar cell" may be a smallest semiconductor element that converts sunlight into electricity. In embodiments, a semiconductor silicon may be treated so that silicon generates a flow of electricity when a light shines on it. In embodiments, a PV array or cells may be an interconnected system of PV cells that may function as a single electricity-producing unit. In embodiments, a PV array 910 may comprise one of more of the strips of solar cells. In embodiments, a PV array 910 may comprise one solar cell strip. In embodiments, one or more solar cells 910 (e.g., a PV array 910) may provide power directly to a power tracking solar charger 930 and/or a rechargeable battery 920. In embodiments, one or more solar cells 910 (or solar arrays) may provide power to motor assemblies, components, printed circuit boards, and/or other assemblies 997 in a modular umbrella shading system.

In embodiments, a power tracking solar charger 930 may be coupled and/or connected to a rechargeable battery 920. In embodiments, a power tracking solar charger 930 may be coupled and/or connected to an AC adapter 935 (or DC power adapter), which is coupled and/or connected to a power source. In embodiments, a charging assembly 930 may be coupled to one or more solar cells 910 or solar arrays. In embodiments, a power tracking solar charger 930 may include a control panel 975, a controller 980, a non-volatile memory 985 and a volatile memory 990, the non-volatile memory 985 comprising computer-readable and computer-executable instructions, which are fetched and loaded into volatile memory 990 for execution by a controller or processor 980 to perform a power monitoring, tracking and distribution process. In embodiments, a power monitoring, tracking and/or distribution process may monitor power levels and/or power conditions of different components of a shading object (e.g., a motion control PCB 1395, arrays of solar cells 910), a rechargeable battery 920). In embodiments, a power tracking and monitoring process may communicate information regarding power levels and/ or power conditions of a solar charger 930 (and other shading object components) to a control panel 975 and/or to a portable electronic device to display to a user and/or owner.

In embodiments, a power tracking solar charger 930 may transfer incoming power (e.g., voltage and/or current) generated by the solar cells to one or more converters (e.g., a DC-to-DC converters) 995. In embodiments, a rechargeable battery 920 may provide power (e.g., voltage and/or current) to a DC-to-DC converter 995. In embodiments, one or more DC-to-DC converters 1795 may transfer voltage and/or current to one or more PCBs, components, motor assemblies, and/or other assemblies of a shading object. In embodiments, a DC-to-DC converter 995 may be utilized to provide lower operating voltages, e.g., 3.3 VDC or 5.0 VDC or other voltages, to components, boards and/or assemblies 997 operating on a lower DC voltage. In embodiments, rechargeable battery 920 may transfer incoming power (e.g., voltage and/or current) to one or more converters 995, and a power charger 930 may monitor power distribution and power levels. In embodiments, a rechargeable battery 920 may provide power to shading object or umbrella motor assemblies, PCBs, components, and/or assemblies 997. If high power requirements are existing due to operating conditions (e.g., motors running), a rechargeable battery 920 and solar cells or solar cell arrays may both provide power to one or more PCBs, components, motor assemblies, and/or other assemblies of a shading object.

Figure 10:
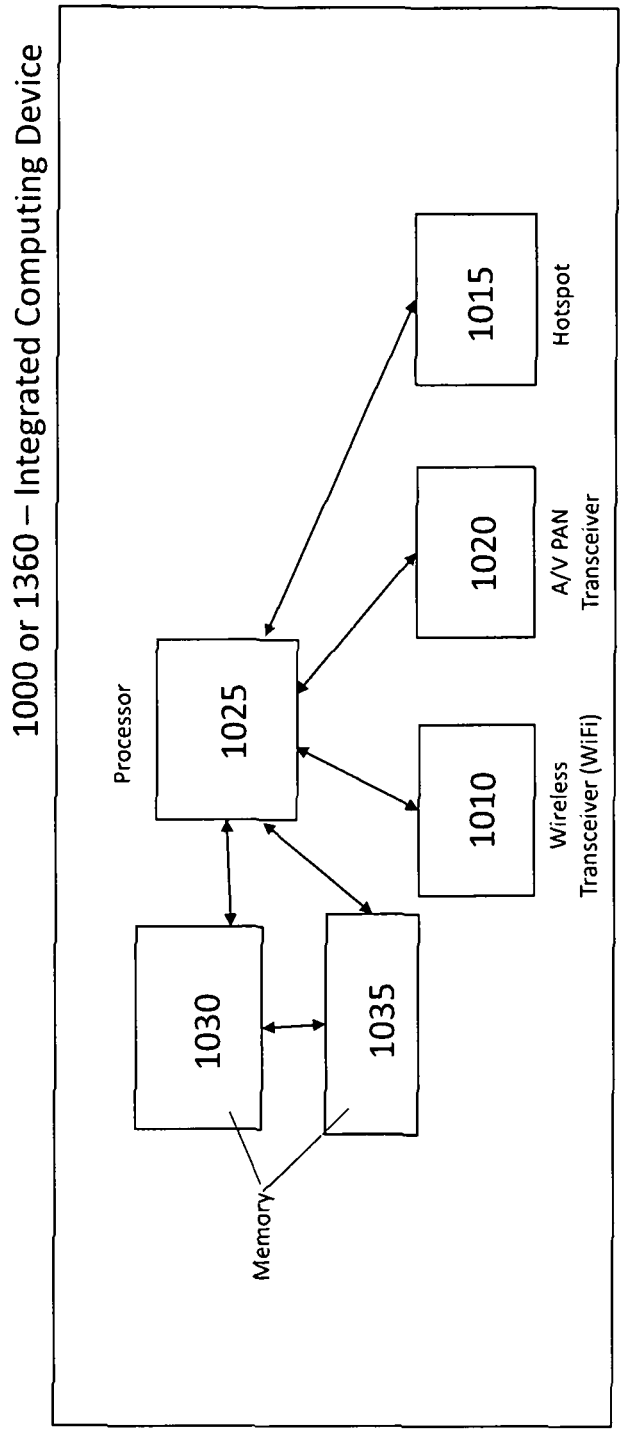
FIG. 10 illustrates a shading object or umbrella integrated computing device in a modular umbrella system according to embodiments.

FIG. 10 illustrates a shading object or umbrella integrated computing device in a modular umbrella system according to embodiments. In embodiments, an integrated computing device PCB 1000 may comprise a wireless WiFi or LAN wireless transceiver 1010 (which may or may not operate as a wireless hotspot and/or router), a separate wireless hotspot device 1015, one or more audio/video transceivers 1020 (e.g., PAN transceivers), one or more processors 1025, one or more non-volatile memories 1030 and one or more memory components 1035. In embodiments, many of the components may reside on a computing device PCB. In embodiments, a separate PCB may house or have some of the above-listed components (e.g., local area network or WiFi transceiver 1010, wireless hotspot device 1015) mounted thereon and a shading object computing device may comprise non-volatile memory 1030 (e.g., a flash drive, a hard drive, a removable disk drive), and a volatile memory 1035 such as RAM, and on or more processors 1825.

In embodiments, computer-readable and/or computer-executable instructions may be stored in non-volatile memory, fetched by one or more processors 1025, loaded into RAM 1035, and executed by one or more processors 1025 to perform data intensive functions, execute processes such as a healthcare process (e.g., selecting a healthcare option from a dashboard of a mobile application), a security process (e.g., selecting a security option from a dashboard of a mobile application), an energy process or application (e.g., selecting an energy option from a dashboard of a mobile application), a weather application or processor (e.g., selecting a weather option from a dashboard of a mobile application), and/or communicating with external devices (e.g., wireless access points, portable electronic devices, servers, networks). In embodiments, an integrated computing device 860 and/or a computing device PCB may consume more power due to higher data throughput and higher utilization time. Having a computing device integrated into an intelligent shading object or umbrella, provides a benefit, as to prior art shading objects or umbrellas, of allowing an intelligent shading object to run software applications, communicate with data intensive devices, such as cameras and/or audio system, utilize WiFi or other wireless communication transmissions, operate as a WiFi hotspot (or other wireless communication hub) and communicate with external computing devices to transfer data obtained by the intelligent shading object.

In embodiments, an integrated computing device 1000 may communicate with application servers, mobile applications servers, proxy servers, and/or other computing devices on a global communications network (e.g., the Internet). In embodiments, a computing device may handle data and/or command communications between external devices and a shading object. In embodiment, an integrated computing device 1060 may handle intra-shading object communications requiring more extensive processing power and/or higher data transfer rates. In embodiments, a core module assembly 130 may house an integrated computing device. In embodiments, a core module assembly 130 may also house a computing device PCB to which a computing device 1060 may be attached to and/or connected.

In embodiments, an integrated computing device 1360 or 1000 may be a Linux-based computing device (e.g., Raspberry PI) although other operating systems and/or other processor types may be utilized. In embodiments, a shading object may comprise one or more transceivers to communicate with wireless access points utilizing a wireless communication protocol. In embodiments, one or more wireless transceivers may communicate voice and/or data communications to an access point, which in turn may communicate received voice and/or data communications to a packet-switched network (e.g., a global communications network such as the Internet, an intranet, or a private network) or a circuit-switched network (such as existing telecommunications system).

In embodiments, an integrated computing device may comprise a WiFi (or wireless LAN) transceiver 1010 which may also operate as a hotspot and/or personal wireless access point. In embodiments, an integrated computing device 860 may comprise a separate and/or additional wireless hotspot 1015. In embodiments, a wireless hotspot may be operate as an wireless access point providing network and/or Internet access to portable electronic devices (e.g., smartphones, music players) or other electronic devices (personal computers and/or laptops) in public locations, where other wireless access points are not located (or being utilized for different purposes). If a computing device 1360 comprises a wireless hotspot 1015 (or a wireless transceiver 1010 is operating as a hotspot), wireless communication devices (e.g., laptops, tablets, smartphones) may utilize a shading object as a communications hub. This may be beneficial in remote locations where no wireless access points are located, or in locations where wireless data or voice communications have been interrupted. In addition, if a shading object computing device and thus a shading object includes a wireless hotspot, image or video streaming, face-timing, application downloads, or other data intensive functions and/or applications may execute and be completed in a shorter amount of time then when using a PAN transceiver 1065.

In embodiments, an integrated computing device 1360 or 1000 may store and/or execute shading object or umbrella application software, which may be referred to as SMART-SHADE and/or SHADECRAFT application software. In embodiments, shading object or umbrella application software may be run and/or executed on a variety of computing devices including a computing device integrated within a shading object or umbrella. In embodiments, for example, shading object or modular umbrella application software may include computer-readable instructions being stored in non-volatile memories of a computing device, a portable electronic device (e.g., a smart phone and/or a tablet), an application server, and/or a web application server, all which interact and communicate with each other. In embodiments, computer-readable instructions may be retrieved from memories (e.g., non-volatile memories) of these above-identified computing devices, loaded into volatile memories and executed by processors in the computing device, portable electronic device, application server, and/or mobile application server. In embodiments, a user interface (and/or graphical user interface) for a modular umbrella software application may be presented on a portable electronic device, although other computing devices could also execute instructions and present a graphical user interface (e.g., dashboard) to an individual. In embodiments, modular umbrella application software may generate and/or display a dashboard with different application (e.g., process) selections (e.g., weather, health, storage, energy, security processes and/or application processes). In embodiments, modular umbrella application software may control operation of a modular umbrella, communicate with and receive communications from modular umbrella assemblies and/or components, analyze information obtained by assemblies and/or components of a modular umbrella, integrate with existing home and/or commercial software systems, and/or store personal data generated by the modular umbrella, and communicate with external devices.

In embodiments, a portable electronic device may also comprise a mobile application stored in a non-volatile memory. In embodiments, a mobile application may be referred to as a SHADECRAFT or a SMARTSHADE mobile application. In embodiments, a mobile application (mobile app) may comprise instructions stored in a non-volatile memory of a portable electronic device, which can be executed by a processor of a portable electronic device to perform specific functionality. In embodiments, this functionality may be controlling of, interacting with, and/or communicating with a shading object. In embodiments, mobile apps may provide users with similar services to those accessed and may be individual software units with limited or specific function. In embodiments, applications may be available for download from mobile application stores, such as Apple's App Store. In embodiments, mobile apps may be known as an app, a Web app, an online app, an iPhone app or a smartphone app. In embodiments, a sensor device (or other IoT device) may communicate to a server computing device via a cellular communications network, a wireless communication network, a wired communication network and/or other communication network. In embodiments, a sensor device and/or assembly device may capture sensor measurements, data and/or conditions and may communicate sensor measurements, data and/or conditions to an IoT enabled server, which may analyze, store, route, process and/or communicate such sensor measurements, data and/or conditions. In embodiments, an Internet of Things (IoT) may be a network of physical objects—sensors, devices, vehicles, buildings, and other electronic devices. In embodiments, the IoT may sense and/or control objects across existing wireless communication network infrastructure, an existing cellular communication network, and/or a global communications network infrastructure. In embodiments, integrating of devices via IoT may create opportunities for more direct integration of a physical world into computer-based systems, which may result in improved efficiency, accuracy and economic benefit. In addition, when an IoT device or server is augmented with sensors and actuators, IoT may be integrated or enabled with a more general class of cyber-physical systems, e.g., smart grids, smart homes, intelligent transportation and smart cities. In embodiments, in IoT, for example, may be uniquely identifiable through its embedded computing system but is able to interoperate within the existing Internet infrastructure. In embodiments, a device may have a specific IP address in order to be addressed by other IoT enabled systems and/or devices. In embodiments, an IP address may be provided and/or established by routers and/or Internet service providers. For example, a modular umbrella enabled with IoT capability, because it may incorporate cameras, may be able to communicate with or be integrated into a home or office security system. Further, if an individual has a smart home, an individual may be able to control operation of, or communicate with a modular umbrella shading system as part of an existing smart home software application (either via a smart phone, mobile communication device, tablet, and/or computer). In addition, a modular umbrella shading system, if part of IoT, may be able to interface with, communicate with and interact with an existing home security system. Likewise, a modular umbrella shading system may be able to be an additional sound reproduction device (e.g., via speaker(s)) for a home audio and/or video system that is also on the IoT. In addition, a modular umbrella system may be able to integrate itself with an electronic calendar (stored on a computing device) and become part of a notification or alarm system because it will identify when upcoming meetings are occurring.

In embodiments, a modular umbrella system may be a device on an Internet of Things (IoT). In embodiments, an IoT-enabled device may be one or more cameras, one or more environmental sensors, one or more directional sensors, one or more movement sensors, one or more motor assemblies, one or more lighting assemblies and/or one or more solar panels or cells. These objects and/or IoT-enabled devices may comprise items and/or device may be embedded with electronics, software, sensors, and network connectivity, which enables these physical objects to detect, collect, process and/or exchange data with each other and/or with computing devices, Shadecraft IoT-enabled servers, and/or third-party IoT enabled servers connected to a modular umbrella system via a global communications network (e.g., an Internet).

In embodiments, IoT devices (e.g., servers, sensors, appliances, motor assemblies, outdoor shading systems, cameras, lighting assemblies, microphones, computing devices, etc.) may communicate with each other utilizing an Internet Protocol Suite. In embodiments, IoT devices may be assigned an IP address and may utilize IPv6 communication protocol. In embodiments where security is important, authentication may be established utilizing OAUTH (e.g., version 2.0) and Open ID Connect protocols (e.g., version 1.0). In addition, in embodiments, the IEEE 802.15.4 radio standard may allow for reduction in power consumption by IoT devices utilizing RF communications. In embodiments where power consumption may need to be decreased, e.g., as in sensors, modular umbrella shading systems, shading systems, cameras, processors), communication with IoT devices may utilize Message Queuing Telemetry Transport (MQTT) which utilizes TCP for its transport layer and utilizes a central MQTT broker to manage and/or route messages among a MQTT network's nodes. In embodiments, communication with IoT devices may utilize Constrained Application Protocol (CoAP) which utilizes UDP as its transport protocol. In embodiments, CoAP may be a client/server protocol and allows a one-to-one report/request instruction model. In embodiments, CoAP also may have accommodations for multi-cast transmission of messages (e.g., one to many report/request instruction model).

In embodiments, a modular umbrella system 100 may comprise a backup battery and/or also a memory. In embodiments, a modular umbrella system may further comprise a power sensor. If a sensor (e.g., a voltage sensor, a current sensor, a fuse, or other power sensor) determines that a power outage has occurred and/or power has been discontinued from a modular umbrella system 100, a sensor may communicate a signal, message and/or command to a backup battery to provide power to components and/or assemblies of a modular umbrella system 100. In embodiments, a backup battery may provide power (e.g., voltage and/or current) to a processor and/or controller, and the processor and/or controller may communicate commands, messages, instructions and/or signals to shut down and/or retract components and/or assemblies to an original and/or storage position. In embodiments, a memory may also receive a signal from a sensor and/or backup battery, and a memory may load and/or communicate emergency shutdown computer-readable instructions to a processor and/or a controller for execution. For example, emergency shutdown computer-readable instructions may cause a processor and/or controller to communicate commands and/or instructions to first, second and/or third motor assemblies to move rotate to a starting position, retract arm support assemblies and/or move an upper support assembly to a vertical position (or rest position) with respect to a lower support assembly. In embodiments, shutdown computer-readable instructions may cause a processor and/or controller to communicate commands and/or instructions to a camera and/or sensors to turn off and/or deactivate these components.

Figure 11A:
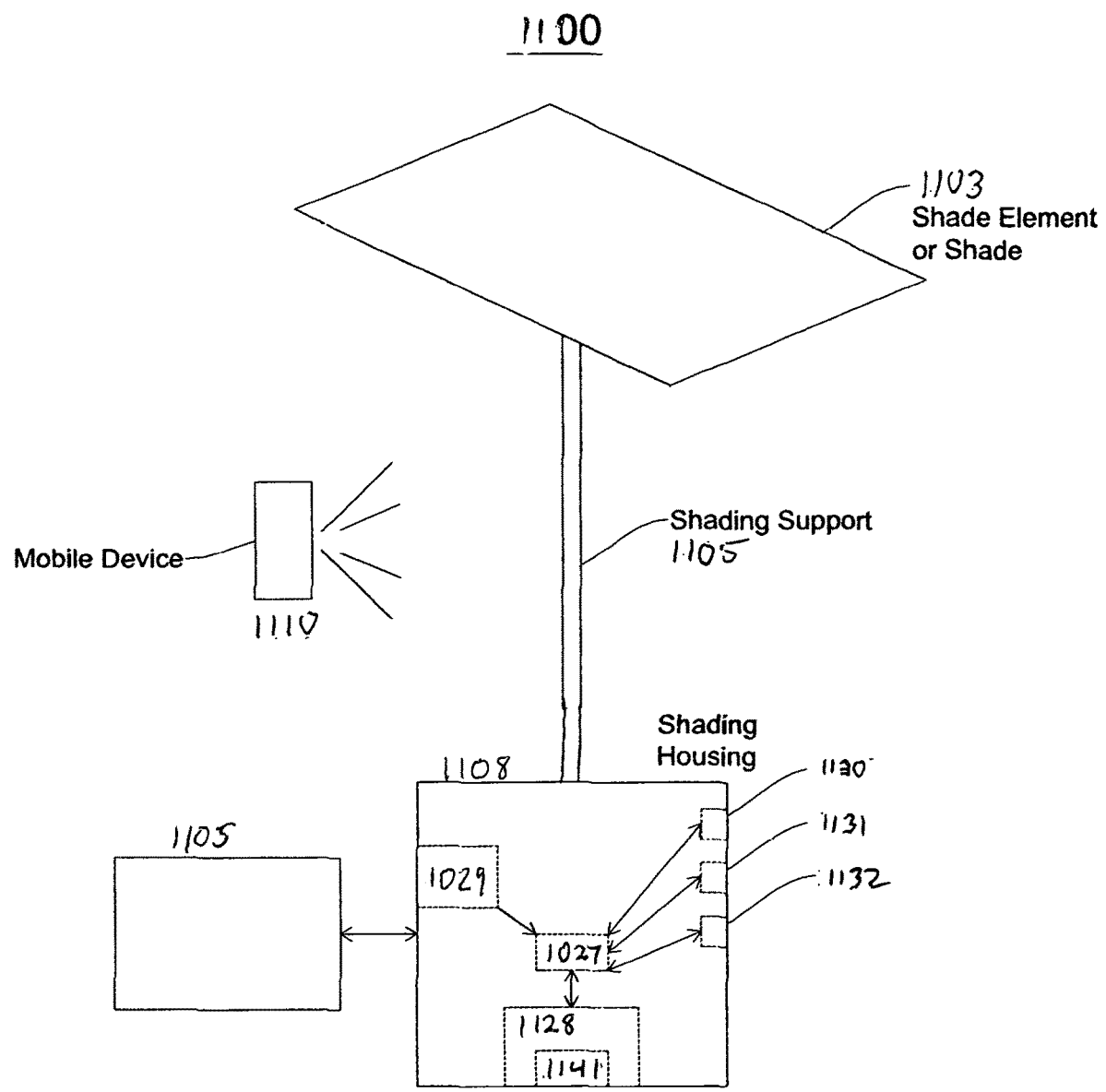
FIG. 11A illustrates a shading system including an artificial intelligence engine and/or artificial intelligence interface.

FIG. 11A illustrates a shading system including an artificial intelligence engine and/or artificial intelligence interface. A shading system including artificial intelligence (AI) 1100 include a shading element or shade 1103, a shading support 1105 and a shading device housing 1108. In embodiments, a shading element or shade 2003 may provide shade to keep a shading device housing 1108 from overheating. In embodiments, a shading device housing 1108 may be coupled and/or connected to a shading support 1105. In embodiments, a shading support 1105 may be coupled to a shading device housing 1108. In embodiments, a shading support 1105 may support a shade or shading element 1103 and move it into position with respect to a shading device housing 1108. In this illustrative embodiment of FIG. 11, a shading device housing 1108 may be utilized as a base, mount and/or support for a shading element or shade 1103. In embodiments, a shading support may be simplified and may not have a tilting assembly (as in FIGS. 1 and 2 where an upper housing of a core module assembly is rotated about (or moved about) a lower housing of a core module assembly). In embodiments, a shading support may be simplified and not have a core assembly. In embodiments, a shading support 1105 may also not include an expansion and sensor assembly. Illustratively, in embodiments, a shading support 1105 may not comprise an integrated computing device and/or may not have sensors. In embodiments, a shading element or shade 1103 or a shade support 1105 may comprise one or more sensors (e.g., environmental sensors). For example, in embodiments, sensors may be a temperature sensor, a wind sensor, a humidity sensor, an air quality sensor, and/or an ultraviolet radiation sensor. In embodiments, a shading support may not include an audio system (e.g., a speaker and/or an audio/video transceiver) and may not include lighting assemblies. In embodiments, a shading housing 1108 may not include one or more lighting assemblies.

In embodiments, a shading device housing 1108 may comprise a computing device 1120. In embodiments, a shading device housing 1108 may comprise one or more processors/controllers 1127, one or more memory modules 1128, one or more microphones (or audio receiving devices) 1129, one or more PAN transceivers 1130 (e.g., Bluetooth transceivers), one or more wireless transceivers 1131 (e.g., WiFi or other 802.11 transceivers), and/or one or more cellular transceivers 2032 (e.g., EDGE transceiver, 4G, 3G, CDMA and/or GSM transceivers). In embodiments, the processors, memory, transceivers and/or microphones may be integrated into a computing device 1120, where in other embodiments, a single-board computing device may not be utilized. In embodiments, one or more memory modules 1128 may contain computer-readable instructions, the computer-readable instructions being executed by one or more processors/controllers 1127 to perform certain functionality. In embodiments, the computer-readable instructions may comprise an artificial intelligence API 1140. In embodiments, an artificial intelligence API 1140 may allow communications between a shading device housing 1108 and a third party artificial intelligence engine housed in a local and/or remote server and/or computing device 1150. In embodiments, an AI API 1140 may be a voice recognition AI API, which may be able to communicate sound files (e.g., analog or digital sound files) to a third party voice recognition AI server. In embodiments, a voice recognition AI server may be an Amazon Alexa, Echo, Echo Dot and/or a Google Now server. In embodiments, a shading device housing 1108 may comprise one or more microphones 1129 to capture audio (and specifically) audible and/or voice commands spoken by users and/or operators of shading systems 1100. In embodiments, computer-readable instructions executed by one or more processors 1127 may receive captured sounds and create analog and/or digital audio files corresponding to spoken audio commands (e.g., open shading system, rotate shading system, elevate shading system, select music to play on shading system, turn one lighting assemblies). In embodiments, an AI API 1140 may communicate audio files to an external AI server 1150. In embodiments, a shading device housing 1108 may communicate generated audio files to external AI servers 1150 via or utilizing one or more PAN transceivers 1130, one or more wireless local area network transceivers 1131, and/or one or more cellular transceivers 1132. In other words, communications with an external AI server 1150 may occur utilizing PAN transceivers 1130 (and protocols). Alternatively, communications with an external AI server 1150 may occur utilizing a local area network (802.11 or WiFi) transceiver 1131. Alternatively, or in combination with, communications with an external AI server 1150 may occur utilizing a cellular transceiver 1132 (e.g., utilizing 3G and/or 4G or other cellular communication protocols). In embodiments, a shading device housing 1108 may utilize more than one microphone 1129 to allow capture of voice commands from a number of locations and/or orientations with respect to a shading system 1100 (e.g., in front of, behind a shading system, and/or at a 45 degree angle with respect to a support assembly 1105).

Figure 11B:
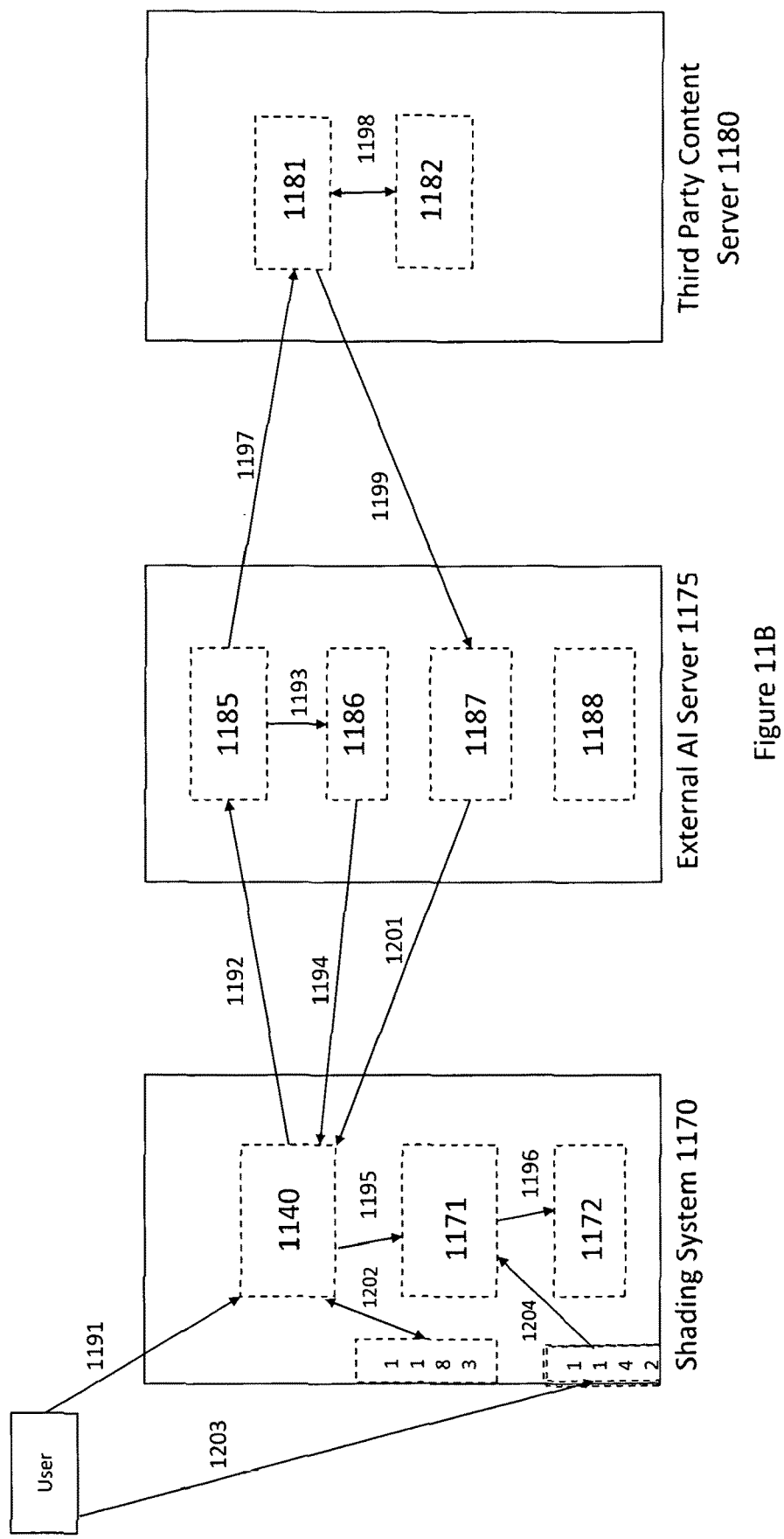
FIG. 11B illustrates a block and dataflow diagram of communications between a shading system and/or one or more external AI servers according to embodiments.

FIG. 11B illustrates a block and dataflow diagram of communications between a shading system and/or one or more external AI servers according to embodiments. A shading system 1170 may communicate with an external AI server 1175 and/or additional content servers 1180 via wireless and/or wired communications networks. In embodiments, a user may speak 1191 a command (e.g., turn on lights, or rotate shading system) which is captured as an audio file and received. In embodiments, an AI API 1140 may communicate and/or transfer 1192 an audio file (utilizing a transceiver—PAN, WiFi/802.11, or cellular) to an external or third-party AI server 1175. In embodiments, an external AI server 1175 may comprise a voice recognition engine or module 1185, a command engine module 1186, a third party content interface 1187 and/or third party content formatter 1188. In embodiments, an external AI server 1175 may receive 1192 one or more audio files and a voice recognition engine or module 1185 may convert received audio file to a device command (e.g., shading system commands, computing device commands) and communicate 1193 device commands to a command engine module or engine 1186. In embodiments, if a voice command is for operation of a shading system 1100, a command engine or module 1186 may communicate and/or transfer 1194 a generated command, message, and/or instruction to a shading system 1100. In embodiments, a shading system 1100 may receive the communicated command, communicate and/or transfer 1195 the communicated command to a controller/processor 1171. In embodiments, the controller/processor 1171 may generate 1196 a command, message, signal and/or instruction to cause an assembly, component, system or devices 1172 to perform an action requested in the original voice command (open or close shade element, turn on camera, activate solar panels).

In embodiments, a user may request actions to be performed utilizing a shading system's microphones and/or transceivers that may require interfacing with third party content servers (e.g., NEST, e-commerce site selling sun care products, e-commerce site selling parts of umbrellas or shading systems, communicating with online digital music stores (e.g., iTunes), home security servers, weather servers and/or traffic servers). For example, in embodiments, a shading system user may request 1) traffic conditions from a third party traffic server; 2) playing of a playlist from a user's digital music store accounts; 3) ordering a replacement skin and/or spokes/blades arms for a shading system. In these embodiments, additional elements and steps may be added to previously described method and/or process.

For example, in embodiments, a user may speak 1191 a command or desired action (execute playlist, order replacement spokes/blades, and/or obtain traffic conditions from a traffic server) which is captured as an audio file and received at an AI API 1140 stored in one or more memories of a shading system housing 1170. As discussed above, in embodiments, an AI API 1140 may communicate and/or transfer 1192 an audio file utilizing a shading system's transceiver to an external AI server 1175. In embodiments, an external AI server 1175 may receive one or more audio files and a voice recognition engine or module 1185 may convert 1193 received audio file to a query request (e.g., traffic condition request, e-commerce order, retrieve and stream digital music playlist).

In embodiments, an external AI server may communicate and/or transfer 1197 a query request to a third party server (e.g., traffic conditions server (e.g., SIGALERT or Maze), an e-commerce server (e.g., a RITE-AID or SHADECRAFT SERVER, or Apple iTunes SERVER) to obtain third party goods and/or services. In embodiments, a third party content server 1180 (a communication and query engine or module 1181) may retrieve 1198 services from a database 1182. In embodiments, a third party content server 1180 may communicate services queried by the user (e.g., traffic conditions or digital music files to be streamed) 1199 to an external AI server 1175. In embodiments, a third party content server 1180 may order requested goods for a user and then retrieve and communicate 1199 a transaction status to an external AI server 1175. In embodiments, a content communication module 1187 may receive communicated services (e.g., traffic conditions or streamed digital music files) or transaction status updates (e.g., e-commerce receipts) and may communicate 1201 the requested services (e.g., traffic conditions or streamed digital music files) or the transaction status updates to a shading system 1170. Traffic services may be converted to an audio signal, and an audio signal may be reproduced utilizing an audio system 1183. Digital music files may be communicated and/or streamed directed to an audio system 1183 because there is no conversion necessary. E-commerce receipts may be converted and communicated to speaker 1183 for reading aloud. E-commerce receipts may also be transferred to computing device in a shading system 1170 for storage and utilization later.

In embodiments, computer-readable instructions in a memory module of a shading system may be executed by a processor and may comprise a voice recognition module or engine 1142 and in this embodiment, voice recognition may be performed at an intelligent shading system 1100 without utilizing a cloud-based server. In embodiments, a shading system 1170 may receive 1203 the communicated command, communicate and/or transfer 1204 the communicated command to a controller/processor 1171. In embodiments, the controller/processor 1171 may generate and/or communicate 1196 a command, message, signal and/or instruction to cause an assembly, component, system or device 1172 to perform an action requested in the original voice command Referring back to FIG. 11A, in embodiments, a mobile computing device 1110 may communicate with a shading system with an artificial intelligence capabilities. In embodiments, a user may communicate with a mobile computing or communications device 1110 by a spoken command into a microphone. In embodiments, a mobile computing or communications device 1110 communicates a digital or analog audio file to a processor 1127 and/or AI API 1140 in a shading device housing. In embodiments, a mobile computing or communications device 1110 may also convert the audio file into a textual file for easier conversion from an external or integrated AI server or computing device 1150.

FIGS. 11A and 11B describe a shading system having a shading element or shade, shading support and/or shading housing. A shading housing such as the one described above may be attached to any shading system and may provide artificial intelligence functionality and services. In embodiments, a shading system may be an autonomous and/or automated shading system having an integrated computing device, sensors and other components and/or assemblies, and may have artificial intelligence functionality and services provided utilizing an AI API stored in a memory of a shading housing.

In embodiments, an intelligent umbrella and/or robotic shading system may be a central device in an Ultra-Low Energy (ULE) network system. In embodiments, a central ULE device may also be referred to as an alpha device, a master device, and/or hub device. In embodiments, ULE applications require low power and this would be beneficial to intelligent umbrellas and/or robotic shading systems which are powered by solar cells yet provides a large number of features and/or functionality. ULE may be a communication network and/or protocol that provide low latency, longOrange, value-added voice capabilities at a moderate data rate. In embodiments, ULE may be based on Digital Enhanced Cordless Telecommunications (DECT).

In embodiments, WiFi (wireless LAN) connectivity may not be available with sufficient bandwidth in outdoor environments. In embodiments, other radio frequency (RF) technologies may be applied to extend networking capabilities of an intelligent umbrella and/or robotic shading system. These other RF technologies may be introduced to compensate for tradeoffs of other technologies, such as effective transmission distance, transmitting power levels, power consumption by RF transceivers, networking speed and/or bandwidth, potential number of simultaneous connections of multiple wireless connections, or other relevant metrics. In embodiments, other RF technologies and protocols may be commonly applied in home and office wireless networks and other modern IoT network infrastructures. In embodiments, other RF technologies and protocols may be Zigbee, Z-Wave, Thread, and ULE protocols. In embodiments, ULE networking (e.g., transceivers) provides benefits and applications not as efficiently provided by other RF technologies.

In embodiments, ULE devices may be placed into devices and may act as hosts, controllers, masters, alphas, hubs and/or slaves, devices, and/or responding devices. In embodiments, a wireless communications network may be extended outdoors (where it does not have coverage), an intelligent umbrella or robotic shading system may comprise a ULE transceiver that may provide wireless connectivity for users and/or operators in an environment or area surrounding an intelligent umbrella. In such embodiments, a ULE base station (e.g., a device with a ULE controller or hub) in a home or office or commercial center may be paired with a ULE transceiver in an intelligent umbrella and/or robotic shading system. In embodiments, a ULE base station may be communicatively coupled to a home, office and/or commercial complex local area network router, which may provide global communications network (e.g., Internet) access. Thus, a user and/or operator near or around an intelligent umbrella and/or robotic shading system having a ULE transceiver may have access to a global communications network (e.g., Internet) through the ULE base station (or if the intelligent umbrella is a ULE hub then it can communicate with a router on its own). In embodiments, an intelligent umbrella with a ULE transceiver may provide an extended range of connectivity as compared to a personal area network transceivers (e.g., Bluetooth, Z-Wave and/or Zigbee) or WiFi transceiver due to a ULE's communication protocol's extended range. In addition, a ULE transceiver is lower cost than other WiFi (or 802.11) transceivers or PAN transceivers. In addition, ULE devices and/or transceivers have very low power requirements and thus may need little power from a power source in an intelligent umbrella and/or robotic shading system. In addition, ULE devices and/or transceivers may be self-powered (e.g., a AAA battery or similar device) and thus require no power for an intelligent umbrella and/or robotic shading system. In embodiments, ULE devices and/or transceivers may be operated when all other components or most other components in an intelligent umbrella and/or robotic shading system are out of power and/or malfunctioning.

In embodiments, an intelligent umbrella and/or robotic shading system may comprise an ULE transceiver and/or also a WiFi (802.11 or LAN) transceiver, a PAN transceiver, and/or a cellular transceiver. In embodiments, although an ULE transceiver may provide extended range, an ULE transceiver may provide limited bandwidth as compared to a WiFi transceiver or other other receives. Thus, in embodiments, WiFi, cellular and/or PAN transceivers, may remain, in some situations, as a preferred wireless communications network (e.g., networking mechanism) in outdoor environments including intelligent umbrellas. In addition, networking bandwidth provided by an ULE In embodiments, an intelligent umbrella may comprise computer-readable instructions stored in one or more memory devices located within. In embodiments, computer-readable instructions executable by one or more processors may calculate an ULE transceiver's bandwidth and availability at a current time, may calculate a WiFi (802.11 or LAN) transceiver's bandwidth and availability at the current time (and/or cellular and/or PAN transceivers bandwidth and/or availability and select to utilize the transceiver (or the more than one transceivers) with a highest score or rating at the current time for communications between users or operators of the intelligent umbrella/robotic shading system and a global communications network. In addition, power consumption or power necessary may be analyzed to determine the best transceiver or more than one transceiver.

In embodiments, an intelligent umbrella and/or robotic shading system may comprise an ULE transceiver that may act as a master/controller or hub or as a ULE device or slave device. In such embodiments, an intelligent umbrella having such an ULE controller may act as an ULE relay, that connects the intelligent umbrella and/or robotic shading system to a ULE base station and/or hub, as well as the intelligent umbrella acting as a ULE controller or ULE hub to other intelligent umbrellas and/or ULE devices (e.g., sensors, other assemblies) to allow data network connectivity (e.g., Internet) to other networked devices (which may be Internet of Things (IoT) devices).

In embodiments, an intelligent umbrella and/or robotic shading system may comprise an ULE transceiver. ULE is a data layer over a DECT protocol, which may be utilized in cordless home phones, which may be utilized for transferring voice between two locations. In embodiments, an intelligent umbrella and/or robotic shading system comprising an ULE transceiver may be utilized to establish voice links to other devices with ULE transceivers (e.g., base stations with ULE transceivers, other intelligent umbrellas with ULE transceivers) and thus establish intercom functionality between, for example, an intelligent umbrella and/or a base station). In embodiments, for example, this functionality may allow transfer of voice data between an intelligent umbrella with an ULE transceiver and other devices with ULE transceivers. In embodiments, voice data may be transmitted or communicated for playback, recording and/or storage purposes.

Figure 12A:
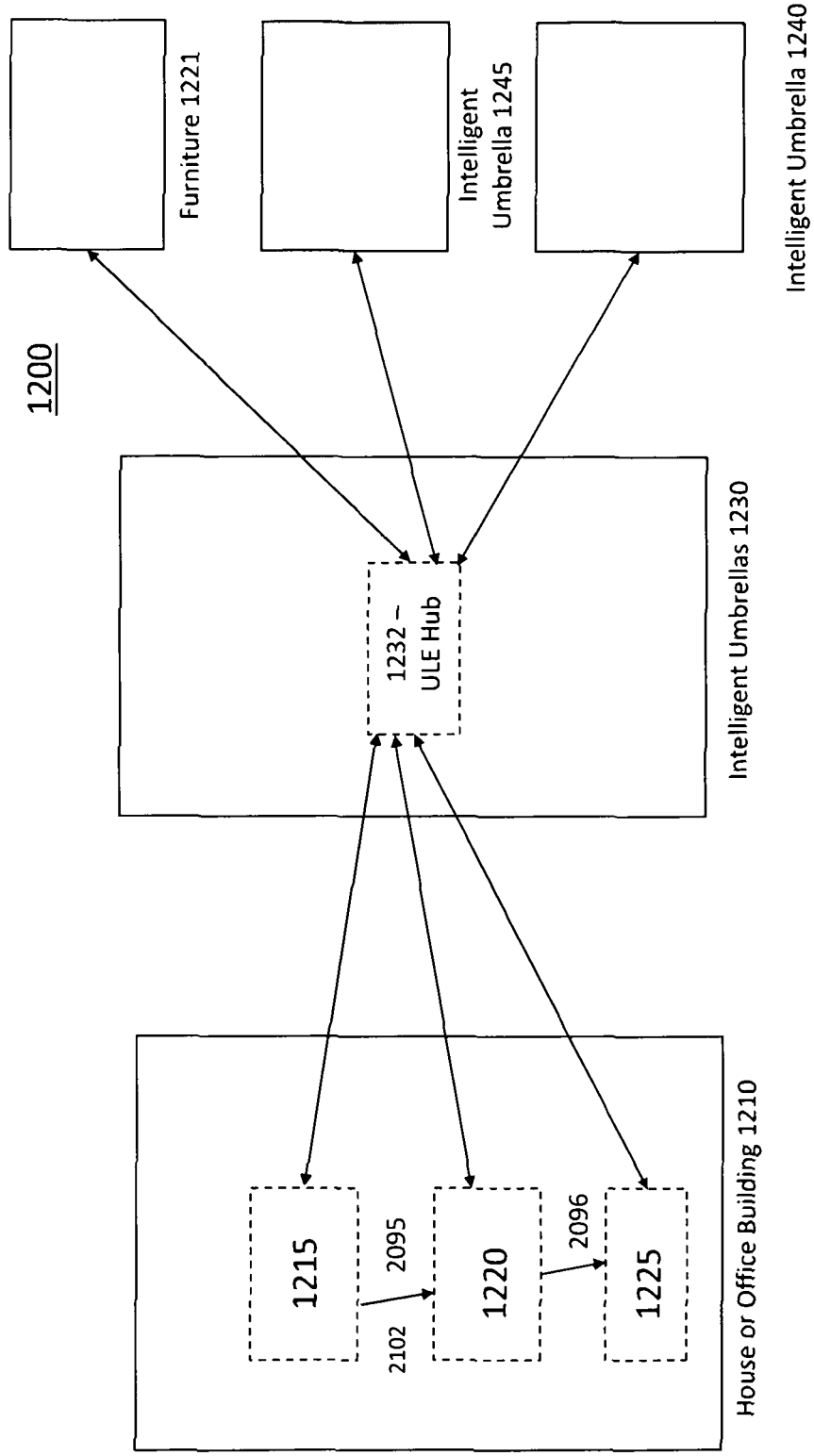
FIG. 12A illustrates an intelligent umbrella and/or robotic shading system including ULE capabilities utilized in a home and/or office network according to embodiments.

FIG. 12A illustrates an intelligent umbrella and/or robotic shading system including ULE capabilities utilized in a home and/or office network according to embodiments. In embodiments, a networked system utilizing ULE capabilities 1200 comprises a house or office building 1210, outdoor furniture 1221 and/or one or more chairs, and one or more intelligent umbrellas and/or robotic shading systems 1230, 1240, or 1245. In embodiments, communications within a networked system may occur utilizing ULE and/or DECT-enabled devices, PAN transceivers, LAN or WiFi transceivers and/or cellular transceivers. One or more of these devices and/or wireless transceivers may be utilized for communications within a home/office/commercial property networked system.

In embodiments, a house or office building 1210 may comprise one or more ULE hubs and/or devices 1215 1218 and 1225 (each having ULE transceivers). In embodiments, an intelligent umbrella and/or robotic shading system 1230 may comprise a master, central or alpha ULE device 1232 along with other components and/or functionalities. The ULE device 1232 in the intelligent umbrella and/or robotic shading system may be referred to as a ULE hub or ULE controller. In embodiments, a ULE controller, hub and/or device may be installed as a node on an Internet of Things (IOT) along with other devices (e.g., sensors, motors, computing devices, lighting assemblies, etc.) having or note having ULE transceivers. In embodiments, other one or more robotic shading systems 1240 and 1245 may be ULE devices (or transceivers) that are not hubs and/or controllers.

Figure 12B:
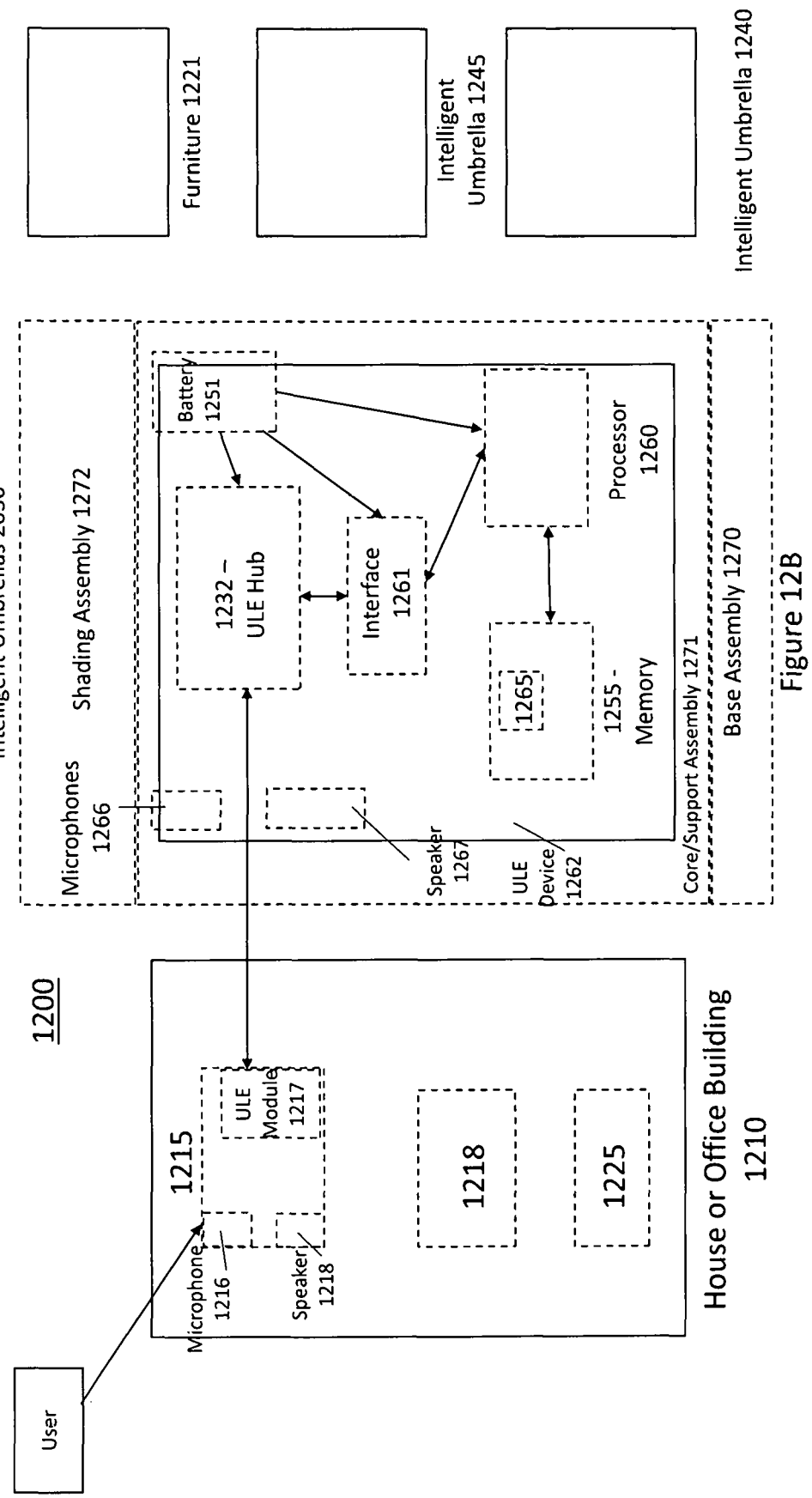
FIG. 12B illustrates a block diagram of an ULE controller or hub in a network system according to embodiments.

FIG. 12B illustrates a block diagram of an ULE controller or hub in a network system according to embodiments. In embodiments, a ULE controller or hub 1232 may comprise a ULE module (implemented in hardware and/or software) and/or an ULE-enabled integrated circuit. In embodiments, an intelligent umbrella and/or robotic shading system 1230 may comprise a ULE controller or hub 1232, one or more memory modules 1255, one or more processors and/or controllers 1260, computer-readable instructions 1265 stored in the one or more memory modules 1255, one or more batteries or rechargeable batteries 1251, and/or an interface module 1261 to communicate with and/or transfer data to the ULE controller 1232. In embodiments, one or more batteries or rechargeable batteries 1251 may be AAA batteries (which may be custom or off the shelf). In embodiments, a ULE device 1262 may comprise the ULE hub 1232, one or more memory modules 1255, one or more processors 1260, computer-readable instructions stored in the one or more memory modules 1255, one or more batteries or rechargeable batteries 1251, one or more batteries 1251, one or more interface module 1261, one or more microphones 1266, and/or one or more sound reproduction devices 1267. Some or all of these components may also be located outside the ULE device 1262. FIG. 12B shows the one or more batteries 1251 may provide power to the one or more processors 1260, an interface module 1261, and a ULE controller or hub 1232. Having one or more batteries 1251 located within a ULE device 1262 to be powered from within without having to rely on power being provided from the intelligent umbrella and/or robotic shading system. ULE devices are ultra-low power devices and may operate for a long period of time (e.g., years or up to 10 years on a single battery). This is an advantage because while other assemblies are not powered in the intelligent umbrella, the ULE device 1262 may be powered by its own power and may still be usable to establish communications with other devices. In embodiments, an intelligent umbrella and/or robotic shading system may comprise one or more microphones 1266, one or more sound reproduction assemblies or devices (e.g., speakers) 1267 and/or receivers utilized to communication sound and/or audible files between other assemblies and/or the speaker(s) 1267 and/or microphone(s) 1266. In embodiments, an intelligent umbrella and/or robotic shading system may also comprise a base assembly 1270, a support assembly 1271 and/or a shading assembly 1272. In embodiments, a shading assembly 1272 may comprise one or more ribs, one or more arms, one or more support assemblies, an umbrella frame and/or a shading fabric and/or a shading covering, as well as other components and/or assemblies, with respects to FIGS. 1, 2 and/or 10.

In embodiments, an intelligent shading system or robotic shading system 1230 including an ULE controller 1232 may communicate voice signals bi-directionally with other ULE-enabled devices (e.g., which includes ULE transceivers). In embodiments, for example, a ULE device 1215 (located on a second floor of a house 1210 and part of a cordless phone) may comprise a microphone 1216, a sound reproduction device 1218 and/or an ULE module 1217). In embodiments, a user may communicate with an ULE device 1215, and/or transfer voice files to an intelligent shading system or robotic shading system by speaking into a microphone 1216 and voice communications may be established with the ULE controller device 1232 in an intelligent umbrella or robotic shading system 1230. For example, a voice command may be a request for an outside temperature (which may be measured and/or provided by an umbrella temperature sensor), a request to move an intelligent umbrella 1230 to a specific location, and/or a request to operate/activate certain parts of an umbrella 1230 (e.g., activate an umbrella lighting assembly). In embodiments, a ULE module 1217 in a ULE-enabled device 1215 located in a house 1210 may receive a captured audio file and communicate the captured audio file representing the audio request or command to a ULE controller module 1232 in an intelligent shading system or robotic shading system 1230, perform voice recognition on the received audio file and communicate the received instruction or command to an appropriate assembly (e.g., temperature sensor, motor assembly, and lighting assembly) in an intelligent umbrella 1230. In embodiments, measurements may be taken in response to audio commands and may be communicated via a ULE controller module 1232 to a ULE device 1215 which requested the information.

Referring back to FIG. 12A, in embodiments, an ULE circuit and/or ULE controller 1232 in an intelligent shading system or robotic shading system 1230 may communicate voice files and/or signals between itself and other ULE devices (e.g., ULE devices 1215 1220 1225 in a house or office building), or in an outdoor environment (e.g., ULE devices in outdoor furniture 1221 or other umbrellas or robotic shading systems 1240 1245). In embodiments, the receiving ULE devices may operate as intercom-like devices allowing two-way or bidirectional voice communications between the ULE controller 1232 and the other ULE devices 1215 1220 1225 1221 1240 and 1245. For example, an individual in a living room of a house may speak into a ULE device 1215 and have a voice communication (and/or conversation) with a user of an intelligent umbrella 1230 which also has a ULE device 1232. In embodiments, communications may take place utilizing an ULE controller or hub (alpha) 1232 in a central or main intelligent umbrella or robotic shading system 1230.

Figure 14A:
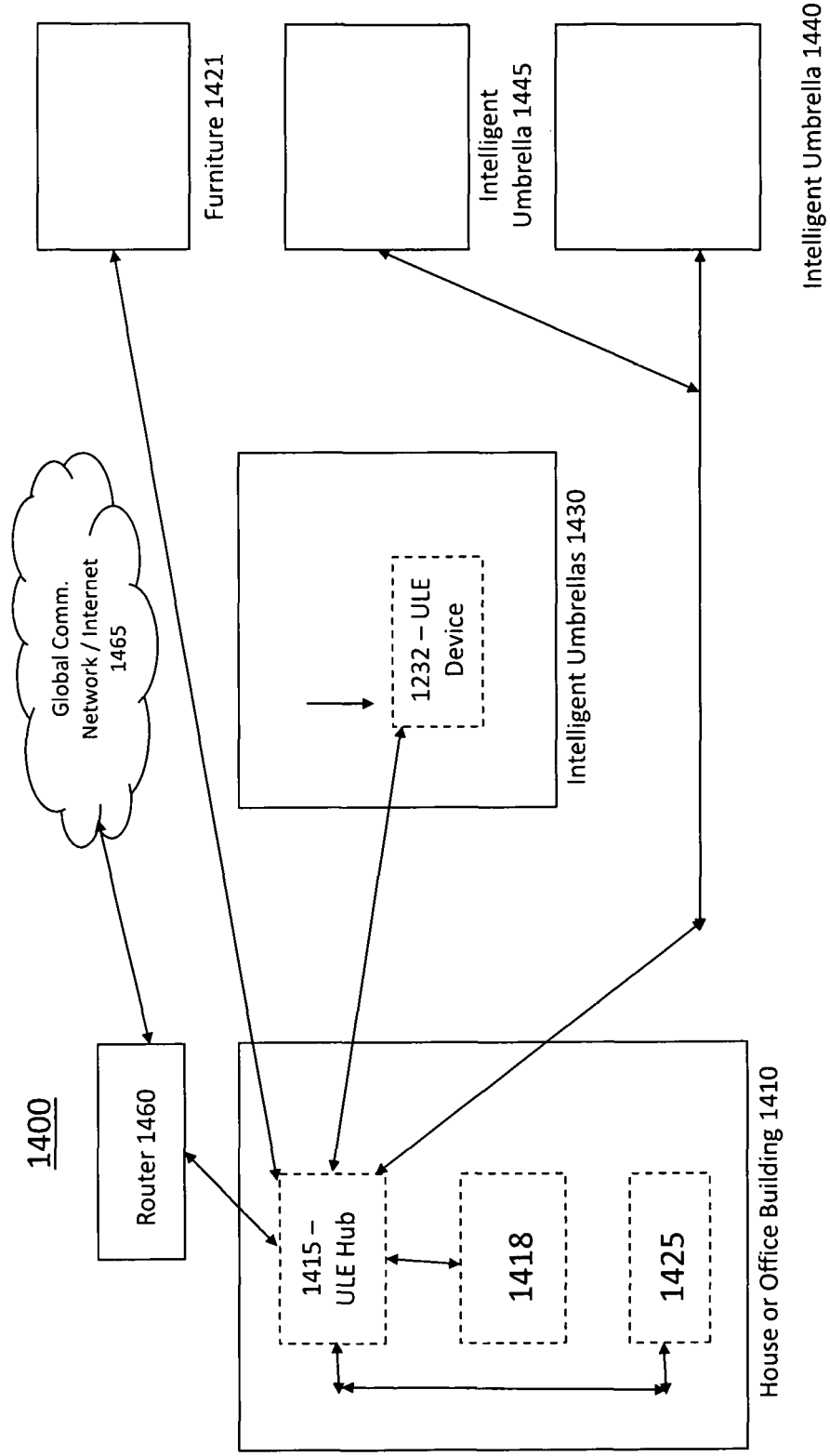
FIG. 14A illustrates a networking system in a home, office or commercial real estate center utilizing ULE wireless communication protocol according to embodiments.

FIG. 14A illustrates a networking system in a home, office or commercial real estate center utilizing ULE wireless communication protocol according to embodiments. In embodiments, a networked system utilizing ULE capabilities 1400 comprises a house or office building 1410, outdoor furniture 1421, and one or more intelligent umbrellas and/or robotic shading systems 1430, 1440, or 1445. In embodiments, communications within a networked system may occur utilizing ULE and/or DECT-enabled devices, PAN transceivers, LAN or WiFi transceivers and/or cellular transceivers. One or more of these devices and/or wireless transceivers may be utilized for communications within a home/office/commercial property networked system. In embodiments, a house or office building 1410 may comprise one or more ULE hubs, controllers or base stations 1415 and/or devices 1418 and 1425 (each having ULE transceivers). In embodiments, the one or more intelligent umbrellas and/or robotic shading systems 1430, 1440 or 1445 may comprise ULE device 1432 or transceivers along with other components and/or functionalities and may not be hubs and/or controllers. In embodiments, a ULE controller, hub and/or device (such as ULE base station or hub) may be installed as a node on an Internet of Things (IOT) along with other devices (e.g., sensors, motors, computing devices, lighting assemblies, etc.) having or note having ULE transceivers. In embodiments, a ULE base station or controller 1415 may be communicatively coupled to a router or similar computing device 1460 which may in term be communicatively coupled to a global communications network 1465 such as the Internet. In embodiments, devices 1418 and/or 1425 may not be coupled to Internet. In addition, intelligent umbrellas and/or robotic shading systems 1430, 1440 or 1445 may also not have connectivity to a global communications network 1465 such as the Internet. In such embodiments, a ULE base station or controller 1415 may provide connectivity to the global communications network for the other devices (e.g., home/office/commercial real estate center devices 1418 and 1425) and intelligent umbrellas 1430, 1440 or 1445). For example, a user interfacing with an intelligent umbrella 1430 having a ULE transceiver can login to the global communications network 1465 to retrieve information, interact with cloud-based software applications and/or place and complete, for example, voice calls over the global communications network. This is an advantage for intelligent umbrellas and/or robotic shading systems because being able to utilize ULE/DECT enabled transceivers extends a range of communication possibilities for the intelligent umbrella. In addition, ULE/DECT enabled transceivers have low power requirements and thus are beneficial to be utilized when not a lot of power is available to the intelligent umbrella and/or robotic shading system.

Figure 14B:
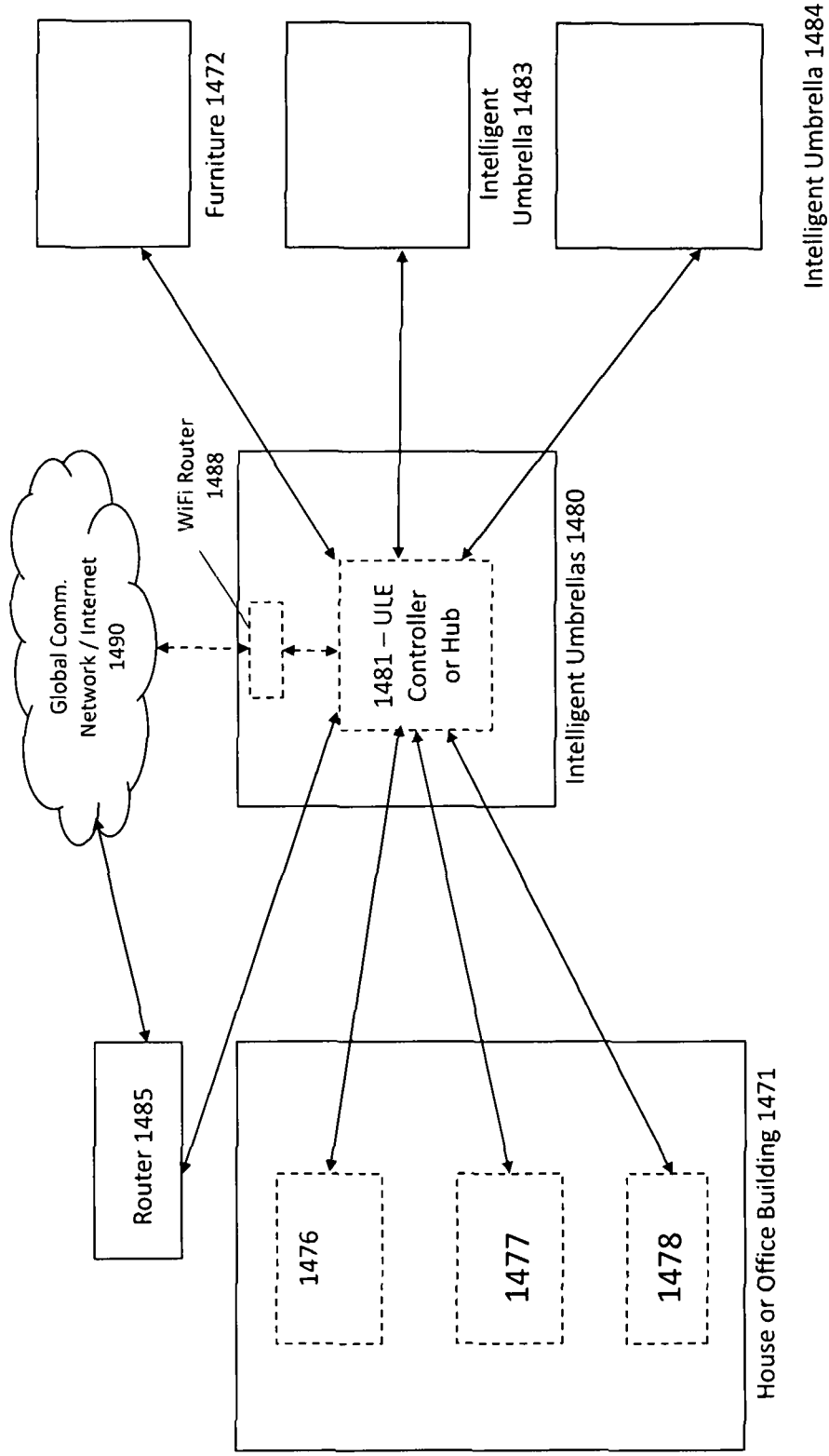
FIG. 14B illustrates a networking system in a home, office or commercial real estate center utilizing ULE wireless communication protocol according to embodiments.

Connecting to Internet if Intelligent Umbrella Has WiFi Router and Can Be Alpha to Other Devices. FIG. 14B illustrates a networking system in a home, office or commercial real estate center utilizing ULE wireless communication protocol according to embodiments. In embodiments, a networked system utilizing ULE capabilities 1470 comprises a house, office building and/or commercial structure 1471, outdoor furniture 1472 having ULE transceivers and/or one or more chairs, an intelligent umbrella and/or robotic shading system 1480 having a ULE controller or hub 1481 and other intelligent umbrella and/or robotic shading systems 1483 and 1484 having ULE transceivers but not being a ULE controller or hub. One or more of these devices may also have other wireless transceivers (e.g., cellular, 802.11 or WiFi or PAN transceivers) and/or wireless transceivers may be utilized for communications within a home/office/commercial property networked system. In embodiments, a house or office building 1471 may comprise one or more ULE-enabled devices 1476, 1477 and 1478 (each having ULE transceivers). In embodiments, the other one or more intelligent umbrellas and/or robotic shading systems 1483 and 1484 may comprise ULE transceivers along with other components and/or functionalities. In embodiments, one of the intelligent umbrellas and/or robotic shading systems 1480 may comprise a ULE controller, hub and/or device 1481 (such as ULE base station or hub) and may be installed as a node on an Internet of Things (IOT) along with other additional devices (e.g., sensors, motors, computing devices, lighting assemblies, etc.), which may also ULE transceivers. In embodiments, an intelligent umbrella and/or robotic shading system 1480 comprising an ULE hub or controller 1481 may be communicatively coupled to a router or similar computing device 1485 which may in term be communicatively coupled to a global communications network 1490 such as the Internet. In embodiments, sometimes an intelligent umbrella and/or robotic shading system 1480 may also have a WiFi transceiver having WiFi (802.11) router functionality/router 1481 (in other words can connect to a global communications network 1490 with going through router 1485). In embodiments, other home/office devices 1476 1477 1478 or intelligent umbrellas and/or robotic shading systems 1483 or 1484 may not be coupled to a global communications network 1490. In such embodiments, an intelligent umbrella and/or shading system 1480 with an ULE hub or controller 1481 may provide connectivity to the global communications network 1490 for the other devices (e.g., home/office/commercial real estate center ULE devices 1476 1477 1478) and intelligent umbrellas 1483 or 1484). For example, a user interfacing with one of the other intelligent umbrellas 1483 or 1484 having a ULE transceiver can login to the global communications network 1490 to retrieve information, interact with cloud-based software applications and/or place and complete, for example, voice calls over the global communications network. This is an advantage for intelligent umbrellas and/or robotic shading systems because being able to utilize ULE/DECT enabled transceivers extends a range of communication possibilities for the other intelligent umbrellas 1483 or 1484. In embodiments, for example, home/office/commercial estate center ULE devices 1476 1477 1478 may be thermostats, lighting system, security systems and may communicate data and/or measurements utilizing the ULE communication protocol to the intelligent umbrella 1480 with the ULE controller or hub 1481 and to other applications and/or servers via the global communication network 1490. This provides an advantage of adding global communications network capability to a home/office/commercial structure that does not have current connectivity and/or damaged or malfunctioning global communications network capability. ULE/DECT enabled transceivers have low power requirements and thus are beneficial to be utilized when not a lot of power is available to an intelligent umbrella and/or robotic shading system.

Figure 15A:
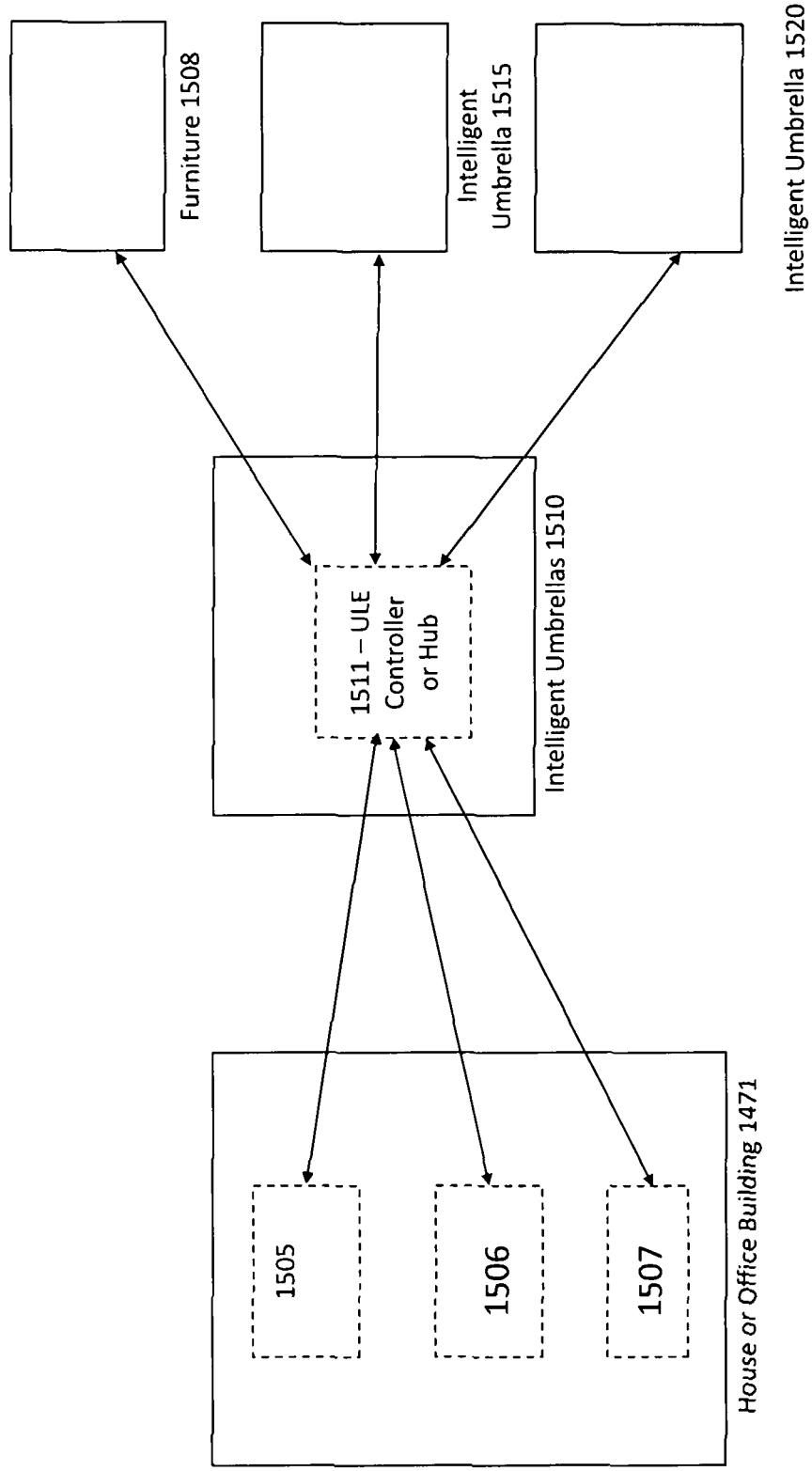
FIG. 15A illustrates an intelligent umbrella and/or robotic shading system comprising a ULE controller or hub transceiver that communicates commands and/or data to one or more other ULE-enabled devices.

In embodiments, an intelligent umbrella and/or robotic shading system comprising a ULE transceiver may be an alpha device (e.g., ULE controller or hub) communicating commands and/or voice data to other ULE-enabled devices located on the same property or complex. FIG. 15A illustrates an intelligent umbrella and/or robotic shading system comprising a ULE controller or hub transceiver that communicates commands and/or data to one or more other ULE-enabled devices. In embodiments, a ULE-enabled network 1500 comprises one or more home/office/commercial structure ULE-devices 1505 1506 1507 (e.g., security systems, audio transceivers and speakers, thermostats, and/or appliances), outdoor furniture having a ULE transceiver 1508, an intelligent umbrella or robotic shading system 1510 having a ULE controller or hub transceiver 1511, and/or an intelligent umbrella or robotic shading system having a ULE transceiver 1515 or 1520. One or more of these devices illustrated above may also have other wireless transceivers (e.g., cellular, 802.11 or WiFi or PAN transceivers) and/or wireless transceivers may be utilized for communications within a home/office/commercial property networked system. In embodiments, for example, an intelligent umbrella or robotic shading system 1510 having a ULE controller or hub transceiver 1511 may communicate music (e.g., digital and/or analog music files) to other ULE-enabled devices (e.g., 1505 or 1515) having speakers (e.g., audio transceivers and/or speakers, smart home systems, and/or other intelligent umbrellas/robotic shading systems) for playback. In embodiments, the same music may be sent to all other ULE-enabled devices and/or in other embodiments, different music may be sent to different ULE-enabled devices. Further, in embodiments, an intelligent umbrella or robotic shading system 1510 having a ULE controller or hub transceiver 1511 may utilize the ULE communication protocol to communicate voice data files to other ULE-enabled devices 1515, 1520, 1505, 1506 or 1507, for example, to implement intercom functionality. In embodiments, audio from a user or operator may be captured by one or more microphones at an intelligent umbrella/robotic shading system 1510, converted into an audio file and then communicated via a ULE controller/hub transceiver 1511 to other ULE-enabled devices 1505, 1506, 1507 1515, or 1520 to playback on audio-reproduction devices. In embodiments, for example, an intelligent umbrella/robotic shading system 1510 having a ULE controller or hub transceiver 1511 may communicate commands, instructions and/or messages to other ULE-enabled devices to request other ULE-enabled devices to perform specific operations and/or to capture measurements, audio, video and communicate captured audio, video, and/or measurements back to the ULE-enabled devices. For example, a user or operator may speak a command to one or more microphones in an intelligent umbrella/robotic shading system 1510 having a ULE controller/hub 1511 to request measurements from ULE-enabled temperature and/or humidity sensors 1515 in a home or office. In embodiments, voice commands are converted into an audio file and communicated via a ULE controller/hub 1511 to a ULE transceiver in an ULE-enabled sensor 1515 to capture measurements and communicate such captured measurements back to the intelligent umbrella/robotic shading system 1510 with ULE controller or hub transceiver 1511 for analysis, storage and/or processing. In embodiments, for example, a user or operator may speak a command into one or more microphones in an intelligent umbrella/robotic shading system 1500 having a ULE controller/hub 1511 to request movement of a second intelligent umbrella/robotic shading system 1520 to provide better shade protection for users and/or operators. In this embodiment, for example, the spoken umbrella movement command is converted into an audio file and communicated via the ULE controller or hub transceiver 1511 to a second intelligent umbrella/robotic shading system ULE transceiver 1515 and a processor and/or controller in the second intelligent umbrella/robotic shading system 1520 may generate commands, signals and/or messages to appropriate assemblies and/or components to move an umbrella in a desired direction. In embodiments, this provides an advantage over convention systems which allows a user to remotely activate and/or interact with other ULE-enabled devices while being located outside near an intelligent umbrella and/or robotic shading system. In addition, it provides communications via low-power ULE transceivers and extends smart-home functionality into an outdoor environment. In addition, in environments, with multiple intelligent umbrellas and/or robotic shading systems (e.g., a park or outdoor venue), an operator may generate commands or instructions to control the multiple umbrella systems from one location. In embodiments, it also allows individualized and/or customized commands to be sent to specific intelligent umbrellas/robotic shading systems.

Figure 15B:
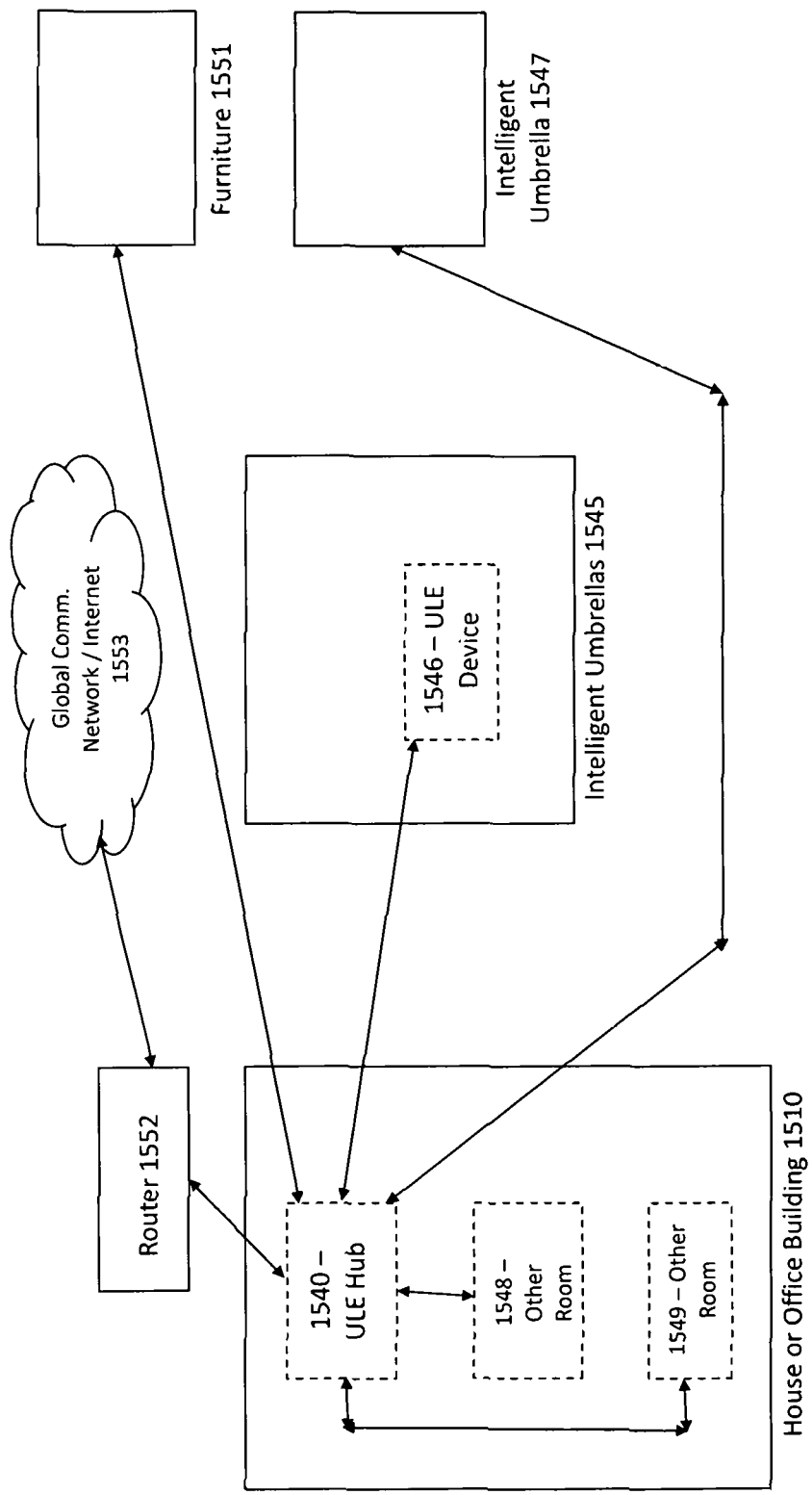
FIG. 15B illustrates an outdoor ULE-enabled system allowing for voice communications or intercom according to embodiments.

FIG. 15B illustrates an outdoor ULE-enabled system allowing for voice communications or intercom according to embodiments. In addition, a regular circuit switched telephone system may also communicate with individuals utilizing the ULE devices. In embodiments, a ULE device 1540 in a house may be a base station may be able to receive telephone phones (from outside land-line telephones as well as cellular telephones) and this may be communicated to an intelligent umbrella 1545 with a ULE controller or device 1546. In this manner, a mother may be able to call and communicate with one or her children who may be in the vicinity of the intelligent umbrella 1545, outdoor furniture with ULE device 1551, another umbrella 1547 with ULE devices, other rooms 1548 1549 in house utilizing the DECT communication protocol and ULE devices and/or controller. In other words, a mobile communications device 1550 may place a call to a home telephone land-line and then voice connect to the individual or user in many different locations on a property utilizing the ULE devices and ULE and DECT communication protocol. In embodiments, a ULE device base station 1540 may also receive a Voice Over IP (VoIP) call via a router 1552 and/or the global communications network 1553 and transfer the call the other ULE-enabled devices 1548 1549 1545, etc.

In embodiments, an intelligent umbrella may comprise a base assembly, the base assembly having an outside surface contacting a ground surface. The intelligent umbrella may also comprise a support assembly, the support assembly connected to the base assembly, and an expansion assembly, the expansion assembly connected to the support assembly and to expand and contract one or more arm support assemblies and arms. In embodiments, the intelligent umbrella may comprise an ultra-low energy (ULE) wireless transceiver to communicate with other ULE wireless transceivers in other ULE-enabled devices and/or a wireless local area network transceiver, to communicate with other wireless local area network transceivers. In embodiments, an intelligent umbrella may further comprise one or more memory devices, one or more processors, and computer-readable instructions stored in the one or more memory devices. In embodiments, an intelligent umbrella may comprise a transceiver analysis process or software. In embodiments, the computer-readable instructions may be accessed from the one or more memory devices and executed by the one or more processors to analyze bandwidth and range capability of the ULE wireless transceiver. In embodiments, the computer-readable instructions may be accessed from the one or more memory devices to analyze bandwidth and/or range capability of the wireless LAN (WiFi or 802.11) transceiver, a PAN transceiver (Bluetooth, Zigbee) and/or a cellular transceiver (3G, 4G and/or 5G). In embodiments, the software may analyze one or more of the wireless LAN transceiver, a PAN transceiver, or a cellular transceiver's bandwidth and/or range capability. In embodiments, the computer-readable instructions may be accessed from the one or more memory devices and executed by the one or more processors to compare the analyzed bandwidth and range capability of the ULE wireless transceiver with the analyzed bandwidth and range capability of one or more of the wireless LAN transceiver, the PAN transceiver, or the cellular transceiver. In embodiments, based at least in part on the comparison, computer-readable instructions may be executed by one or more processors to select an optimal wireless transceiver (e.g., a ULE transceiver, a wireless transceiver, the PAN transceiver, or a cellular transceiver) for communications between the intelligent umbrella and other computing devices based on rules or other conditions (e.g., bandwidth being more imported and weighted higher than range). In embodiments, computer-readable instructions executed by one or more processors may select more than one of the transceivers for utilization. In embodiments, computer-readable instructions executed by one or more processors may also consider a factor of transceiver power consumption in selecting the one or more transceivers to utilize for communications between intelligent umbrellas and/or external computing devices. Thus, in some embodiments, power consumption, bandwidth capabilities and/or communication range (one or more of these factors) may be evaluated for wireless transceivers to select one or more of the wireless transceivers for communication.

In embodiments, an intelligent umbrella comprising one or more ULE transceivers may provide many advantages over existing intelligent umbrellas. Since ULE modules, devices and/or transceivers may be self-powered, an intelligent umbrella may utilize ULE transceivers for communications when other transceivers (PAN, wireless LAN, or cellular transceivers) are malfunctioning, not operating and/or otherwise not available. In embodiments, intelligent umbrellas and/or robotic shading systems having ULE modules, transceivers, or devices may be able to communicate with existing DECT/ULE devices operating in home and/or office environments.

Some discussions may be focused on single shading objects, intelligent umbrellas, and/or intelligent shading charging systems. However, descriptions included herein may be applicable to multiple shading objects, intelligent umbrellas and/or intelligent shading charging systems. In addition, while discussions may be directed to a software application or process executing on a computing device of a shading object, intelligent umbrella and/or intelligent shading charging system and controlling one shading object, intelligent umbrella and/or intelligent shading charging system, the descriptions also apply to controlling and/or communicating with multiple shading objects, intelligent umbrellas and/or intelligent charging systems.

A computing device may be a server, a computer, a laptop computer, a mobile computing device, a mobile communications device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually, such as parallel and serial port interfaces, a universal serial bus (USB) interface, and the like.

Memory, in a computing device and/or a modular umbrella shading system, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Non-volatile storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, monitor driver, printer driver, scanner driver, or other device drivers, web pages, content files, metadata, playlists and other files. Non-volatile storage medium/media can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, or a mobile operating system, such as iOS, Android, or Windows Mobile, Windows Phone, Google Phone, Amazon Phone, or the like. A computing device, or a processor or controller in an intelligent shading controller may include or may execute a variety of possible applications, such as a software applications enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A computing device or a processor or controller in an intelligent shading object may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing the optical device (e.g., camera, scanner, optical reader) within a mobile computing device.

Network link typically provides information communication using transmission media through one or more networks to other devices that use or process the information. For example, network link may provide a connection through a network (LAN, WAN, Internet, packet-based or circuit-switched network) to a server, which may be operated by a third party housing and/or hosting service. For example, the server may be the server described in detail above. The server hosts a process that provides services in response to information received over the network, for example, like application, database or storage services. It is contemplated that the components of system can be deployed in various configurations within other computer systems, e.g., host and server.

For the purposes of this disclosure a computer readable medium stores computer data, which data can include computer program code that is executable by a computer, in machine-readable form. By way of example, and not limitation, a computer-readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. An intelligent umbrella, comprising:
a base assembly, the base assembly having an outside surface contacting a ground surface;
a support assembly, the support assembly connected to the base assembly;
an expansion assembly, the expansion assembly connected to the support assembly and to expand and contract one or more arm support assemblies and arms; and
an ultra low energy (ULE) wireless transceiver, the ULE wireless transceiver to act as an ULE communication hub, to generate commands or instructions and to communicate the generated commands or instructions to another ULE-enabled device to control some operations of the another ULE-enabled device, wherein the ULE wireless transceiver to be located within the support assembly or the expansion assembly.

2. The intelligent umbrella of claim 1, the another ULE-enabled device to be a separate intelligent umbrella, and the generated commands or instructions to instruct the separate intelligent umbrella to move one or more mechanical assemblies of the separate intelligent umbrella, the one or more mechanical assemblies to be the one or more arm support assemblies and arms.

3. The intelligent umbrella of claim 1, the another ULE-enabled device to be a separate intelligent umbrella, the ULE wireless transceiver to further communicate audio data, and the commands or instructions to instruct the separate intelligent umbrella to playback the communicated audio data.

4. The intelligent umbrella of claim 1, the another ULE-enabled device to be a separate intelligent umbrella, the commands or instructions to instruct one or more sensors in the separate intelligent umbrella to capture sensor measurements and to receive the captured sensor measurements from the separate intelligent umbrella.

5. The intelligent umbrella of claim 4, further comprising one or more memory devices, one or more processors and computer-readable instructions, the computer-readable instructions accessed from the one or more memory devices and executable by the one or more processors to store the captured sensor measurements in the one or more memory devices.

6. The intelligent umbrella of claim 1, the another ULE-enabled device to be a separate intelligent umbrella, the commands or instructions to instruct one or more camera devices in the separate intelligent umbrella to capture video and/or audio in an area surrounding the separate intelligent umbrella and to receive the captured video and/or audio from the one or more camera devices in the separate intelligent umbrella.

7. The intelligent umbrella of claim 6, further comprising one or more memory devices, one or more processors and computer-readable instructions, the computer-readable instructions accessed from the one or more memory devices and executable by the one or more processors to store the captured video and/or audio or to communicate the captured video and/or audio to a remote computing device or server.

8. The intelligent umbrella of claim 1, the another ULE-enabled device to be a home sensor or security device, the commands or instructions to instruct the home sensor to activate and turn on.

9. The intelligent umbrella of claim 1, the ULE wireless transceiver to further communicate audio data, the another ULE-enabled device to be a home audio receiver, the commands or instructions to instruct the home audio receiver to play the communicated audio data.

10. An intelligent umbrella, comprising:
a base assembly, the base assembly having an outside surface contacting a ground surface;
a support assembly, the support assembly connected to the base assembly;
an expansion assembly, the expansion assembly connected to the support assembly and to expand and contract one or more arm support assemblies and arms; and
an ultra low energy (ULE) wireless transceiver, the ULE wireless transceiver to receive commands or instructions from another ULE transceiver in another ULE-enabled device to perform an operation at the intelligent umbrella based at least in part on the received commands or instructions, the ULE wireless transceiver to be located within the support assembly or the expansion assembly.

11. The intelligent umbrella of claim 10, further comprising one or more processors, one or more memory devices, and computer-readable instructions,
wherein the received commands or instructions from the another ULE-enabled device to direct one or more motors in the intelligent umbrella to activate and operate; and
the computer-readable instructions to be accessed from the one or more memory devices and executable by the one or more processors, to generate commands, messages or instructions, and to communicate the generated commands, messages or instructions to the one or more motors in the intelligent umbrella.

12. The intelligent umbrella of claim 10, further comprising to receive audio files from the ULE transceiver in the another ULE-enabled device, and
further comprising one or more processors, one or more memory devices, and computer-readable instructions,
the computer-readable instructions to be accessed from the one or more memory devices and executable by the one or more processors, to communicate the received audio files to an audio reproduction device in the intelligent umbrella, the audio reproduction device to play the received audio files based, at least in part, on the received commands or instructions.

13. The intelligent umbrella of claim 10, further comprising one or more imaging devices, and
one or more processors, one or more memory devices, and computer-readable instructions,
the computer-readable instructions to be accessed from the one or more memory devices and executable by the one or more processors, to activate the one or more imaging devices in the intelligent umbrella to capture video and/or audio of an area surrounding the intelligent umbrella and to communicate the captured video and/or audio via the ULE wireless transceiver to another ULE transceiver in an another intelligent umbrella.

14. The intelligent umbrella of claim 10, further comprising one or more environmental sensors, and
one or more processors, one or more memory devices, and computer-readable instructions, the computer-readable instructions to be accessed from the one or memory devices and executable by the one or more processors, to activate the one or more environmental sensors in the intelligent umbrella to capture environmental sensor measurements and to communicate the captured environmental sensor measurements via the ULE wireless transceiver to an another ULE transceiver in an another intelligent umbrella.

15. An intelligent umbrella, comprising:
a base assembly, the base assembly having an outside surface contacting a ground surface;
a support assembly, the support assembly connected to the base assembly;
an expansion assembly, the expansion assembly connected to the support assembly and to expand and contract one or more arm support assemblies and arms;
an ultra low energy (ULE) wireless transceiver, to communicate with other ULE wireless transceivers in other ULE-enabled devices,
one or more memory devices, one or more processors, and computer-readable instructions, the computer-readable instructions being accessed from the one or more memory devices and executable by the one or more processors to:
analyze bandwidth and range capability of the ULE wireless transceiver and to analyze bandwidth and range capability of the wireless local area network (LAN) transceiver;
compare the analyzed bandwidth and range capability of the ULE wireless transceiver and the analyzed bandwidth and range capability of the wireless local area network transceiver to select an optimal wireless transceiver for communications between the intelligent umbrella and other computing devices;
capture power consumption requirements of the ULE wireless transceiver and power consumption requirements of the wireless LAN transceiver; and
compare the captured power consumption requirement of the ULE wireless transceiver and the captured power consumption requirement of the wireless local area network transceiver in order to select an optimal wireless transceiver for communications between the intelligent umbrella and other computing devices.

* * * * *